(12) United States Patent
Johnson et al.

(10) Patent No.: US 12,173,632 B2
(45) Date of Patent: Dec. 24, 2024

(54) EXHAUST GAS AFTERTREATMENT SYSTEM

(71) Applicant: Cummins Emission Solutions Inc., Columbus, IN (US)

(72) Inventors: Ryan M. Johnson, Cottage Grove, WI (US); Matthew K. Volmerding, Columbus, IN (US); Jacob D. Canik, Stoughton, WI (US); Pranjal Naik, Cupertino, CA (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 18/033,021

(22) PCT Filed: Oct. 21, 2021

(86) PCT No.: PCT/US2021/056073
§ 371 (c)(1),
(2) Date: Apr. 20, 2023

(87) PCT Pub. No.: WO2022/087279
PCT Pub. Date: Apr. 28, 2022

(65) Prior Publication Data

US 2023/0304432 A1    Sep. 28, 2023

Related U.S. Application Data

(60) Provisional application No. 63/104,092, filed on Oct. 22, 2020.

(51) Int. Cl.
*F01N 3/00* (2006.01)
*F01N 3/021* (2006.01)
(Continued)

(52) U.S. Cl.
CPC ......... *F01N 13/0097* (2014.06); *F01N 3/021* (2013.01); *F01N 3/2892* (2013.01)

(58) Field of Classification Search
CPC .... F01N 13/0097; F01N 3/021; F01N 3/2892; F01N 13/017; F01N 13/08; F01N 3/20;
(Continued)

(56) References Cited

U.S. PATENT DOCUMENTS 1,104,963 A    7/1914    Coanda
3,699,407 A    10/1972   Gurtler
(Continued)

FOREIGN PATENT DOCUMENTS

CN    1864835 A    11/2006
CN    101501308 A    8/2009
(Continued)

OTHER PUBLICATIONS

International Search Report and Written Opinion issued for PCT Application No. PCT/US2021/056073, issued Jan. 26, 2022, 15 pages.
(Continued)

*Primary Examiner* — Matthew T Largi
(74) *Attorney, Agent, or Firm* — Foley & Lardner LLP

(57) ABSTRACT

An exhaust gas aftertreatment system includes a housing assembly, a first catalyst member, and a second catalyst member. The housing assembly includes an upstream housing, a decomposition housing, a distributing housing, and a catalyst member housing. The upstream housing is centered on an upstream housing axis. The decomposition housing is coupled to the upstream housing and configured to receive exhaust gas from the upstream housing. The distributing housing is coupled to the decomposition housing and configured to receive the exhaust gas from the decomposition housing. The catalyst member housing is coupled to the
(Continued)

distributing housing and configured to receive the exhaust gas from the distributing housing. The catalyst member housing is centered on a catalyst member housing axis that is parallel to the upstream housing axis. The first catalyst member extends within the catalyst member housing.

18 Claims, 26 Drawing Sheets

(51) Int. Cl.
  *F01N 3/28* (2006.01)
  *F01N 13/00* (2010.01)
(58) Field of Classification Search
  CPC . F01N 3/2066; F01N 3/24; F01N 3/28; F01N 2240/20; F01N 2610/1453
  See application file for complete search history.

(56) References Cited

U.S. PATENT DOCUMENTS

| | | | |
|---|---|---|---|
| 4,424,777 A | | 1/1984 | Klomp |
| 6,444,177 B1* | | 9/2002 | Muller ................ B01F 23/2132 422/177 |
| 7,127,884 B2 | | 10/2006 | Worner et al. |
| 7,581,387 B2 | | 9/2009 | Bui et al. |
| 7,793,490 B2 | | 9/2010 | Amon et al. |
| 7,836,688 B2 | | 11/2010 | Woerner et al. |
| 7,866,143 B2 | | 1/2011 | Buhmann et al. |
| 8,033,101 B2 | | 10/2011 | Amon et al. |
| 8,230,678 B2 | | 7/2012 | Aneja et al. |
| 8,375,708 B2 | | 2/2013 | Forster et al. |
| 8,460,610 B2 | | 6/2013 | Silver et al. |
| 8,607,555 B2 | | 12/2013 | Kaiser et al. |
| 8,615,984 B2 | | 12/2013 | Kornherr et al. |
| 8,695,330 B2* | | 4/2014 | Davidson ............ B01D 53/9495 60/303 |
| 8,776,509 B2* | | 7/2014 | Wikaryasz ............ F01N 13/017 60/324 |
| 8,789,363 B2 | | 7/2014 | Iverson et al. |
| 9,021,794 B2 | | 5/2015 | Goss et al. |
| 9,133,744 B2 | | 9/2015 | Birkby et al. |
| 9,248,404 B2 | | 2/2016 | Brunel et al. |
| 9,266,075 B2 | | 2/2016 | Chapman et al. |
| 9,267,417 B2 | | 2/2016 | Baldwin et al. |
| D757,919 S | | 5/2016 | Kimura |
| 9,328,640 B2 | | 5/2016 | Iverson et al. |
| 9,346,017 B2 | | 5/2016 | Greber |
| 9,352,276 B2 | | 5/2016 | Sampath |
| 9,453,444 B2 | | 9/2016 | Fischer et al. |
| 9,464,546 B2 | | 10/2016 | Perrot et al. |
| 9,504,960 B2 | | 11/2016 | Park |
| 9,581,067 B2 | | 2/2017 | Guilbaud et al. |
| D781,071 S | | 3/2017 | Callif et al. |
| 9,605,573 B2 | | 3/2017 | Solbrig et al. |
| 9,644,516 B1 | | 5/2017 | Chiruta et al. |
| 9,664,081 B2 | | 5/2017 | Rusch et al. |
| 9,714,598 B2 | | 7/2017 | Alano et al. |
| D794,100 S | | 8/2017 | McDonald et al. |
| 9,726,064 B2 | | 8/2017 | Alano |
| 9,737,908 B2 | | 8/2017 | Hornback et al. |
| 9,776,135 B2 | | 10/2017 | Boeshans et al. |
| D809,577 S | | 2/2018 | McDonald et al. |
| D816,010 S | | 4/2018 | Rike |
| 9,995,193 B2 | | 6/2018 | Alano et al. |
| 10,024,217 B1 | | 7/2018 | Johnson et al. |
| 10,030,564 B2 | | 7/2018 | Cossard et al. |
| 10,174,658 B2 | | 1/2019 | Dimpelfeld et al. |
| 10,190,465 B2 | | 1/2019 | Alano et al. |
| D840,908 S | | 2/2019 | Rike |
| 10,215,075 B2 | | 2/2019 | Chapman et al. |
| 10,247,081 B2 | | 4/2019 | Niaz |
| 10,273,853 B2 | | 4/2019 | Golin |
| 10,273,854 B1 | | 4/2019 | Abbassi et al. |
| D849,662 S | | 5/2019 | Rike |
| 10,287,948 B1 | | 5/2019 | Moulieres et al. |
| 10,287,954 B2 | | 5/2019 | Chapman et al. |
| 10,294,843 B2 | | 5/2019 | Alano et al. |
| 10,316,721 B1 | | 6/2019 | Moulieres et al. |
| D855,090 S | | 7/2019 | McDonald et al. |
| 10,337,379 B2 | | 7/2019 | Dimpelfeld et al. |
| 10,337,380 B2 | | 7/2019 | Willats et al. |
| 10,422,268 B2 | | 9/2019 | Niaz |
| 10,533,478 B2 | | 1/2020 | Alano |
| 10,577,995 B2 | | 3/2020 | Ker et al. |
| 10,612,443 B2 | | 4/2020 | Li et al. |
| 10,632,430 B1 | | 4/2020 | Liu et al. |
| 10,731,536 B1 | | 8/2020 | Chenoweth et al. |
| 10,787,946 B2 | | 9/2020 | Rohde et al. |
| 10,808,587 B2 | | 10/2020 | Ottaviani et al. |
| 10,823,032 B2 | | 11/2020 | Willats et al. |
| 10,907,522 B2 | | 2/2021 | Poinsot et al. |
| 10,914,218 B1* | | 2/2021 | Chapman .............. F01N 3/2066 |
| 10,920,635 B2 | | 2/2021 | Kozakiewicz |
| 10,920,642 B2 | | 2/2021 | Wang et al. |
| 10,933,387 B2 | | 3/2021 | Cvelbar |
| 10,967,329 B2 | | 4/2021 | Alano et al. |
| 11,085,346 B2 | | 8/2021 | Tucker et al. |
| 11,105,241 B2 | | 8/2021 | Tucker et al. |
| 11,143,084 B2 | | 10/2021 | Wahlstrom |
| 11,193,412 B2 | | 12/2021 | Cvelbar et al. |
| 11,230,958 B2 | | 1/2022 | Tucker et al. |
| 11,242,788 B2 | | 2/2022 | Kinnaird |
| 11,242,790 B2 | | 2/2022 | Chapman et al. |
| 11,268,424 B2 | | 3/2022 | Kimura et al. |
| 11,300,028 B2 | | 4/2022 | Meunier |
| 11,313,266 B2 | | 4/2022 | Tucker et al. |
| 11,428,140 B1 | | 8/2022 | Kinnaird et al. |
| 11,459,927 B2 | | 10/2022 | Rajashekharaiah et al. |
| 11,459,929 B2 | | 10/2022 | Dimpelfeld et al. |
| 11,506,101 B2 | | 11/2022 | Levato et al. |
| 11,591,943 B2 | | 2/2023 | Hornback |
| 11,746,684 B2 | | 9/2023 | Wahlstrom |
| 11,761,365 B2 | | 9/2023 | Liu et al. |
| 2002/0023435 A1* | | 2/2002 | Woerner ............... F01N 3/2066 60/299 |
| 2004/0112883 A1 | | 6/2004 | Bowden et al. |
| 2004/0237511 A1 | | 12/2004 | Ripper et al. |
| 2005/0172615 A1 | | 8/2005 | Mahr |
| 2005/0262843 A1 | | 12/2005 | Monty |
| 2006/0150614 A1 | | 7/2006 | Cummings |
| 2006/0153748 A1 | | 7/2006 | Huthwohl et al. |
| 2006/0191254 A1 | | 8/2006 | Bui et al. |
| 2006/0260104 A1 | | 11/2006 | Himi |
| 2006/0266022 A1* | | 11/2006 | Woerner ............. F01N 13/0093 60/297 |
| 2006/0283181 A1 | | 12/2006 | Crawley et al. |
| 2007/0144126 A1 | | 6/2007 | Ohya et al. |
| 2007/0163241 A1 | | 7/2007 | Meingast et al. |
| 2007/0245718 A1 | | 10/2007 | Cheng et al. |
| 2007/0283683 A1 | | 12/2007 | Bellinger |
| 2007/0289294 A1* | | 12/2007 | Werni ................... F01N 3/2803 60/299 |
| 2008/0087013 A1 | | 4/2008 | Crawley et al. |
| 2008/0121179 A1 | | 5/2008 | Park et al. |
| 2008/0127635 A1 | | 6/2008 | Hirata et al. |
| 2008/0314033 A1 | | 12/2008 | Aneja et al. |
| 2009/0000283 A1 | | 1/2009 | Endicott et al. |
| 2009/0019843 A1 | | 1/2009 | Levin et al. |
| 2009/0031717 A1 | | 2/2009 | Blaisdell |
| 2009/0049829 A1 | | 2/2009 | Kaiser et al. |
| 2009/0084094 A1 | | 4/2009 | Goss et al. |
| 2009/0145119 A1 | | 6/2009 | Farrell et al. |
| 2009/0158717 A1 | | 6/2009 | Kimura et al. |
| 2009/0158721 A1* | | 6/2009 | Wieland .............. F01N 13/0097 60/297 |
| 2009/0158722 A1 | | 6/2009 | Kojima et al. |
| 2009/0180937 A1 | | 7/2009 | Nohl et al. |
| 2009/0229254 A1 | | 9/2009 | Gibson |
| 2009/0272106 A1* | | 11/2009 | Werni ................... F01N 13/017 60/299 |
| 2010/0083641 A1 | | 4/2010 | Makartchouk et al. |
| 2010/0146942 A1 | | 6/2010 | Mayr et al. |

(56) References Cited

U.S. PATENT DOCUMENTS

| | | |
|---|---|---|
| 2010/0146948 A1 | 6/2010 | Dacosta et al. |
| 2010/0187383 A1 | 7/2010 | Olsen et al. |
| 2010/0251719 A1 | 10/2010 | Mancini et al. |
| 2010/0319329 A1 | 12/2010 | Khadiya |
| 2011/0005232 A1 | 1/2011 | Williams et al. |
| 2011/0079003 A1 | 4/2011 | Sun et al. |
| 2011/0094206 A1 | 4/2011 | Liu et al. |
| 2011/0099978 A1 | 5/2011 | Davidson et al. |
| 2011/0146237 A1 | 6/2011 | Adelmann et al. |
| 2011/0146253 A1* | 6/2011 | Isada ............... F01N 13/04 60/324 |
| 2011/0194987 A1 | 8/2011 | Hodgson et al. |
| 2012/0003955 A1 | 1/2012 | Gabriel |
| 2012/0124983 A1 | 5/2012 | Hong |
| 2012/0204541 A1 | 8/2012 | Li et al. |
| 2012/0204542 A1 | 8/2012 | Norris et al. |
| 2012/0204544 A1 | 8/2012 | Uhrich et al. |
| 2012/0216513 A1 | 8/2012 | Greber et al. |
| 2013/0067891 A1 | 3/2013 | Hittle et al. |
| 2013/0097819 A1 | 4/2013 | Kojima |
| 2013/0333363 A1 | 12/2013 | Joshi et al. |
| 2014/0033686 A1 | 2/2014 | Fischer et al. |
| 2014/0193318 A1 | 7/2014 | Davidson et al. |
| 2014/0230418 A1 | 8/2014 | Perrot et al. |
| 2014/0260209 A1 | 9/2014 | Goss et al. |
| 2014/0325967 A1 | 11/2014 | Kimura |
| 2014/0373721 A1 | 12/2014 | Sandou et al. |
| 2015/0000389 A1 | 1/2015 | Runde et al. |
| 2015/0016214 A1 | 1/2015 | Mueller |
| 2015/0089923 A1 | 4/2015 | Henderson et al. |
| 2015/0110681 A1 | 4/2015 | Ferront et al. |
| 2015/0121855 A1 | 5/2015 | Munnannur et al. |
| 2015/0218996 A1 | 8/2015 | Brandl et al. |
| 2015/0224870 A1 | 8/2015 | Shin et al. |
| 2015/0233276 A1 | 8/2015 | Cassity et al. |
| 2015/0360176 A1 | 12/2015 | Bui et al. |
| 2016/0061090 A1 | 3/2016 | Anand et al. |
| 2016/0069239 A1 | 3/2016 | Freeman et al. |
| 2016/0083060 A1 | 3/2016 | Kassianoff |
| 2016/0090887 A1 | 3/2016 | Mitchell et al. |
| 2016/0115847 A1 | 4/2016 | Chapman et al. |
| 2016/0138454 A1 | 5/2016 | Alano et al. |
| 2016/0158714 A1 | 6/2016 | Li et al. |
| 2016/0175784 A1 | 6/2016 | Harmon et al. |
| 2016/0194991 A1 | 7/2016 | Clayton et al. |
| 2016/0243510 A1 | 8/2016 | Denton et al. |
| 2016/0251990 A1 | 9/2016 | Dimpelfeld et al. |
| 2016/0326931 A1 | 11/2016 | Freeman et al. |
| 2016/0332126 A1 | 11/2016 | Nande et al. |
| 2016/0361694 A1 | 12/2016 | Brandl et al. |
| 2016/0376969 A1* | 12/2016 | Zhang ............... F01N 13/0097 60/311 |
| 2017/0067387 A1 | 3/2017 | Khaled |
| 2017/0089246 A1 | 3/2017 | Greber et al. |
| 2017/0107882 A1 | 4/2017 | Chiruta et al. |
| 2017/0152778 A1 | 6/2017 | Li et al. |
| 2017/0327273 A1 | 11/2017 | Lee et al. |
| 2017/0361273 A1 | 12/2017 | Zoran et al. |
| 2017/0370262 A1 | 12/2017 | Zoran et al. |
| 2018/0078912 A1 | 3/2018 | Yadav et al. |
| 2018/0087428 A1 | 3/2018 | Barr |
| 2018/0142604 A1 | 5/2018 | Niaz |
| 2018/0266300 A1 | 9/2018 | Liu et al. |
| 2018/0306083 A1 | 10/2018 | Sampath et al. |
| 2018/0313247 A1 | 11/2018 | Bauknecht et al. |
| 2019/0063294 A1 | 2/2019 | Johnson et al. |
| 2019/0107025 A1* | 4/2019 | Brinkmeyer ............ B01F 23/21 |
| 2019/0323397 A1* | 10/2019 | Pill ...................... F01N 3/2892 |
| 2020/0102873 A1 | 4/2020 | Ramolivo et al. |
| 2020/0123955 A1 | 4/2020 | Liu et al. |
| 2020/0325811 A1 | 10/2020 | Levin et al. |
| 2020/0332696 A1 | 10/2020 | Chapman et al. |
| 2021/0039056 A1 | 2/2021 | De Rudder et al. |
| 2021/0095587 A1 | 4/2021 | Cvelbar et al. |
| 2021/0301704 A1 | 9/2021 | Hornback |
| 2021/0301710 A1 | 9/2021 | Cvelbar et al. |
| 2021/0363907 A1 | 11/2021 | Poinsot et al. |
| 2021/0404367 A1 | 12/2021 | Alano et al. |
| 2022/0065148 A1 | 3/2022 | Sudries et al. |
| 2022/0090532 A1 | 3/2022 | Degner et al. |
| 2022/0099121 A1 | 3/2022 | Kumar |
| 2022/0162975 A1 | 5/2022 | Cvelbar et al. |
| 2022/0162976 A1 | 5/2022 | Alano et al. |
| 2022/0178296 A1 | 6/2022 | Hogan |
| 2022/0184567 A1 | 6/2022 | Geant |
| 2022/0316382 A1 | 10/2022 | De Rudder |
| 2022/0349330 A1 | 11/2022 | Chapman et al. |
| 2022/0379272 A1 | 12/2022 | Alano |
| 2023/0003159 A1 | 1/2023 | Mittapalli et al. |
| 2023/0141549 A1 | 5/2023 | Kalyanshetti |

FOREIGN PATENT DOCUMENTS

| | | |
|---|---|---|
| CN | 101815851 A | 8/2010 |
| CN | 102242662 A | 11/2011 |
| CN | 103429864 A | 12/2013 |
| CN | 105143628 A | 12/2015 |
| CN | 105612325 A | 5/2016 |
| CN | 105715340 A | 6/2016 |
| CN | 205559030 U | 9/2016 |
| CN | 106321199 A | 1/2017 |
| CN | 106377919 A | 2/2017 |
| CN | 206144632 U | 5/2017 |
| CN | 206144633 U | 5/2017 |
| CN | 106968765 A | 7/2017 |
| CN | 107435576 A | 12/2017 |
| CN | 108194176 A | 6/2018 |
| CN | 108252771 A | 7/2018 |
| CN | 108708781 A | 10/2018 |
| CN | 109414661 A | 3/2019 |
| CN | 109477413 A | 3/2019 |
| CN | 208982145 U | 6/2019 |
| CN | 106014560 B | 7/2019 |
| CN | 209179849 U | 7/2019 |
| CN | 209586479 U | 11/2019 |
| CN | 209855888 U | 12/2019 |
| CN | 110761876 A | 2/2020 |
| CN | 210195855 U | 3/2020 |
| CN | 210686097 U | 6/2020 |
| CN | 210858906 U | 6/2020 |
| CN | 211082028 U | 7/2020 |
| CN | 211116205 U | 7/2020 |
| CN | 211573625 U | 9/2020 |
| CN | 111810276 A | 10/2020 |
| CN | 212130586 U | 12/2020 |
| CN | 212130587 U | 12/2020 |
| CN | 212296579 U | 1/2021 |
| CN | 112483224 A | 3/2021 |
| CN | 212744129 U | 3/2021 |
| CN | 214304014 U | 9/2021 |
| CN | 214836650 U | 11/2021 |
| CN | 214887318 U | 11/2021 |
| CN | 215109110 U | 12/2021 |
| CN | 215719044 U | 2/2022 |
| CN | 215719045 U | 2/2022 |
| CN | 216157745 U | 4/2022 |
| CN | 216617626 U | 5/2022 |
| CN | 217872989 U | 11/2022 |
| DE | 10021166 A1 | 11/2001 |
| DE | 10312212 | 11/2003 |
| DE | 10 2004 043 931 A1 | 3/2006 |
| DE | 10 2010 014 037 A1 | 11/2010 |
| DE | 11 2009 000 650 T5 | 1/2011 |
| DE | 11 2010 002 589 T5 | 11/2012 |
| DE | 10 2014 101 889 | 8/2015 |
| DE | 10 2014 102 798 A1 | 9/2015 |
| DE | 10 2016 222 743 A1 | 5/2017 |
| DE | 10 2016 115 030 A1 | 2/2018 |
| DE | 10 2018 127 387 A1 | 5/2019 |
| DE | 10 2007 051 510 B4 | 2/2021 |
| EP | 0 716 918 A2 | 6/1996 |
| EP | 1 716 917 A1 | 11/2006 |
| EP | 2 151 560 B1 | 2/2010 |
| EP | 2 769 762 A1 | 8/2014 |

(56) References Cited

FOREIGN PATENT DOCUMENTS

| | | |
|---|---|---|
| EP | 2 551 482 B1 | 1/2015 |
| EP | 2 546 488 B1 | 4/2015 |
| EP | 2 551 481 B1 | 8/2015 |
| EP | 3 085 913 A1 | 10/2016 |
| EP | 3 085 915 A1 | 10/2016 |
| EP | 3 085 916 A1 | 10/2016 |
| EP | 3 102 802 A1 | 12/2016 |
| EP | 2 570 178 B1 | 4/2017 |
| EP | 2 522 822 B1 | 6/2017 |
| EP | 2 796 684 B1 | 1/2018 |
| EP | 3 425 180 A1 | 1/2019 |
| EP | 3 699 407 A1 | 8/2020 |
| EP | 3 775 514 A1 | 2/2021 |
| FR | 2965011 A1 | 3/2012 |
| FR | 3010134 A1 | 3/2015 |
| FR | 2984953 B1 | 4/2015 |
| FR | 2977913 B1 | 6/2015 |
| FR | 3020835 A1 | 11/2015 |
| FR | 3020834 B1 | 6/2016 |
| FR | 3020835 B1 | 6/2016 |
| FR | 3098854 B1 | 7/2021 |
| FR | 3097775 B1 | 5/2022 |
| FR | 3102683 B1 | 6/2022 |
| FR | 3111664 B1 | 7/2022 |
| FR | 3110634 B1 | 9/2022 |
| GB | 2 385 545 A | 8/2003 |
| GB | 2 558 311 A | 7/2018 |
| IN | 201921025624 A | 1/2021 |
| JP | 2003-056274 | 2/2003 |
| JP | 2009-156077 A | 7/2009 |
| JP | 2010-180863 A | 8/2010 |
| JP | 2013-133774 A | 7/2013 |
| WO | WO-2009/024815 A2 | 2/2009 |
| WO | WO-2010/146285 A1 | 12/2010 |
| WO | WO-2011/110885 A1 | 9/2011 |
| WO | WO-2012/110720 A1 | 8/2012 |
| WO | WO-2012/123660 A1 | 9/2012 |
| WO | WO-2015/119617 A1 | 8/2015 |
| WO | WO-2016/082850 A1 | 6/2016 |
| WO | WO-2016/111701 A1 | 7/2016 |
| WO | WO-2018/017164 A1 | 1/2018 |
| WO | WO-2018/075061 A1 | 4/2018 |
| WO | WO-2018/226626 A1 | 12/2018 |
| WO | WO-2019/029880 A1 | 2/2019 |
| WO | WO-2019/143373 A1 | 7/2019 |
| WO | WO-2020/009713 A1 | 1/2020 |
| WO | WO-2021/050819 A1 | 3/2021 |
| WO | WO-2021/112826 A1 | 6/2021 |
| WO | WO-2021/113246 A1 | 6/2021 |
| WO | WO-2021/173357 A1 | 9/2021 |
| WO | WO-2021/225824 A1 | 11/2021 |

OTHER PUBLICATIONS

Coanda effect, https://en.wikipedia.org/w/index.php?title=Coand%C4%83_effect&oldid=1000333406 (last visited Mar. 12, 2021).
Combined Search and Examination Report in GB2205057.9, dated May 5, 2022, 6 pages.
Examination Report for U.K. Patent Application No. 1413056.1 issued Sep. 21, 2017.
Examination Report for U.K. Patent Application No. 1805598.8 issued Apr. 24, 2018.
Examination Report for UK Patent Application No. GB 1917608.0 issued Sep. 6, 2021.
Final Office Action for U.S. Appl. No. 17/695,580 issued Feb. 6, 2023.
Final Office Action for U.S. Appl. No. 13/837,446 issued Jan. 5, 2015.
First Examination Report for Indian Patent Application No. 201947050068, issued Jan. 13, 2021.
First Examination Report for Indian Patent Application No. 202147057999, dated Mar. 14, 2022.
First Office Action for Chinese Patent Application No. 201880001223. 6, issued Dec. 17, 2020.
First Office Action for Chinese Patent Applicaiton No. 202210283795. 6, issued Mar. 20, 2023.
Office Action for German Patent Application No. 102014002750.3, issued Jan. 24, 2022.
G. Comes, "Theoretical Modeling, Design and Simulation of an Innovative Diverting Valve Based on Coanda Effect", Fluids 2018, 3, 103, (2018).
International Search Report and Written Opinion in PCT Application No. PCT/US2012/022582 issued Oct. 25, 2012, 6 pages.
International Search Report and Written Opinion in PCT Application No. PCT/US2020/062718 issued Feb. 19, 2021.
International Search Report and Written Opinion in PCT Application No. PCT/IB2019/054988 issued Jan. 29, 2020.
International Search Report and Written Opinion in PCT Application No. PCT/US2021/017551 issued Apr. 28, 2021.
International Search Report and Written Opinion in PCT Application No. PCT/US2022/014781 issued Apr. 25, 2022.
International Search Report and Written Opinion in PCT Application No. PCT/US2021/029282 issued Jul. 27, 2021.
International Search Report in PCT Application No. PCT/US2018/035959, issued Oct. 19, 2018.
Office Action in U.S. Appl. No. 15/657,941 issued Aug. 6, 2019.
Office Action in U.S. Appl. No. 16/618,716 issued Feb. 23, 2021.
Office Action in U.S. Appl. No. 17/400,567 issued May 23, 2022.
Office Action in U.S. Appl. No. 17/695,580 issued Jul. 27, 2022.
Office Action in U.S. Appl. No. 17/923,804 issued Mar. 16, 2023.
Office Action in German Patent Application No. DE 11 2012 005 741.4 issued Dec. 7, 2022, including translation.
Preliminary Office Action in Brazilian Patent Application No. BR1120190253246, issued Apr. 26, 2022.
Search and Examination Report in GB2116026.2 issued Dec. 20, 2021.
International Search Report and Written Opinion in PCT Application No. PCT/US2019/064232 issued Feb. 12, 2020.
Search Report in UK Patent Application No. GB 2101393.3, issued Feb. 22, 2021.
Search Report Letter in UK Patent Application No. GB 2101393.3, issued Feb. 22, 2021.
Office Action in U.S. Appl. No. 13/837,446 issued Aug. 29, 2014.
Office Action in U.S. Appl. No. 14/372,810 issued Mar. 8, 2017.
Office Action in U.S. Appl. No. 14/372,810 issued May 25, 2016.
Written Opinion in PCT Application No. PCT/US2018/035959, dated Oct. 19, 2018.
Extended European Search Report on EP Appl. No. 19955166.4 dated Jul. 10, 2023.
Non-Final Office Action in Design U.S. Appl. No. 29/835,755 issued Oct. 4, 2023.
Office Action in Chinese Patent Application No. 202180016222.0 issued Mar. 17, 2023.
Office Action in Chinese Patent Application No. 202180064965.5 issued Sep. 13, 2023.
Examination Report in UK Patent Application No. GB2305850.6, issued May 26, 2023.
Office Action in U.S. Appl. No. 29/835,777 issued Oct. 4, 2023.
European Search Report in European Patent Application No. 20897056.6 issued Feb. 27, 2024.
International search report and written opinion for PCT Application No. PCT/US 2020/050318 issued Dec. 8, 2020.
Non-Final Office Action in Design U.S. Appl. No. 29/835,777 issued Oct. 4, 2023.

* cited by examiner

EXHAUST GAS AFTERTREATMENT SYSTEM

CROSS-REFERENCE TO RELATED PATENT APPLICATION

This Application is a National Phase Application of PCT Application No. PCT/US2021/056073, filed Oct. 21, 2021, which claims the benefit of U.S. Provisional Patent Application No. 63/104,092, filed Oct. 22, 2020. The contents of these applications are incorporated herein by reference.

TECHNICAL FIELD

The present disclosure relates generally to an exhaust gas aftertreatment system for an internal combustion engine.

BACKGROUND

For an internal combustion engine system, it may be desirable to reduce emissions of certain components in exhaust gas produced by a combustion of fuel. One approach that can be implemented to reduce emissions is to provide exhaust gas to two catalyst members in parallel. However, positioning of the catalyst members and other space claim constraints may result in unequal pressure of the exhaust gas within each catalyst member. This unequal pressure may result in undesirable performance of the internal combustion engine system.

SUMMARY

In one embodiment, an exhaust gas aftertreatment system includes a housing assembly, a first catalyst member, and a second catalyst member. The housing assembly includes an upstream housing, a decomposition housing, a distributing housing, and a catalyst member housing. The upstream housing is centered on an upstream housing axis. The decomposition housing is coupled to the upstream housing and configured to receive exhaust gas from the upstream housing. The distributing housing is coupled to the decomposition housing and configured to receive the exhaust gas from the decomposition housing. The catalyst member housing is coupled to the distributing housing and configured to receive the exhaust gas from the distributing housing. The catalyst member housing is centered on a catalyst member housing axis that is parallel to the upstream housing axis. The first catalyst member extends within the catalyst member housing and is configured to receive, treat, and output a first portion of the exhaust gas. The second catalyst member extends within the catalyst member housing and is configured to receive, treat, and output a second portion of the exhaust gas.

In another embodiment, an exhaust gas aftertreatment system includes a housing assembly, a first catalyst member, and a second catalyst member. The housing assembly includes a catalyst member housing and a flow divider. The catalyst member housing is configured to receive exhaust gas. The flow divider includes a first endcap and a second endcap. The first endcap has a plurality of first apertures defining a first total area. The second endcap has a plurality of second apertures defining a second total area different from the first total area. The first catalyst member extends within the catalyst member housing and is configured to receive, treat, and output a first portion of the exhaust gas. The second catalyst member extends within the catalyst member housing and is configured to receive, treat, and output a second portion of the exhaust gas. The first endcap is positioned over a portion of the first catalyst member. The second endcap is positioned over a portion of the second catalyst member.

In yet another embodiment, an exhaust gas aftertreatment system includes a housing assembly, a first catalyst member, and a second catalyst member. The housing assembly includes a catalyst member housing and a flow divider. The catalyst member housing is centered on a catalyst member housing axis and configured to receive exhaust gas. The flow divider includes a plurality of first apertures and a plurality of second apertures. The first apertures define a first total area. The second apertures define a second total area different from the first total area. The first catalyst member extends within the catalyst member housing and is configured to receive, treat, and output a first portion of the exhaust gas. The first catalyst member receives the first portion of the exhaust gas through the first apertures or outputs the first portion of the exhaust gas through the first apertures. The first catalyst member includes a first catalyst member inlet and a first catalyst member outlet. The first catalyst member inlet is disposed along a catalyst member inlet plane. The catalyst member inlet plane is orthogonal to the catalyst member housing axis. The first catalyst member outlet is disposed along a first catalyst member outlet plane. The first catalyst member outlet plane is orthogonal to the catalyst member housing axis. The first catalyst member outlet plane is separated from the catalyst member inlet plane by a first catalyst member separation length. The second catalyst member extends within the catalyst member housing and is configured to receive, treat, and output a second portion of the exhaust gas. The second catalyst member receives the second portion of the exhaust gas through the second apertures or outputs the second portion of the exhaust gas through the second apertures. The second catalyst member includes a second catalyst member inlet and a second catalyst member outlet. The second catalyst member inlet is disposed along the catalyst member inlet plane. The second catalyst member outlet is disposed along a second catalyst member outlet plane. The second catalyst member outlet plane is orthogonal to the catalyst member housing axis. The second catalyst member outlet plane is separated from the catalyst member inlet plane by a second catalyst member separation length that is equal to between 95% of the first catalyst member separation length and the 105% of the first catalyst member separation length, inclusive.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
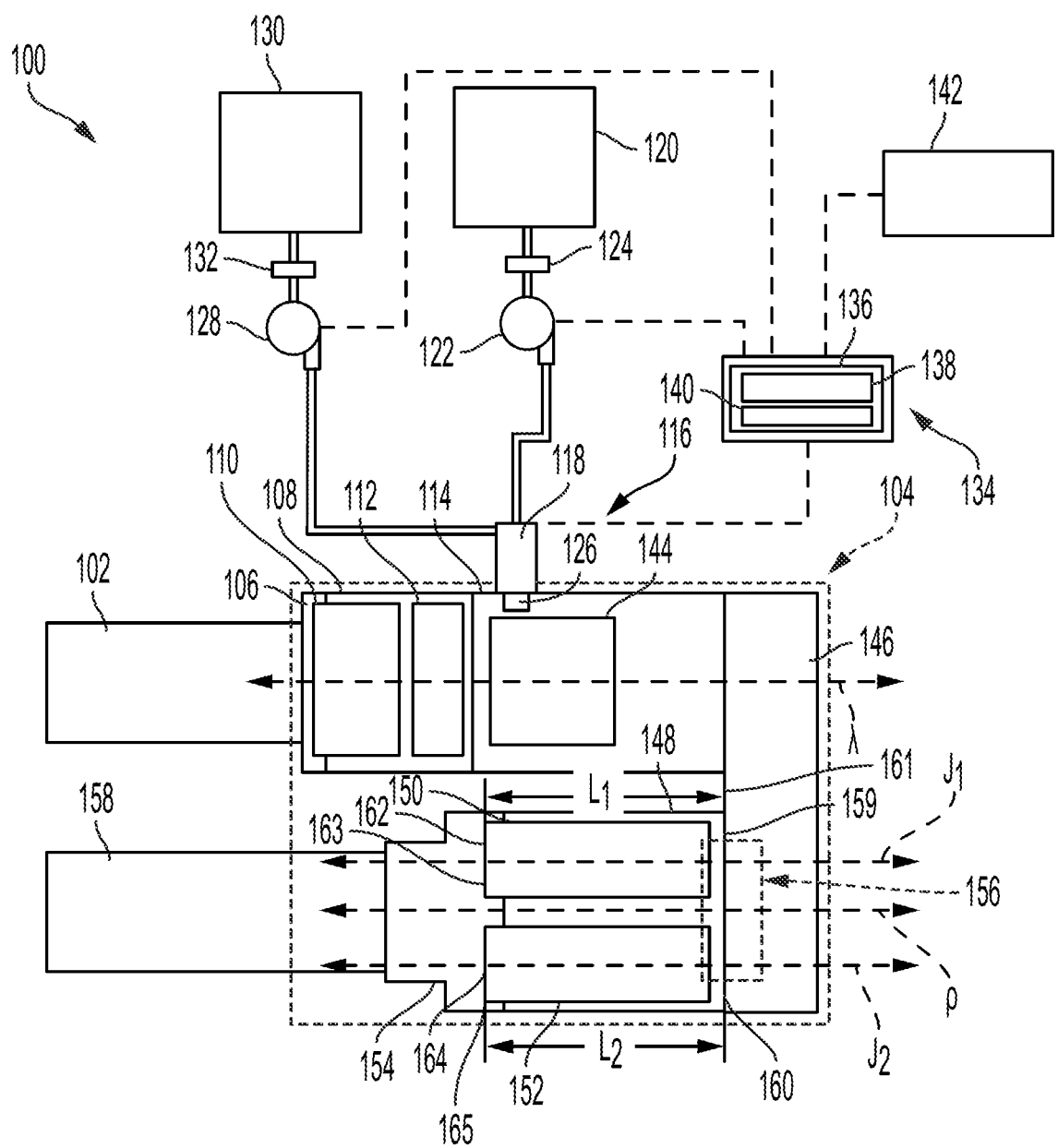
FIG. 1 is a schematic diagram of an example exhaust gas aftertreatment system including a housing assembly with a distributing housing.
Figure 2:
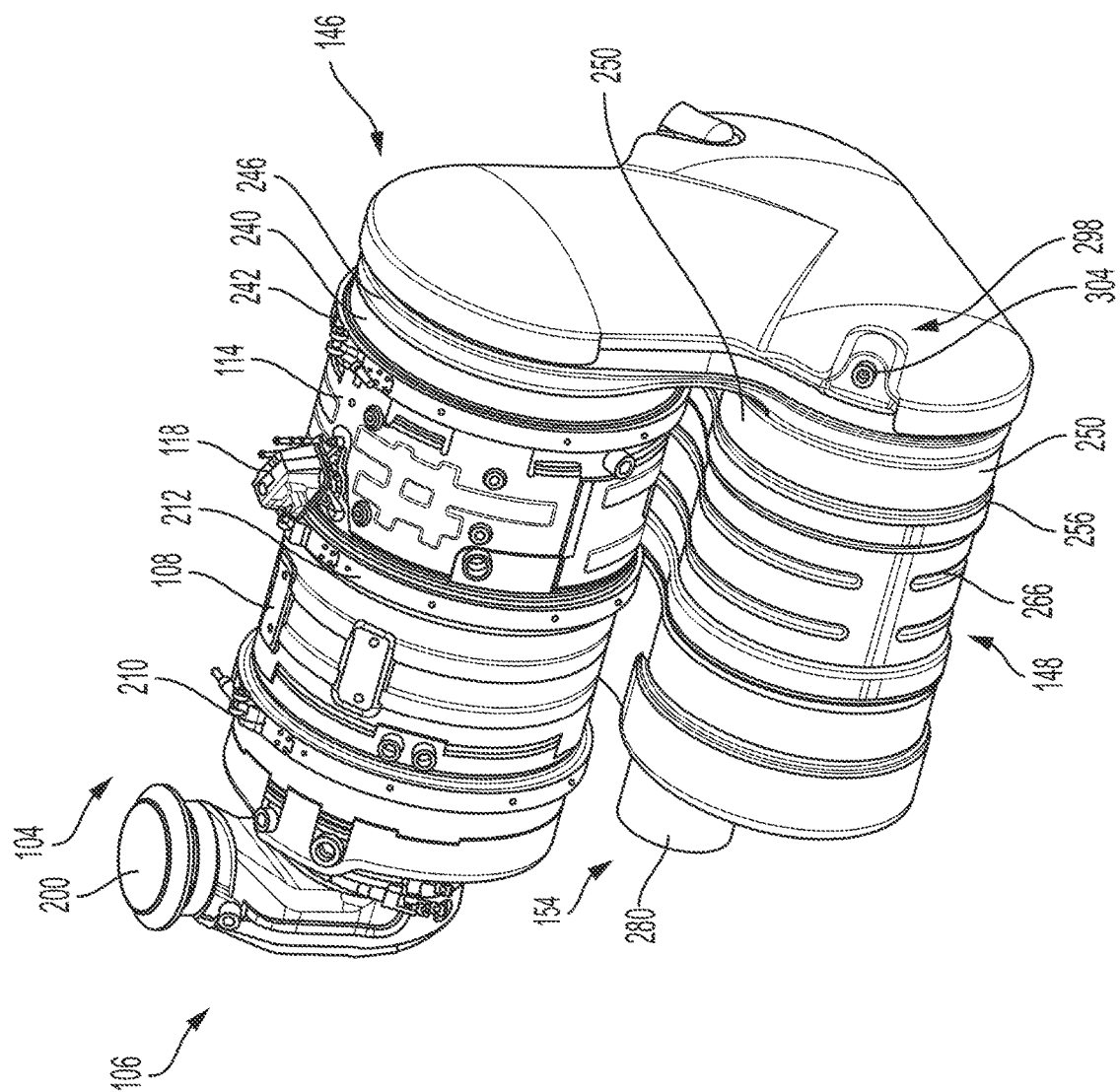
FIG. 2 is a perspective view of an example housing assembly for an exhaust gas aftertreatment system.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing a housing assembly with a flow divider for an exhaust gas aftertreatment system of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

In order to reduce emissions and optimize performance of an internal combustion engine, it may be desirable to improve performance of an exhaust gas aftertreatment systems. For example, increasing flow rate through an exhaust gas aftertreatment system can increase performance of the exhaust gas aftertreatment system, thereby increasing performance of an internal combustion engine having the exhaust gas aftertreatment system. One approach to increasing the flow rate through the exhaust gas aftertreatment system is to incorporate parallel catalyst members. However, use of parallel catalyst members often results in increased backpressure on an internal combustion engine. This increased backpressure can negatively impact performance of the internal combustion engine and make the internal combustion engine less desirable.

Exhaust gas aftertreatment systems are defined by a space claim. The space claim is the amount of physical space that an exhaust gas aftertreatment system consumes when installed (e.g., on a vehicle, etc.) and the location (e.g., coordinates relative to a vehicle coordinate system, etc.) of the physical space that is consumed by the exhaust gas aftertreatment system when installed. In some applications, the physical space available for use by an exhaust gas aftertreatment system is limited due to the locations of surrounding components, wiring or piping requirements, or other similar constraints. As such, it is often difficult to modify an exhaust gas aftertreatment system because such modifications typically increase the space claim of the exhaust gas aftertreatment system. Such modifications may be desired when it is desired to utilize various components, such as different types of dosing modules, in the exhaust gas aftertreatment system.

Implementations described herein are related to an exhaust gas aftertreatment system with a housing assembly that includes a flow divider. The flow divider includes a plurality of first apertures and a plurality of second apertures. Exhaust gas that flows out of a first catalyst member flows through the first apertures while exhaust gas that flows out of a second catalyst member flows through the second apertures. By configuring the flow divider such that a total area of the first apertures and a total area of the second apertures have a target ratio, flow of the exhaust gas through both catalyst members may be balanced, thereby mitigating backpressure on an internal combustion engine having the exhaust gas aftertreatment system. In this way, internal combustion engines utilizing the exhaust gas aftertreatment system described herein are more desirable than other systems which are unable to balance flows of exhaust gas to two catalyst members. Additionally, the exhaust gas aftertreatment system described herein may be arranged such that exhaust gas flows along two parallel axes. In this way, a space claim of the exhaust gas aftertreatment may be significantly smaller than other systems that do not utilize such an arrangement.

II. Overview of First Exhaust Gas Aftertreatment System

FIG. 1 depicts an exhaust gas aftertreatment system 100 (e.g., treatment system, etc.) for treating exhaust gas produced by an internal combustion engine (e.g., diesel internal combustion engine, gasoline internal combustion engine, hybrid internal combustion engine, propane internal combustion engine, dual-fuel internal combustion engine, etc.). The exhaust gas aftertreatment system 100 includes an upstream exhaust gas conduit 102 (e.g., line, pipe, etc.). The upstream exhaust gas conduit 102 is fluidly coupled to an upstream component (e.g., header, exhaust manifold, etc.) and is configured to receive exhaust gas from the upstream component. In some embodiments, the upstream exhaust gas conduit 102 is coupled to (e.g., attached to, fixed to, welded to, fastened to, riveted to, etc.) the internal combustion engine (e.g., the upstream exhaust gas conduit 102 is coupled to an outlet of the internal combustion engine, etc.).

In other embodiments, the upstream exhaust gas conduit 102 is integrally formed with the internal combustion engine.

The exhaust gas aftertreatment system 100 also includes a housing assembly 104. As is explained in more detail herein, the housing assembly 104 is configured to redirect the exhaust gas (e.g., from a first direction to a second direction, etc.) while facilitating treatment of the exhaust gas. In redirecting the exhaust gas, the housing assembly 104 may function as a switchback (e.g., redirecting the exhaust gas from a first direction to a second direction that is opposite to the first direction, redirecting the exhaust gas from a first direction to a second direction that is opposite to the first direction and parallel to the first direction, etc.).

The housing assembly 104 includes an intake body 106 (e.g., chamber, etc.). The intake body 106 is fluidly coupled to the upstream exhaust gas conduit 102 and is configured to receive exhaust gas from the upstream exhaust gas conduit 102. The intake body 106 may be configured to redirect the exhaust gas from a first direction (e.g., extending along a center axis of the upstream exhaust gas conduit 102, etc.) to a second direction (e.g., that is orthogonal to the first direction, etc.).

The housing assembly 104 also includes an upstream housing 108 (e.g., chamber, body, etc.). The upstream housing 108 is fluidly coupled to the intake body 106 and is configured to receive exhaust gas from the intake body 106. In various embodiments, the upstream housing 108 is coupled to the intake body 106. For example, the upstream housing 108 may be fastened (e.g., using a band, using bolts, etc.), welded, riveted, or otherwise attached to the intake body 106. In other embodiments, the upstream housing 108 is integrally formed with (e.g., unitarily formed with, formed as a one-piece construction with, inseparable from, etc.) the intake body 106.

In various embodiments, such as is shown in FIG. 1, the upstream housing 108 is centered on an upstream housing axis λ. In other words, a center point of a cross-section of the upstream housing 108 is disposed on the upstream housing axis λ along a length of the upstream housing 108. The exhaust gas may be provided (e.g., outputted, etc.) through the upstream housing 108 in a direction that is parallel to, or coincident with, the upstream housing axis λ.

In some embodiments, the housing assembly 104 includes a heater (e.g., electrical heater, resistance heater, fluid heat exchanger, etc.) that is configured to heat the exhaust gas within the intake body 106 and/or the upstream housing 108. For example, the housing assembly 104 may include a heater that extends within the intake body 106 and is configured to heat the exhaust gas within the intake body 106. By heating the exhaust gas, an ability of catalyst members to desirably perform catalytic reactions may be increased. Additionally, heating the exhaust gas may facilitate regeneration (e.g., burn-off of particulates, etc.) of various components of the exhaust gas aftertreatment system 100.

The exhaust gas aftertreatment system 100 also includes an oxidation catalyst 110 (e.g., a diesel oxidation catalyst (DOC), etc.). At least a portion of the oxidation catalyst 110 is positioned within (e.g., contained within, housed within, located in, etc.) the upstream housing 108. In various embodiments, the oxidation catalyst 110 is positioned within the upstream housing 108 and the intake body 106. In other embodiments, the oxidation catalyst 110 is positioned within the upstream housing 108 and is not positioned within the intake body 106. In still other embodiments, the oxidation catalyst 110 is positioned within the intake body 106 and is not positioned within the upstream housing 108.

The exhaust gas is provided by the intake body 106 to the oxidation catalyst 110. The oxidation catalyst 110 may be configured to oxidize hydrocarbons and/or carbon monoxide in the exhaust gas. In this way, the oxidation catalyst 110 may remove hydrocarbons and/or carbon monoxide from the exhaust gas prior to the exhaust gas being provided to downstream components of the exhaust gas aftertreatment system 100. The oxidation catalyst 110 may be positioned within the intake body 106 and/or the upstream housing 108 (e.g., using a gasket, using a spacer, using a seal, etc.) such that flow of the exhaust gas between the oxidation catalyst and the intake body 106 and/or between the oxidation catalyst 110 and the upstream housing 108 is substantially prevented (e.g., less than 1% of the exhaust gas flow received by the intake body 106 flows between the oxidation catalyst 110 and the intake body 106, less than 1% of the exhaust gas flow received by the intake body 106 flows between the oxidation catalyst 110 and the upstream housing 108, etc.).

In some embodiments, the oxidation catalyst 110 is centered on the upstream housing axis λ. For example, where a diameter of the oxidation catalyst 110 is approximately (e.g., within 5% of, etc.) equal to a diameter of the upstream housing 108, a center point of a cross-section of the oxidation catalyst 110 may be disposed on the upstream housing axis λ along a length of the oxidation catalyst 110. The exhaust gas may be provided through the oxidation catalyst 110 in a direction that is parallel to, or coincident with, the upstream housing axis λ.

The exhaust gas aftertreatment system 100 also includes a exhaust gas filtration device 112 (e.g., a diesel particulate filter (DPF), etc.). The exhaust gas filtration device 112 is positioned within the upstream housing 108 downstream of the oxidation catalyst 110. The exhaust gas is provided by the oxidation catalyst 110 into the upstream housing 108 (e.g., between the oxidation catalyst 110, the upstream housing 108, and the exhaust gas filtration device 112, etc.) and subsequently into the exhaust gas filtration device 112 (e.g., after hydrocarbons in the exhaust gas have been oxidized by the oxidation catalyst 110, after carbon monoxide in the exhaust gas has been oxidized by the oxidation catalyst 110, etc.). The exhaust gas filtration device 112 may remove particulates (e.g., soot, etc.) from the exhaust gas prior to the exhaust gas being provided to downstream components of the exhaust gas aftertreatment system 100. The exhaust gas filtration device 112 may be positioned within the upstream housing 108 (e.g., using a gasket, using a spacer, using a seal, etc.) such that flow of the exhaust gas between the exhaust gas filtration device 112 and the upstream housing 108 is substantially prevented (e.g., less than 1% of the exhaust gas flow received by the intake body 106 flows between the exhaust gas filtration device 112 and the upstream housing 108, etc.).

In some embodiments, the exhaust gas filtration device 112 is centered on the upstream housing axis λ. For example, where a diameter of the exhaust gas filtration device 112 is approximately equal to a diameter of the upstream housing 108, a center point of a cross-section of the exhaust gas filtration device 112 may be disposed on the upstream housing axis λ along a length of the exhaust gas filtration device 112. The exhaust gas may be provided through the exhaust gas filtration device 112 in a direction that is parallel to, or coincident with, the upstream housing axis λ.

The housing assembly 104 also includes a decomposition housing 114 (e.g., decomposition reactor, decomposition chamber, reactor pipe, decomposition tube, reactor tube, etc.). The decomposition housing 114 is fluidly coupled to the upstream housing 108 and is configured to receive exhaust gas from the upstream housing 108. In various embodiments, the decomposition housing 114 is coupled to the upstream housing 108. For example, the decomposition housing 114 may be fastened (e.g., using a band, using bolts, etc.), welded, riveted, or otherwise attached to the upstream housing 108. In other embodiments, the decomposition housing 114 is integrally formed with the upstream housing 108.

Figure 12:
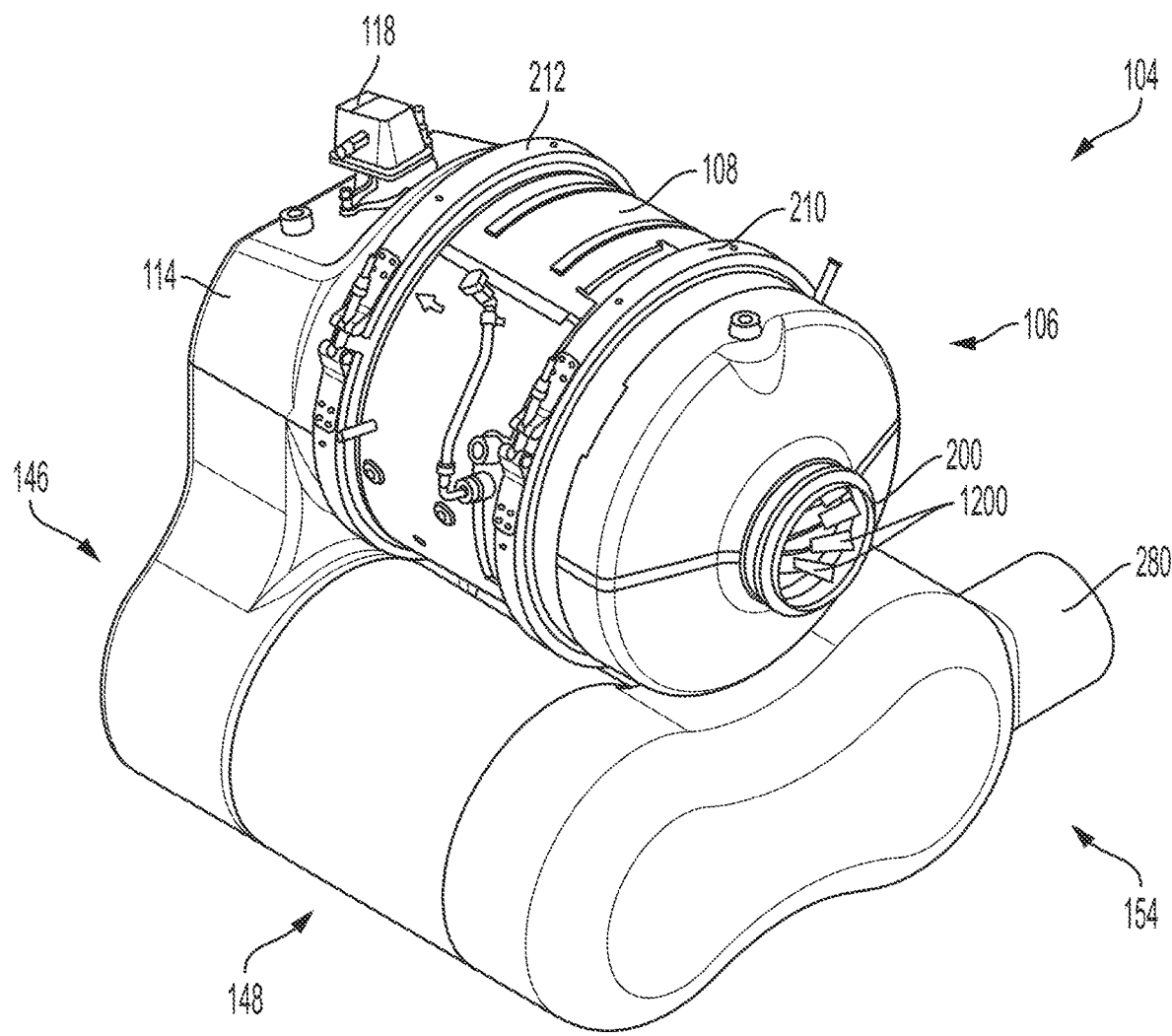
FIG. 12 is a perspective view of yet another example housing assembly.

In various embodiments, such as is shown in FIGS. 2 and 5-8, the decomposition housing 114 is centered on the upstream housing axis λ. For example, where a diameter of the decomposition housing 114 is approximately equal to a diameter of the upstream housing 108, a center point of a cross-section of the decomposition housing 114 may be disposed on the upstream housing axis λ along a length of the decomposition housing 114. The exhaust gas may be provided through the decomposition housing 114 in a direction that is parallel to, or coincident with, the upstream housing axis λ. In other embodiments, such as is shown in FIG. 12, the decomposition housing 114 is not centered on the upstream housing axis λ.

The decomposition housing 114 is located downstream of the exhaust gas filtration device 112 and receives the exhaust gas from the exhaust gas filtration device 112 (e.g., after particulates have been removed from the exhaust gas by the exhaust gas filtration device 112, etc.). As is explained in more detail herein, the decomposition housing 114 is configured to facilitate introduction of reductant (e.g., diesel exhaust fluid (DEF), Adblue®, a urea-water solution (UWS), an aqueous urea solution (e.g., AUS32, etc.), into the exhaust gas, so as to facilitate reduction of emission of undesirable components (e.g., nitrogen oxides ($NO_x$), etc.) in the exhaust gas.

The exhaust gas aftertreatment system 100 also includes a reductant delivery system 116. As is explained in more detail herein, the reductant delivery system 116 is configured to facilitate the introduction of the reductant into the exhaust gas. The reductant delivery system 116 includes a dosing module 118 (e.g., doser, etc.). The dosing module 118 is configured to facilitate passage of the reductant through the decomposition housing 114 and into the decomposition housing 114. As is explained in more detail herein, the dosing module 118 is configured to receive reductant, and in some embodiments, configured to receive air and reductant, and provide the reductant and/or air-reductant mixture into the decomposition housing 114 to facilitate treatment of the exhaust gas. The dosing module 118 may include an insulator interposed between a portion of the dosing module 118 and the portion of the decomposition housing 114 on which the dosing module 118 is mounted. In various embodiments, the dosing module 118 is coupled to the decomposition housing 114.

The reductant delivery system 116 also includes a reductant source 120 (e.g., reductant tank, etc.). The reductant source 120 is configured to contain reductant. The reductant source 120 is fluidly coupled to the dosing module 118 and configured to provide the reductant to the dosing module 118. The reductant source 120 may include multiple reductant sources 120 (e.g., multiple tanks connected in series or in parallel, etc.). The reductant source 120 may be, for example, a diesel exhaust fluid tank containing Adblue®.

The reductant delivery system 116 also includes a reductant pump 122 (e.g., supply unit, etc.). The reductant pump 122 is fluidly coupled to the reductant source 120 and the dosing module 118 and configured to receive the reductant from the reductant source 120 and to provide the reductant to the dosing module 118. The reductant pump 122 is used to pressurize the reductant from the reductant source 120 for delivery to the dosing module 118. In some embodiments, the reductant pump 122 is pressure controlled. In some embodiments, the reductant pump 122 is coupled to a chassis of a vehicle associated with the exhaust gas aftertreatment system 100.

In some embodiments, the reductant delivery system 116 also includes a reductant filter 124. The reductant filter 124 is fluidly coupled to the reductant source 120 and the reductant pump 122 and is configured to receive the reductant from the reductant source 120 and to provide the reductant to the reductant pump 122. The reductant filter 124 filters the reductant prior to the reductant being provided to internal components of the reductant pump 122. For example, the reductant filter 124 may inhibit or prevent the transmission of solids to the internal components of the reductant pump 122. In this way, the reductant filter 124 may facilitate prolonged desirable operation of the reductant pump 122.

The dosing module 118 includes at least one injector 126 (e.g., insertion device, etc.). The injector 126 is fluidly coupled to the reductant pump 122 and configured to receive the reductant from the reductant pump 122. The injector 126 is configured to dose (e.g., inject, insert, etc.) the reductant received by the dosing module 118 into the exhaust gas within the decomposition housing 114.

In some embodiments, the reductant delivery system 116 also includes an air pump 128 and an air source 130 (e.g., air intake, etc.). The air pump 128 is fluidly coupled to the air source 130 and is configured to receive air from the air source 130. The air pump 128 is fluidly coupled to the dosing module 118 and is configured to provide the air to the dosing module 118. The dosing module 118 is configured to mix the air and the reductant into an air-reductant mixture and to provide the air-reductant mixture to the injector 126 (e.g., for dosing into the exhaust gas within the decomposition housing 114, etc.). The injector 126 is fluidly coupled to the air pump 128 and configured to receive the air from the air pump 128. The injector 126 is configured to dose the air-reductant mixture into the exhaust gas within the decomposition housing 114. In some of these embodiments, the reductant delivery system 116 also includes an air filter 132. The air filter 132 is fluidly coupled to the air source 130 and the air pump 128 and is configured to receive the air from the air source 130 and to provide the air to the air pump 128. The air filter 132 is configured to filter the air prior to the air being provided to the air pump 128. In other embodiments, the reductant delivery system 116 does not include the air pump 128 and/or the reductant delivery system 116 does not include the air source 130. In such embodiments, the dosing module 118 is not configured to mix the reductant with air.

In various embodiments, the dosing module 118 is configured to receive air and reductant, and doses the air-reductant mixture into the decomposition housing 114. In various embodiments, the dosing module 118 is configured to receive reductant (and does not receive air), and doses the reductant into the decomposition housing 114. In various embodiments, the dosing module 118 is configured to receive reductant, and doses the reductant into the decomposition housing 114. In various embodiments, the dosing module 118 is configured to receive air and reductant, and doses the air-reductant mixture into the decomposition housing 114.

The exhaust gas aftertreatment system 100 also includes a controller 134 (e.g., control circuit, driver, etc.). The dosing module 118, the reductant pump 122, and the air pump 128 are also electrically or communicatively coupled to the controller 134. The controller 134 is configured to control the dosing module 118 to dose the reductant and/or the air-reductant mixture into the decomposition housing 114. The controller 134 may also be configured to control the reductant pump 122 and/or the air pump 128 in order to control the reductant and/or the air-reductant mixture that is dosed into the decomposition housing 114.

The controller 134 includes a processing circuit 136. The processing circuit 136 includes a processor 138 and a memory 140. The processor 138 may include a microprocessor, an application-specific integrated circuit (ASIC), a field-programmable gate array (FPGA), etc., or combinations thereof. The memory 140 may include, but is not limited to, electronic, optical, magnetic, or any other storage or transmission device capable of providing a processor, ASIC, FPGA, etc. with program instructions. This memory 140 may include a memory chip, Electrically Erasable Programmable Read-Only Memory (EEPROM), Erasable Programmable Read Only Memory (EPROM), flash memory, or any other suitable memory from which the controller 134 can read instructions. The instructions may include code from any suitable programming language. The memory 140 may include various modules that include instructions which are configured to be implemented by the processor 138.

In various embodiments, the controller 134 is configured to communicate with a central controller 142 (e.g., engine control unit (ECU), engine control module (ECM), etc.) of an internal combustion engine having the exhaust gas aftertreatment system 100. In some embodiments, the central controller 142 and the controller 134 are integrated into a single controller.

In some embodiments, the central controller 142 is communicable with a display device (e.g., screen, monitor, touch screen, heads up display (HUD), indicator light, etc.). The display device may be configured to change state in response to receiving information from the central controller 142. For example, the display device may be configured to change between a static state and an alarm state based on a communication from the central controller 142. By changing state, the display device may provide an indication to a user of a status of the reductant delivery system 116.

In various embodiments, the exhaust gas aftertreatment system 100 also includes a mixer 144 (e.g., a swirl generating device, a vaned plate, etc., etc.). At least a portion of the mixer 144 is positioned within the decomposition housing 114. The mixer 144 is configured to receive the exhaust gas from the exhaust gas filtration device 112 (e.g., after particulates have been removed from the exhaust gas by the exhaust gas filtration device 112, etc.). The mixer 144 is also configured to the reductant and/or the air-reductant mixture from the injector 126. The mixer 144 is configured to facilitate swirling (e.g., tumbling, rotation, etc.) of the exhaust gas and mixing (e.g., combination, etc.) of the exhaust gas and the reductant or the air-reductant mixture so as to disperse the reductant within the exhaust gas downstream of the mixer 144. By dispersing the reductant within the exhaust gas (e.g., to obtain an increased uniformity index, etc.) using the mixer 144, reduction of emission of undesirable components in the exhaust gas is enhanced.

The housing assembly 104 also includes a distributing housing 146 (e.g., pressure regulator, flow plenum, flow balancer, flow balancing system, etc.). The distributing housing 146 is fluidly coupled to the decomposition housing 114 and is configured to receive exhaust gas from the decomposition housing 114 (e.g., after the reductant has been provided into the exhaust gas by the injector 126 and the reductant and the exhaust gas have been mixed by the mixer 144, etc.). In various embodiments, the distributing housing 146 is coupled to the decomposition housing 114. For example, the distributing housing 146 may be fastened, welded, riveted, or otherwise attached to the decomposition housing 114. In other embodiments, the distributing housing 146 is integrally formed with the decomposition housing 114.

The housing assembly 104 also includes a catalyst member housing 148 (e.g., body, etc.). The catalyst member housing 148 is fluidly coupled to the distributing housing 146 and is configured to receive exhaust gas from the distributing housing 146. In various embodiments, the catalyst member housing 148 is coupled to the distributing housing 146. For example, the catalyst member housing 148 may be fastened, welded, riveted, or otherwise attached to the distributing housing 146. In other embodiments, the catalyst member housing 148 is integrally formed with the distributing housing 146. The catalyst member housing 148 is located downstream of the distributing housing 146 and receives the exhaust gas from the distributing housing 146.

In various embodiments, such as is shown in FIG. 1, the catalyst member housing 148 is centered on a catalyst member housing axis $\rho$. In other words, a center point of a cross-section of the catalyst member housing 148 is disposed on the catalyst member housing axis $\rho$ along a length of the catalyst member housing 148. The exhaust gas may be provided through the catalyst member housing 148 in a direction that is parallel to, or coincident with, the catalyst member housing axis $\rho$.

In various embodiments, the catalyst member housing axis $\rho$ is approximately parallel to the upstream housing axis $\lambda$ (e.g., when measured on a plane along which the catalyst member housing axis $\rho$ and the upstream housing axis $\lambda$ both extend, etc.). In these embodiments, the catalyst member housing axis $\rho$ is separated from the upstream housing axis $\lambda$. The distributing housing 146 functions to redirect the exhaust gas approximately 180° (e.g., from a first direction along the upstream housing axis $\lambda$ to a second direction along the catalyst member housing axis $\rho$ that is separated from the first direction by approximately 180°, etc.). As a result of this arrangement, a length of the housing assembly 104 along the upstream housing axis $\lambda$ and/or a length of the housing assembly 104 along the catalyst member housing axis $\rho$ is significantly shorter than if, for example, the catalyst member housing axis $\rho$ was not separated from the upstream housing axis $\lambda$, the catalyst member housing axis $\rho$ was not approximately parallel to the upstream housing axis $\lambda$, and/or the distributing housing 146 did not function to redirect the exhaust gas approximately 180°. By decreasing a length of the housing assembly 104, a space claim of the housing assembly 104 may be reduced. As a result of having a reduced space claim, the housing assembly 104 may be capable of use in various applications where other aftertreatment systems would be incompatible (e.g., due to these other aftertreatment systems having excessive space claims, etc.).

The exhaust gas aftertreatment system 100 also includes a first catalyst member 150 (e.g., first selective catalytic reduction (SCR) catalyst member, etc.). The first catalyst member 150 is configured to receive, treat, and output a first portion of the exhaust gas output by the distributing housing 146. At least a portion of the first catalyst member 150 is positioned within the catalyst member housing 148. A first portion of the exhaust gas received by the distributing housing 146 is provided by the distributing housing 146 to the first catalyst member 150 (e.g., via the catalyst member housing 148, etc.). As is explained in more detail herein, the first catalyst member 150 is configured to cause decomposition of components of the exhaust gas using the reductant (e.g., via catalytic reactions, etc.). Specifically, reductant that has been provided into the exhaust gas by the injector 126 undergoes the processes of evaporation, thermolysis, and hydrolysis to form non-$NO_x$ emissions within the distributing housing 146, the catalyst member housing 148, the first catalyst member 150, and/or the housing assembly 104. The first catalyst member 150 is configured to assist in the reduction of $NO_x$ emissions by accelerating a $NO_x$ reduction process between the reductant and the $NO_x$ of the exhaust gas into diatomic nitrogen, water, and/or carbon dioxide.

In various embodiments, such as is shown in FIG. 1, the first catalyst member 150 is centered on a first catalyst member axis $J_1$. In other words, a center point of a cross-section of the first catalyst member 150 is disposed on the first catalyst member axis $J_1$ along a length of the first catalyst member 150. The exhaust gas may be provided through the first catalyst member 150 in a direction that is parallel to, or coincident with, the first catalyst member axis $J_1$. In various embodiments, the first catalyst member axis $J_1$ is approximately parallel to the upstream housing axis $\lambda$ (e.g., when measured on a plane along which the first catalyst member axis $J_1$ and the upstream housing axis $\lambda$ both extend, etc.). In these embodiments, the first catalyst member axis $J_1$ is separated from the upstream housing axis $\lambda$.

The first catalyst member 150 also includes a first catalyst material 151 (e.g., catalyst metals, etc.). The first catalyst material 151 may include, for example, platinum, rhodium, palladium, or other similar materials. The first catalyst material 151 is configured to assist in the reduction of $NO_x$ emissions by accelerating a $NO_x$ reduction process between the reductant and the $NO_x$ of the exhaust gas into diatomic nitrogen, water, and/or carbon dioxide. In some embodiments, the first catalyst material 151 is a ceramic catalyst material. In some embodiments, the first catalyst material 151 is an extruded catalyst material.

The exhaust gas aftertreatment system 100 also includes a second catalyst member 152 (e.g., second SCR catalyst member, etc.). The second catalyst member 152 is configured to receive, treat, and output a second portion of the exhaust gas output by the distributing housing 146. At least a portion of the second catalyst member 152 is positioned within the catalyst member housing 148. A second portion of the exhaust gas received by the distributing housing 146 is provided by the distributing housing 146 to the second catalyst member 152 (e.g., via the catalyst member housing 148, etc.). The second catalyst member 152 receives the second portion of the exhaust gas separately from the first portion of the exhaust gas that is received by the first catalyst member 150. As is explained in more detail herein, the second catalyst member 152 is configured to cause decomposition of components of the exhaust gas using the reductant (e.g., via catalytic reactions, etc.). Specifically, reductant that has been provided into the exhaust gas by the injector 126 undergoes the processes of evaporation, thermolysis, and hydrolysis to form non-$NO_x$ emissions within the distributing housing 146, the catalyst member housing 148, the second catalyst member 152, and/or the housing assembly 104. The second catalyst member 152 is configured to assist in the reduction of $NO_x$ emissions by accelerating a $NO_x$ reduction process between the reductant and the $NO_x$ of the exhaust gas into diatomic nitrogen, water, and/or carbon dioxide.

In various embodiments, such as is shown in FIG. 1, the second catalyst member 152 is centered on a second catalyst member axis $J_2$. In other words, a center point of a cross-section of the second catalyst member 152 is disposed on the second catalyst member axis $J_2$ along a length of the second catalyst member 152. The exhaust gas may be provided through the second catalyst member 152 in a direction that is parallel to, or coincident with, the second catalyst member axis $J_2$. In various embodiments, the second catalyst member axis $J_2$ is approximately parallel to the upstream housing axis $\lambda$ (e.g., when measured on a plane along which the second catalyst member axis $J_2$ and the upstream housing axis $\lambda$ both extend, etc.). In these embodiments, the second catalyst member axis $J_2$ is separated from the upstream housing axis $\lambda$.

The second catalyst member 152 also includes a second catalyst material 153 (e.g., catalyst metals, etc.). The second catalyst material 153 may include, for example, platinum, rhodium, palladium, or other similar materials. The second catalyst material 153 is configured to assist in the reduction of $NO_x$ emissions by accelerating a $NO_x$ reduction process between the reductant and the $NO_x$ of the exhaust gas into diatomic nitrogen, water, and/or carbon dioxide. In some embodiments, the second catalyst material 153 is a ceramic catalyst material. In some embodiments, the second catalyst material 153 is an extruded catalyst material.

The first portion of the exhaust gas is routed through the first catalyst member 150 in parallel with the second portion of the exhaust gas which is routed through the second catalyst member 152. By routing the first portion of the exhaust gas through the first catalyst member 150 and the second portion of the exhaust gas through the second catalyst member 152 in parallel, reduction of emission of undesirable components in the exhaust gas is more desirable. For example, the parallel routing of the exhaust gas through the first catalyst member 150 and the second catalyst member 152 may provide an increased capacity of the exhaust gas aftertreatment system 100 to treat exhaust gas and/or an increased efficiency of the exhaust gas aftertreatment system 100 in treating exhaust gas, when compared to other aftertreatment systems that do not include two catalysts and that do not route exhaust gas through the two catalysts in parallel.

The housing assembly 104 also includes an outlet housing 154 (e.g., body, etc.). The outlet housing 154 is fluidly coupled to the catalyst member housing 148 and is configured to receive exhaust gas from the catalyst member housing 148, the first catalyst member 150, and/or the second catalyst member 152. In various embodiments, the outlet housing 154 is coupled to the catalyst member housing 148. For example, the outlet housing 154 may be fastened, welded, riveted, or otherwise attached to the catalyst member housing 148. In other embodiments, the outlet housing 154 is integrally formed with the catalyst member housing 148.

The outlet housing 154 is located downstream of the catalyst member housing 148 and receives the first portion of the exhaust gas after flowing through the first catalyst member 150 and the second portion of the exhaust gas after flowing through the second catalyst member 152. In some embodiments, at least a portion of the first catalyst member 150 is positioned within the outlet housing 154 and/or at least a portion of the second catalyst member 152 is positioned within the outlet housing 154.

In various embodiments, the housing assembly 104 also includes a flow divider 156 (e.g., flow splitter, stream partition, etc.). The flow divider 156 is configured to balance (e.g., equalize, evenly divide, etc.) the first portion of the exhaust gas provided by the first catalyst member 150 to the outlet housing 154 and the second portion of the exhaust gas provided by the second catalyst member 152 to the outlet housing 154. For example, the first portion may be balanced with the second portion when a first parameter (e.g., flow rate, mass flow rate, volumetric flow rate, velocity, pressure, etc.) of the first portion is approximately equal to the second parameter (e.g., flow rate, mass flow rate, volumetric flow rate, velocity, pressure, etc.). By balancing the first portion and the second portion, reduction of emission of undesirable components in the exhaust gas is more desirable. For example, balancing the first portion and the second portion may decrease a backpressure of the exhaust gas aftertreatment system 100, thereby increasing an efficiency and/or output of an internal combustion engine having the exhaust gas aftertreatment system 100.

In some embodiments, the flow divider 156 is located upstream of the first catalyst member 150 and/or the second catalyst member 152. For example, the flow divider 156 may be located within the distributing housing 146. In this example, the flow divider 156 may separate a first portion of the exhaust gas provided to the first catalyst member 150 from a second portion of the exhaust gas provided to the second catalyst member 152 after balancing the first portion and the second portion. In another example, a portion of the flow divider 156 may be coupled to an inlet of the first catalyst member 150 and another portion of the flow divider 156 may be coupled to an inlet of the second catalyst member 152.

In some embodiments, the flow divider 156 is located downstream of the first catalyst member 150 and/or the second catalyst member 152. For example, a portion of the flow divider 156 may be coupled to an outlet of the first catalyst member 150 and another portion of the flow divider 156 may be coupled to an outlet of the second catalyst member 152.

The exhaust gas aftertreatment system 100 also includes a downstream exhaust gas conduit 158 (e.g., line, pipe, etc.). The downstream exhaust gas conduit 158 is fluidly coupled to the outlet housing 154 and is configured to receive the exhaust gas from the outlet housing 154. In some embodiments, the downstream exhaust gas conduit 158 is coupled to the outlet housing 154. In other embodiments, the downstream exhaust gas conduit 158 is integrally formed with the outlet housing 154.

The first catalyst member 150 includes a first catalyst member inlet 159. The second catalyst member 152 includes a second catalyst member inlet 160. The first catalyst member inlet 159 and the second catalyst member inlet 160 are located where the first portion of the exhaust gas (e.g., that is received, treated, and output by the first catalyst member 150, etc.) and the second portion of the exhaust gas (e.g., that is received, treated, and output by the second catalyst member 152, etc.) are separated. The first catalyst member inlet 159 and the second catalyst member inlet 160 are disposed along a catalyst member inlet plane 161.

The first catalyst member 150 also includes a first catalyst member outlet 162. The first catalyst member outlet 162 is located at an average location along the first catalyst member axis $J_1$ at which the first portion is output from the first catalyst material 151 (e.g., where the flow divider 156 is upstream of the first catalyst material 151, etc.) or the flow divider 156 (e.g., where the flow divider 156 is downstream of the first catalyst material 151, etc.). The first catalyst member outlet 162 is disposed along a first catalyst member outlet plane 163. The first catalyst member outlet plane 163 is orthogonal to the first catalyst member axis $J_1$.

The first catalyst member 150 is also defined by a first catalyst member separation length $L_1$ from the catalyst member inlet plane 161 to the first catalyst member outlet plane 163. By minimizing the first catalyst member separation length $L_1$, a length of the housing assembly 104 along the first catalyst member axis $J_1$ may be decreased. As a result, a space claim of the housing assembly 104 may be decreased, thus making the housing assembly 104 more desirable.

The second catalyst member 152 also includes a second catalyst member outlet 164. The second catalyst member outlet 164 is located at an average location along the second catalyst member axis $J_2$ at which the second portion is output from the second catalyst material 153 (e.g., where the flow divider 156 is upstream of the second catalyst material 153, etc.) or the flow divider 156 (e.g., where the flow divider 156 is downstream of the second catalyst material 153, etc.). The second catalyst member outlet 164 is disposed along a second catalyst member outlet plane 165. The second catalyst member outlet plane 165 is orthogonal to the second catalyst member axis $J_2$.

The second catalyst member 152 is also defined by a second catalyst member separation length $L_2$ from the catalyst member inlet plane 161 to the second catalyst member outlet plane 165. By minimizing the second catalyst member separation length $L_2$, a length of the housing assembly 104 along the second catalyst member axis $J_2$ may be decreased. As a result, a space claim of the housing assembly 104 may be decreased, thus making the housing assembly 104 more desirable.

In contrast to the catalyst member inlet plane 161, which is the same for both the first catalyst member 150 and the second catalyst member 152, the first catalyst member outlet plane 163 is specific to the first catalyst member 150 and the second catalyst member outlet plane 165 is specific to the second catalyst member 152. As a result, the first catalyst member separation length $L_1$ and the second catalyst member separation length $L_2$ may differ.

By minimizing a difference between the first catalyst member separation length $L_1$ and the second catalyst member separation length $L_2$, and minimizing both the first catalyst member separation length $L_1$ and the second catalyst member separation length $L_2$, the space claim of the housing assembly 104 is minimized. The desirability of the housing assembly 104 may increase as the space claim of the housing assembly 104 decreases (e.g., due to an ability of the housing assembly 104 to be utilized in a larger number of applications, etc.). The flow divider 156 functions to minimize backpressure that would otherwise increase as the difference between the first catalyst member separation length $L_1$ and the second catalyst member separation length $L_2$ decreases. In systems without a flow divider, the flow of exhaust through parallel catalysts cannot be balanced and the catalysts have to be differently located so as to mitigate excessive backpressure. Through the use of the flow divider 156 to balance the flow of the exhaust gas out of the first catalyst member 150 with the flow of the exhaust gas out of the second catalyst member 152, the first catalyst member separation length $L_1$ can be the same as the second catalyst member separation length $L_2$ without providing excess backpressure.

While the exhaust gas aftertreatment system 100 has been shown and described in the context of use with a diesel internal combustion engine, it is understood that the exhaust gas aftertreatment system 100 may be used with other internal combustion engines, such as gasoline internal combustion engines, hybrid internal combustion engines, propane internal combustion engines, dual-fuel internal combustion engines, and other similar internal combustion engines.

III. Example Housing Assemblies for the First Exhaust Gas Aftertreatment System FIGS. 2-12 illustrate the housing assembly 104 according to various embodiments. The intake body 106 includes an intake body inlet 200 (e.g., fitting, connector, etc.). The intake body inlet 200 is coupled to or integrally formed with the upstream exhaust gas conduit 102. For example, the upstream exhaust gas conduit 102 may be inserted into the intake body inlet 200 and the intake body inlet 200 may be coupled to the upstream exhaust gas conduit 102 using a clamp (e.g., band clamp, etc.).

Figure 8:
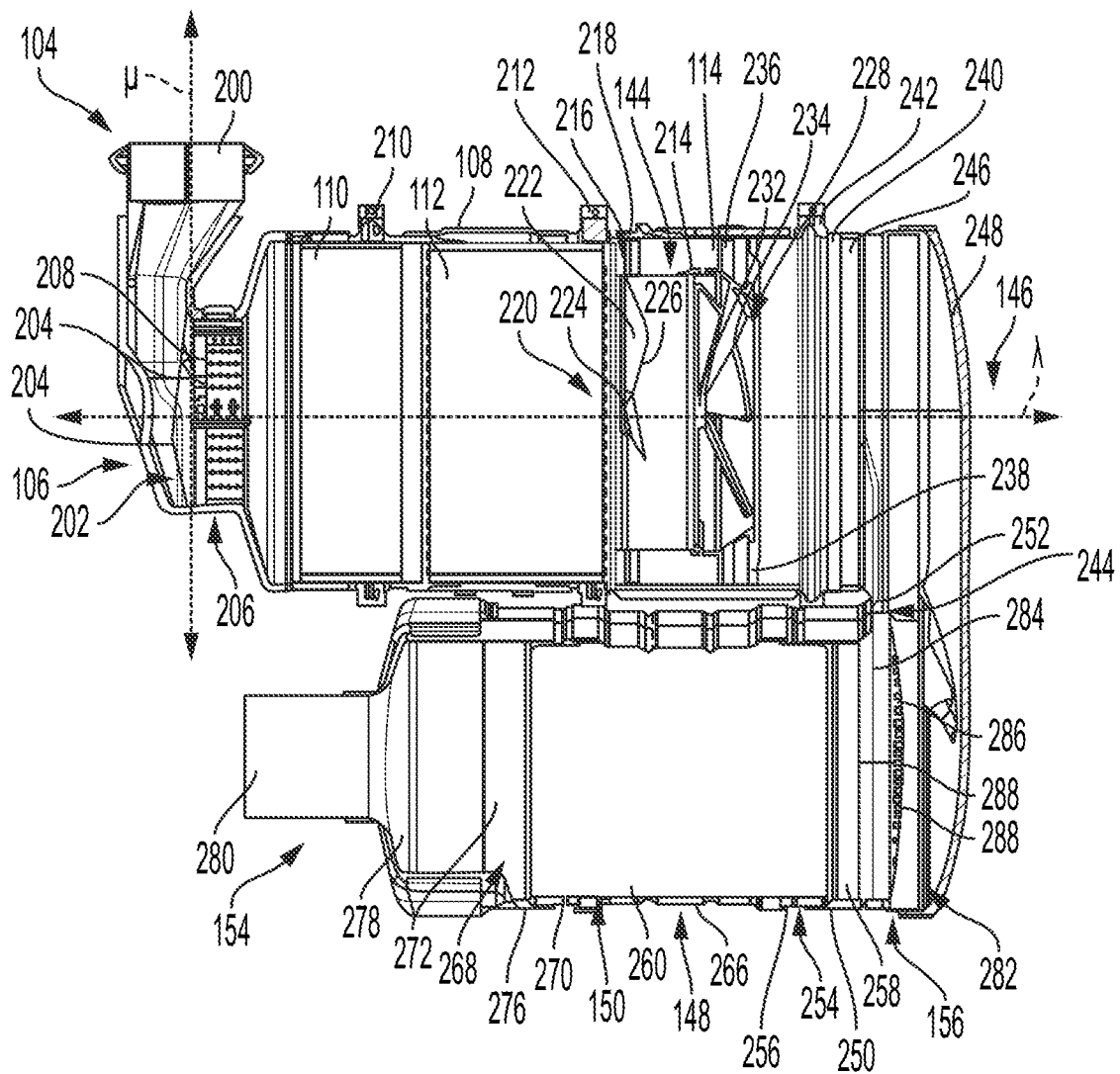
FIG. 8 is another cross-sectional view of the housing assembly shown in FIG. 2 taken along plane A-A in FIG. 6.

In various embodiments, such as is shown in FIG. 8, the intake body inlet 200 is centered on an intake body inlet center axis μ. In other words, a center point of a cross-section of the intake body inlet 200 is disposed on the intake body inlet center axis μ along a length of the intake body inlet 200. The exhaust gas may be provided through the intake body inlet 200 in a direction that is parallel to, or coincident with, the intake body inlet center axis μ.

In various embodiments, the intake body inlet center axis μ is approximately orthogonal to the upstream housing axis λ (e.g., when measured on a plane along which the intake body inlet center axis μ and the upstream housing axis λ both extend, etc.). Such an arrangement of the intake body inlet 200 may facilitate further reduction of a length of the housing assembly 104 along the upstream housing axis λ and/or a length of the housing assembly 104 along the catalyst member housing axis ρ. This may further reduce a space claim of the housing assembly 104. In some embodiments, the intake body inlet center axis μ is coincident with the upstream housing axis λ.

The exhaust gas aftertreatment system 100 also includes a perforated panel 202 (e.g., plate, etc.). The perforated panel 202 is located within the intake body 106. The perforated panel 202 includes a plurality of perforated panel perforations 204 (e.g., openings, holes, apertures, etc.). At least a portion of the exhaust gas provided by the intake body 106 to the oxidation catalyst 110 flows through the perforated panel 202 via the perforated panel perforations 204 prior to being provided to the oxidation catalyst 110. The perforated panel 202 is configured to facilitate redirection of the exhaust gas from flowing along the intake body inlet center axis μ to flowing along the upstream housing axis λ.

The exhaust gas aftertreatment system 100 also includes a straightener 206 (e.g., flow straightener, aperture plate, etc.). The straightener 206 is located within the intake body 106. The straightener 206 includes a plurality of straightener perforations 208 (e.g., openings, holes, apertures, etc.). At least a portion of the exhaust gas provided by the intake body 106 to the oxidation catalyst 110 flows through the straightener 206 via the straightener perforations 208 prior to being provided to the oxidation catalyst 110. The straightener 206 is configured to facilitate straightening of the exhaust gas prior to the exhaust gas being provided to the oxidation catalyst 110. As a result of the straightening facilitated by the straightener 206, turbulence of the exhaust gas flowing into the oxidation catalyst 110 is reduced and a backpressure of the exhaust gas aftertreatment system 100 is reduced, thereby making the exhaust gas aftertreatment system 100 more desirable.

The exhaust gas aftertreatment system 100 also includes an inlet band clamp 210 (e.g., strap, hose clamp, etc.). The inlet band clamp 210 is configured to facilitate coupling of the intake body 106 and the upstream housing 108. For example, the inlet band clamp 210 may overlap a first flange of the intake body 106 and a second flange of the upstream housing 108 and be tightened to cause the intake body 106 and the upstream housing 108 to be coupled.

Through the use of the inlet band clamp 210, assembly and/or servicing of the housing assembly 104 may be simplified. For example, the perforated panel 202 and/or the straightener 206 can be inserted within the intake body 106 before the intake body 106 and the upstream housing 108 are coupled. This may simplify assembly of the intake body 106, thereby making the exhaust gas aftertreatment system 100 more desirable. In another example, the oxidation catalyst 110 and the exhaust gas filtration device 112 can be removed from the upstream housing 108 when the inlet band clamp 210 is removed and the intake body 106 is separated from the upstream housing 108 and without separating the upstream housing 108 from the decomposition housing 114 or separating the decomposition housing 114 from the outlet housing 154. This may simplify removal of the oxidation catalyst 110 and/or the exhaust gas filtration device 112, thereby making the exhaust gas aftertreatment system 100 more desirable.

The exhaust gas aftertreatment system 100 also includes a decomposition housing band clamp 212 (e.g., strap, hose clamp, etc.). The decomposition housing band clamp 212 is configured to facilitate coupling of the upstream housing 108 and the decomposition housing 114. For example, the decomposition housing band clamp 212 may overlap a first flange of the upstream housing 108 and a second flange of the decomposition housing 114 and be tightened to cause the upstream housing 108 and the decomposition housing 114 to be coupled.

Through the use of the decomposition housing band clamp 212, assembly and/or servicing of the housing assembly 104 may be simplified. For example, the mixer 144 can be inserted within the decomposition housing 114 before the decomposition housing 114 and the upstream housing 108 are coupled. This may simplify assembly of the decomposition housing 114, thereby making the exhaust gas aftertreatment system 100 more desirable. In another example, the oxidation catalyst 110 and the exhaust gas filtration device 112 can be inserted into the upstream housing 108 when the decomposition housing band clamp 212 is removed and the upstream housing 108 is separated from the decomposition housing 114 and without separating the upstream housing 108 from the intake body 106. This may simplify installation of the oxidation catalyst 110 and/or the exhaust gas filtration device 112, thereby making the exhaust gas aftertreatment system 100 more desirable.

The mixer 144 includes a mixer housing 214 (e.g., shell, body, etc.). The exhaust gas flows through the mixer 144 via the mixer housing 214. The mixer housing 214 includes a mixer housing opening 215 (e.g., aperture, hole, etc.). The mixer housing opening 215 receives the reductant or the air-reductant mixture from the injector 126. The mixer 144 may, for example, include a flow guide (e.g., cone, etc.) that extends from the mixer housing 214 to the decomposition housing 114 and extends around the injector 126 and the mixer housing opening 215. The flow guide may facilitate provision of the reductant or the air reductant mixture from the injector 126 into the mixer housing 214 via the mixer housing opening 215. The flow guide may include perforations to receive exhaust gas that may assist in propelling the reductant or the air-reductant mixture into the mixer housing 214.

The mixer 144 also includes a first mixer flange 216 (e.g., rib, ring, etc.). The first mixer flange 216 supports (e.g., suspends, etc.) the mixer 144 within the decomposition housing 114. The first mixer flange 216 is disposed upstream of the injector 126. In various embodiments, the first mixer flange 216 is coupled to the mixer housing 214 and is coupled to the decomposition housing 114. In some embodiments, the first mixer flange 216 is integrally formed with the mixer housing 214 (e.g., and coupled to the decomposition housing 114, and integrally formed with the decomposition housing 114). In some embodiments, the first mixer flange 216 is integrally formed with the decomposition housing 114 (e.g., and coupled to the mixer housing 214, and integrally formed with the mixer housing 214).

In various embodiments, the first mixer flange 216 includes at least one mixer flange aperture 218 (e.g., hole, opening, window, etc.). The mixer flange apertures 218 facilitate flow of the exhaust gas through the first mixer flange 216. In this way, the exhaust gas can flow between the mixer housing 214 and the decomposition housing 114. This exhaust gas may heat the mixer housing 214, thereby mitigating formation of deposits (e.g., reductant deposits, solidified reductant, etc.) on the mixer housing 214. Additionally, this exhaust gas may assist in propelling the reductant into the mixer housing 214 via the mixer housing opening 215.

The mixer 144 also includes an upstream mixing plate 220 (e.g., vane plate, baffle plate, etc.). The upstream mixing plate 220 is located upstream of the mixer housing opening 215. The upstream mixing plate 220 includes a plurality of upstream mixing plate vanes 222 (e.g., baffles, guides, etc.) that extend from an upstream mixing plate hub 224 (e.g., base, etc.) of the upstream mixing plate 220. Adjacent pairs of the upstream mixing plate vanes 222 define upstream mixing plate apertures 226 (e.g., holes, openings, etc.). The exhaust gas flows through the upstream mixing plate 220 via the upstream mixing plate apertures 226. The upstream mixing plate vanes 222 are angled relative to the upstream mixing plate hub 224 which causes the exhaust gas to swirl as the exhaust gas flows through the upstream mixing plate 220. This swirl enhances mixing of the reductant or the air-reductant mixture downstream of the upstream mixing plate 220.

The mixer 144 also includes a downstream mixing plate 228 (e.g., vane plate, baffle plate, etc.). The downstream mixing plate 228 is located downstream of the mixer housing opening 215. The downstream mixing plate 228 includes a plurality of downstream mixing plate vanes 230 (e.g., baffles, guides, etc.) that extend from an downstream mixing plate hub 232 (e.g., base, etc.) of the downstream mixing plate 228. Adjacent pairs of the downstream mixing plate vanes 230 define downstream mixing plate apertures 234 (e.g., holes, openings, etc.). The exhaust gas flows through the downstream mixing plate 228 via the downstream mixing plate apertures 234. The downstream mixing plate vanes 230 are angled relative to the downstream mixing plate hub 232 which causes the exhaust gas to swirl as the exhaust gas flows through the downstream mixing plate 228. This swirl enhances mixing of the reductant or the air-reductant mixture downstream of the downstream mixing plate 228.

The mixer 144 also includes a second mixer flange 236 (e.g., rib, ring, etc.). The second mixer flange 236 supports (e.g., suspends, etc.) the mixer 144 within the decomposition housing 114. The second mixer flange 236 is disposed downstream of the injector 126. In various embodiments, the second mixer flange 236 is coupled to the mixer housing 214 and is coupled to the decomposition housing 114. In some embodiments, the second mixer flange 236 is integrally formed with the mixer housing 214 (e.g., and coupled to the decomposition housing 114, and integrally formed with the decomposition housing 114). In some embodiments, the second mixer flange 236 is integrally formed with the decomposition housing 114 (e.g., and coupled to the mixer housing 214, and integrally formed with the mixer housing 214).

The mixer 144 also includes a third mixer flange 238 (e.g., rib, ring, etc.). The third mixer flange 238 supports (e.g., suspends, etc.) the mixer 144 within the decomposition housing 114. The third mixer flange 238 is disposed downstream of the second mixer flange 236. In various embodiments, the third mixer flange 238 is coupled to the mixer housing 214 and is coupled to the decomposition housing 114. In some embodiments, the third mixer flange 238 is integrally formed with the mixer housing 214 (e.g., and coupled to the decomposition housing 114, and integrally formed with the decomposition housing 114). In some embodiments, the third mixer flange 238 is integrally formed with the decomposition housing 114 (e.g., and coupled to the mixer housing 214, and integrally formed with the mixer housing 214).

The outlet housing 154 includes an inlet coupler 240 (e.g., spacer, etc.). The inlet coupler 240 is coupled to the decomposition housing 114. In various embodiments, the exhaust gas aftertreatment system 100 also includes a distributing housing band clamp 242 (e.g., strap, hose clamp, etc.). The distributing housing band clamp 242 is configured to facilitate coupling of the decomposition housing 114 and the distributing housing 146. For example, the distributing housing band clamp 242 may overlap a first flange of the decomposition housing 114 and the inlet coupler 240 and be tightened to cause the decomposition housing 114 and the inlet coupler 240 to be coupled.

Through the use of the distributing housing band clamp 242, assembly and/or servicing of the housing assembly 104 may be simplified. For example, the mixer 144 can be inserted within the decomposition housing 114 before the decomposition housing 114 and the inlet coupler 240 are coupled. This may simplify assembly of the decomposition housing 114, thereby making the exhaust gas aftertreatment system 100 more desirable.

The outlet housing 154 also includes a distributing housing flanged body 244 (e.g., flanged member, etc.). As is explained in more detail herein, the distributing housing flanged body 244 facilitates coupling of the outlet housing 154 to the decomposition housing 114 and the catalyst member housing 148.

The distributing housing flanged body 244 includes an inlet flange 246 (e.g., ring, annular flange, rib, wall, etc.). The outlet housing 154 receives the exhaust gas from the decomposition housing 114 through the inlet flange 246. In various embodiments, the inlet flange 246 is coupled to the inlet coupler 240. For example, the inlet flange 246 may be fastened, welded, riveted, or otherwise attached to the inlet coupler 240. In other embodiments, the inlet flange 246 is integrally formed with the inlet coupler 240.

The distributing housing flanged body 244 also includes an shell 248 (e.g., wall, cap, etc.). After flowing into the outlet housing 154 via the inlet flange 246, the shell 248 functions to direct the exhaust gas towards the catalyst member housing 148. In various embodiments, the shell 248 is coupled to the inlet flange 246. For example, the shell 248 may be fastened, welded, riveted, or otherwise attached to the inlet flange 246. In other embodiments, the shell 248 is integrally formed with the inlet flange 246.

The distributing housing flanged body 244 also includes an outlet flange 250 (e.g., ring, rib, wall, etc.). As is explained in more detail herein, the outlet flange 250 facilitates coupling of the outlet housing 154 to the catalyst member housing 148. In various embodiments, the outlet flange 250 is coupled to the shell 248. For example, the outlet flange 250 may be fastened, welded, riveted, or otherwise attached to the shell 248. In other embodiments, the outlet flange 250 is integrally formed with the shell 248.

The distributing housing flanged body 244 also includes a joining wall 252 (e.g., flange, rib, etc.). The joining wall 252 facilitates separation of the decomposition housing 114 and the catalyst member housing 148. In various embodiments, the joining wall 252 is coupled to the inlet flange 246 and/or the outlet flange 250. For example, the joining wall 252 may be fastened, welded, riveted, or otherwise attached to the inlet flange 246 and/or the outlet flange 250. In other embodiments, the joining wall 252 is integrally formed with the inlet flange 246 and/or the outlet flange 250.

The catalyst member housing 148 includes a first support 254. The first support 254 is configured to facilitate coupling of the catalyst member housing 148 to the outlet housing 154 while also supporting the first catalyst member 150 and the second catalyst member 152 within the catalyst member housing 148.

The first support 254 includes a first housing support flange 256 (e.g., rib, wall, etc.). In various embodiments, the first housing support flange 256 is coupled to the outlet flange 250. For example, the first housing support flange 256 may be fastened, welded, riveted, or otherwise attached to the outlet flange 250. In other embodiments, the first housing support flange 256 is integrally formed with the outlet flange 250.

The first support 254 also includes a first support first catalyst member flange 258 (e.g., rib, wall, etc.). As is explained in more detail herein, the first support first catalyst member flange 258 is configured to support the first catalyst member 150 within the catalyst member housing 148.

The first catalyst member 150 includes a first casing 260 (e.g., shell, skin, etc.). The first casing 260 interfaces with the first support first catalyst member flange 258. In some embodiments, the first casing 260 is coupled to the first support first catalyst member flange 258. For example, the first casing 260 may be fastened, welded, riveted, or otherwise attached to the first support first catalyst member flange 258. In other embodiments, the first casing 260 is integrally formed with the first support first catalyst member flange 258.

The first support 254 also includes a first support second catalyst member flange 262 (e.g., rib, wall, etc.). As is explained in more detail herein, the first support second catalyst member flange 262 is configured to support the second catalyst member 152 within the catalyst member housing 148. The first support 254 is configured such that the first support second catalyst member flange 262 is spaced apart from the first support first catalyst member flange 258. In some embodiments, the first support 254 is configured such that the catalyst member housing axis $\rho$ extends between the first catalyst member 150 and the second catalyst member 152.

The second catalyst member 152 includes a second casing 264 (e.g., shell, skin, etc.). The second casing 264 interfaces with the first support second catalyst member flange 262. In some embodiments, the second casing 264 is coupled to the first support second catalyst member flange 262. For example, the second casing 264 may be fastened, welded, riveted, or otherwise attached to the first support second catalyst member flange 262. In other embodiments, the second casing 264 is integrally formed with the first support second catalyst member flange 262.

The catalyst member housing 148 also includes an outer wall 266 (e.g., casing, etc.). The outer wall 266 partially covers the first catalyst member 150 and the second catalyst member 152. The first support 254 is configured to support the first catalyst member 150 above the outer wall 266 such that an air gap extends at least partially between the outer wall 266 and the first catalyst member 150. In various embodiments, the outer wall 266 is coupled to the first housing support flange 256. For example, the outer wall 266 may be fastened, welded, riveted, or otherwise attached to the first housing support flange 256. In other embodiments, the outer wall 266 is integrally formed with the first housing support flange 256.

The catalyst member housing 148 includes a second support 268. The second support 268 is configured to facilitate coupling of the catalyst member housing 148 to the outlet housing 154 while also supporting the first catalyst member 150 and the second catalyst member 152 within the catalyst member housing 148.

The second support 268 includes a second housing support flange 270 (e.g., rib, wall, etc.). As is explained in more detail herein, the second housing support flange 270 is configured to facilitate coupling of the second support 268 to the outlet housing 154.

The second support 268 also includes a second support first catalyst member flange 272 (e.g., rib, wall, etc.). As is explained in more detail herein, the second support first catalyst member flange 272 is configured to support the first catalyst member 150 within the catalyst member housing 148.

The first casing 260 interfaces with the second support first catalyst member flange 272. In some embodiments, the first casing 260 is coupled to the second support first catalyst member flange 272. For example, the first casing 260 may be fastened, welded, riveted, or otherwise attached to the second support first catalyst member flange 272. In other embodiments, the first casing 260 is integrally formed with the second support first catalyst member flange 272.

The second support 268 also includes a second support second catalyst member flange 274 (e.g., rib, wall, etc.). As is explained in more detail herein, the second support second catalyst member flange 274 is configured to support the second catalyst member 152 within the catalyst member housing 148. The second support 268 is configured such that the second support second catalyst member flange 274 is spaced apart from the second support first catalyst member flange 272. In some embodiments, the second support 268 is configured such that the catalyst member housing axis $\rho$ extends between the first catalyst member 150 and the second catalyst member 152.

The second casing 264 interfaces with the second support second catalyst member flange 274. In some embodiments, the second casing 264 is coupled to the second support second catalyst member flange 274. For example, the second casing 264 may be fastened, welded, riveted, or otherwise attached to the second support second catalyst member flange 274. In other embodiments, the second casing 264 is integrally formed with the second support second catalyst member flange 274.

The outlet housing 154 includes an outlet housing flange 276 (e.g., wall, rib, etc.). In various embodiments, the outlet housing flange 276 is coupled to the second housing support flange 270. For example, the outlet housing flange 276 may be fastened, welded, riveted, or otherwise attached to the second housing support flange 270. In other embodiments, the outlet housing flange 276 is integrally formed with the second housing support flange 270.

The outlet housing 154 also includes an outlet housing body 278 (e.g., wall, shell, etc.). The outlet housing body 278 is configured to collect the exhaust gas flowing from both the first catalyst member 150 and the second catalyst member 152 and provide the exhaust gas to the downstream exhaust gas conduit 158. In various embodiments, the outlet housing body 278 is coupled to the outlet housing flange 276. For example, the outlet housing body 278 may be fastened, welded, riveted, or otherwise attached to the outlet housing flange 276. In other embodiments, the outlet housing body 278 is integrally formed with the outlet housing flange 276.

The outlet housing 154 also includes an outlet housing fitting 280 (e.g., coupler, etc.). The outlet housing fitting 280 is configured to provide the exhaust gas from the outlet housing body 278 to the downstream exhaust gas conduit 158. In various embodiments, the outlet housing fitting 280 is coupled to the outlet housing body 278. For example, the outlet housing fitting 280 may be fastened, welded, riveted, or otherwise attached to the outlet housing body 278. In other embodiments, the outlet housing fitting 280 is integrally formed with the outlet housing body 278. The outlet housing fitting 280 provides a single outlet to which the exhaust gas that has flowed through the first catalyst member 150 and the exhaust gas that has flowed through the second catalyst member 152 is provided from the outlet housing 154.

The flow divider 156 includes a first endcap 282 (e.g., plate, etc.). As is explained in more detail herein, the first endcap 282 is configured to control flow of the exhaust gas out of the first catalyst member 150.

The first endcap 282 includes a first endcap flange 284 (e.g., wall, rib, etc.). In various embodiments, the first endcap flange 284 is coupled to the first support first catalyst member flange 258. For example, the first endcap flange 284 may be fastened, welded, riveted, or otherwise attached to the first support first catalyst member flange 258. In other embodiments, the first endcap flange 284 is integrally formed with the first support first catalyst member flange 258.

The first endcap 282 also includes a first endcap panel 286 (e.g., plate, face, etc.). The first endcap panel 286 extends across the first support first catalyst member flange 258 and therefore across an inlet face of the first catalyst member 150, in some embodiments. In various embodiments, the first endcap panel 286 is coupled to the first endcap flange 284. For example, the first endcap panel 286 may be fastened, welded, riveted, or otherwise attached to the first endcap flange 284. In other embodiments, the first endcap panel 286 is integrally formed with the first endcap flange 284.

The first endcap 282 also includes a plurality of first apertures 288 (e.g., openings, perforations, etc.). The first apertures 288 facilitate flow of the exhaust gas through the first endcap 282. In various embodiments, each of the first apertures 288 extends through the first endcap panel 286. In other embodiments, at least one of the first apertures 288 extends through the first endcap flange 284.

The first apertures 288 are configured to receive the exhaust gas from the distributing housing 146 and facilitate passage of a first portion of the exhaust gas through the first endcap 282 and to the outlet housing 154. The first portion of the exhaust gas is treated by the first catalyst member 150. The first apertures 288 each define a first aperture area $A_1$. The first aperture area $A_1$ of each of the first apertures 288 may be different from, or the same as, the first aperture areas $A_1$ of the others of the first apertures 288. In various embodiments, the first aperture areas $A_1$ are each approximately equal to between 0.50 inches squared ($in^2$) and 2.50 $in^2$, inclusive (e.g., 0.475 $in^2$, 0.50 $in^2$, 1.0 $in^2$, 1.8 $in^2$, 2.50 $in^2$, 2.625 $in^2$, etc.). In some embodiments, the first aperture areas $A_1$ of each of the first apertures 288 are equal.

A sum of the first aperture areas $A_1$ for all of the first apertures 288 defines a first total area c of the first endcap 282. This first total area c is the entirety of the area in the first endcap 282 that the exhaust gas can flow through towards the outlet housing 154.

The flow divider 156 includes a second endcap 290 (e.g., plate, etc.). As is explained in more detail herein, the second endcap 290 is configured to control flow of the exhaust gas out of the second catalyst member 152.

The second endcap 290 includes a second endcap flange 292 (e.g., wall, rib, etc.). In various embodiments, the second endcap flange 292 is coupled to the first support second catalyst member flange 262. For example, the second endcap flange 292 may be fastened, welded, riveted, or otherwise attached to the first support second catalyst member flange 262. In other embodiments, the second endcap flange 292 is integrally formed with the first support second catalyst member flange 262.

The second endcap 290 also includes a second endcap panel 294 (e.g., plate, face, etc.). The second endcap panel 294 extends across the first support second catalyst member flange 262 and therefore across an inlet face of the second catalyst member 152, in some embodiments. In various embodiments, the second endcap panel 294 is coupled to the second endcap flange 292. For example, the second endcap panel 294 may be fastened, welded, riveted, or otherwise attached to the second endcap flange 292. In other embodiments, the second endcap panel 294 is integrally formed with the second endcap flange 292.

The second endcap 290 also includes a plurality of second apertures 296 (e.g., openings, perforations, etc.). The second apertures 296 facilitate flow of the exhaust gas through the second endcap 290. In various embodiments, each of the second apertures 296 extends through the second endcap panel 294. In other embodiments, at least one of the second apertures 296 extends through the second endcap flange 292.

The second apertures 296 are configured to receive the exhaust gas from the distributing housing 146 and facilitate passage of a second portion of the exhaust gas through the second endcap 290 and to the outlet housing 154. The second portion of the exhaust gas is treated by the second catalyst member 152. The second apertures 296 each define a second aperture area $A_2$. The second aperture area $A_2$ of each of the second apertures 296 may be different from, or the same as, the second aperture areas $A_2$ of the others of the second apertures 296. Additionally, the second aperture area $A_2$ of each of the second apertures 296 may be different from, or the same as, the first aperture areas $A_1$ of the first apertures 288.

In various embodiments, the second aperture areas $A_2$ are each approximately equal to between 0.50 $in^2$ and 2.50 $in^2$, inclusive (e.g., 0.475 $in^2$, 0.50 $in^2$, 1.0 $in^2$, 1.8 $in^2$, 2.50 $in^2$, 2.625 in$^2$, etc.). In some embodiments, the second aperture area $A_2$ of each of the second apertures 296 are equal.

A sum of the second aperture areas $A_2$ for all of the second apertures 296 defines a second total area ii of the second endcap 290. This second total area η the entirety of the area in the second endcap 290 that the exhaust gas can flow through towards the outlet housing 154.

In various embodiments, the second total area η is not equal to the first total area ε. A ratio, ψ, of the first total area ε to the second total area η (ψ=ε/η) is selected such that flow of the exhaust gas is balanced between the first catalyst member 150 and the second catalyst member 152. As a result, the first catalyst member 150 and the second catalyst member 152 receive the same amount (e.g., volume per unit time, etc.) of the exhaust gas. Balancing the flow of the exhaust gas between the first catalyst member 150 and the second catalyst member 152 mitigates backpressure on an internal combustion engine having the exhaust gas aftertreatment system 100.

In various embodiments, the ratio 4 is approximately equal to between 1.25 and 10, inclusive (e.g., 1.1875, 1.25, 2, 4, 10, 10.5, etc.).

Figure 9:
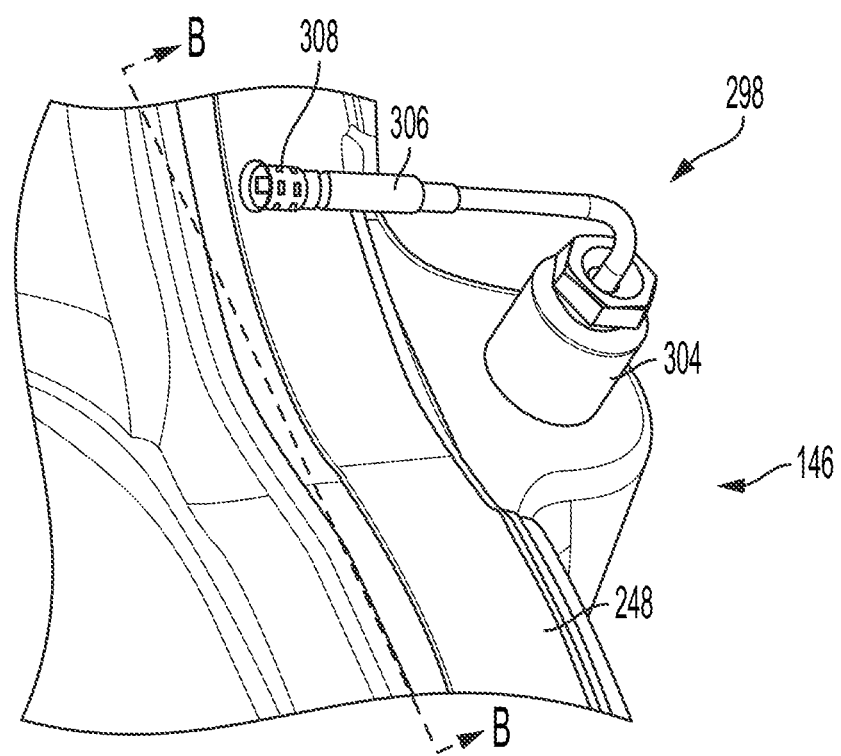
FIG. 9 is a perspective view of another example housing assembly.
Figure 10:
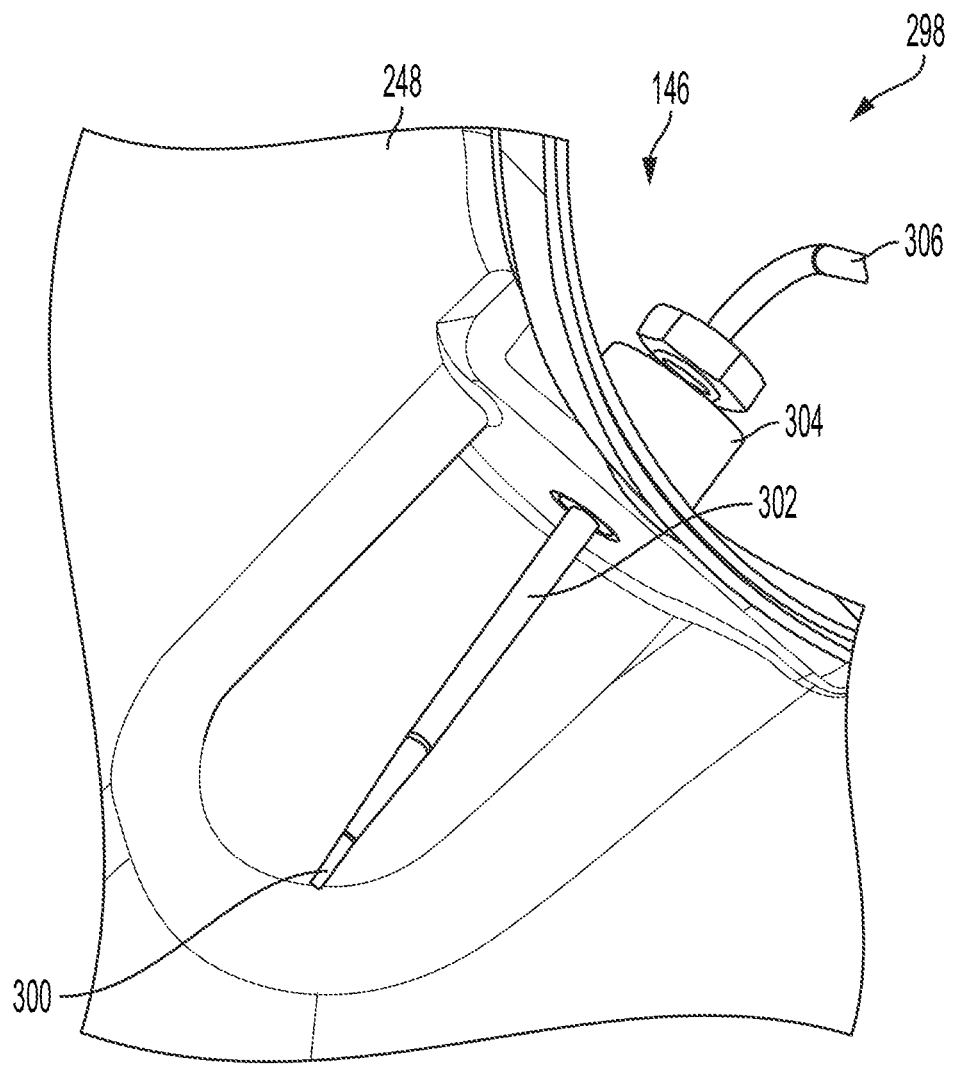
FIG. 10 is a cross-sectional view of the housing assembly shown in FIG. 9 taken along plane B-B.

In various embodiments, the distributing housing 146 includes one or more sensor assemblies 298 (e.g., temperature sensors, pressure sensors, oxygen sensors, volumetric flow sensors, etc.). FIGS. 9 and 10 illustrate one of the sensor assemblies 298 in greater detail. The sensor assemblies 298 are disposed downstream of the inlet flange 246. The sensor assemblies 298 are configured to determine a reading (e.g., temperature, pressure, etc.) of the exhaust gas within the distributing housing 146 (e.g., downstream of the inlet flange 246, etc.).

Each of the sensor assemblies 298 may include a conduit intake 300 (e.g., channel inlet, pipe opening, etc.). The conduit intake 300 may be fluidly coupled within the distributing housing 146 and be configured to receive a small portion of the exhaust gas. The small portion of the exhaust gas may be utilized to determine the reading of the exhaust gas. Each of the sensor assemblies 298 may also include an internal conduit 302 (e.g., inner channel, interior pipe, etc.). The internal conduit 302 may be disposed within the distributing housing 146. The internal conduit 302 may be fluidly coupled to the conduit intake 300 and may be configured to receive the small portion of the exhaust gas.

Each of the sensor assemblies 298 includes a sensor boss 304 (e.g., protruding member, projection, etc.). The sensor boss 304 includes an aperture for which the conduit intake 300 may extend through. After placing the conduit intake 300 through the aperture of the sensor boss 304, the conduit intake 300 can be placed into its desired position. The conduit intake 300 may then be coupled to the sensor boss 304.

Each of the sensor assemblies 298 may also include an external conduit 306 (e.g., outer channel, exterior pipe, etc.). The external conduit 306 may be coupled to the sensor boss 304 at a first end. The external conduit 306 may be fluidly coupled to the internal conduit 302 so that the external conduit 306 is configured to receive the small portion of the exhaust gas.

Each of the sensor assemblies 298 may also include a conduit seal 308 (e.g., channel plug, pipe gasket, etc.). The conduit seal 308 may be fluidly coupled to the external conduit 306 and may be configured to receive the small portion of the exhaust gas. The conduit seal 308 may be fluidly coupled to a sensor (e.g., temperature sensor, pressure sensor, oxygen sensor, volumetric flow sensor, etc.) and may be configured to provide the small portion of the exhaust gas to the sensor.

Figure 11:
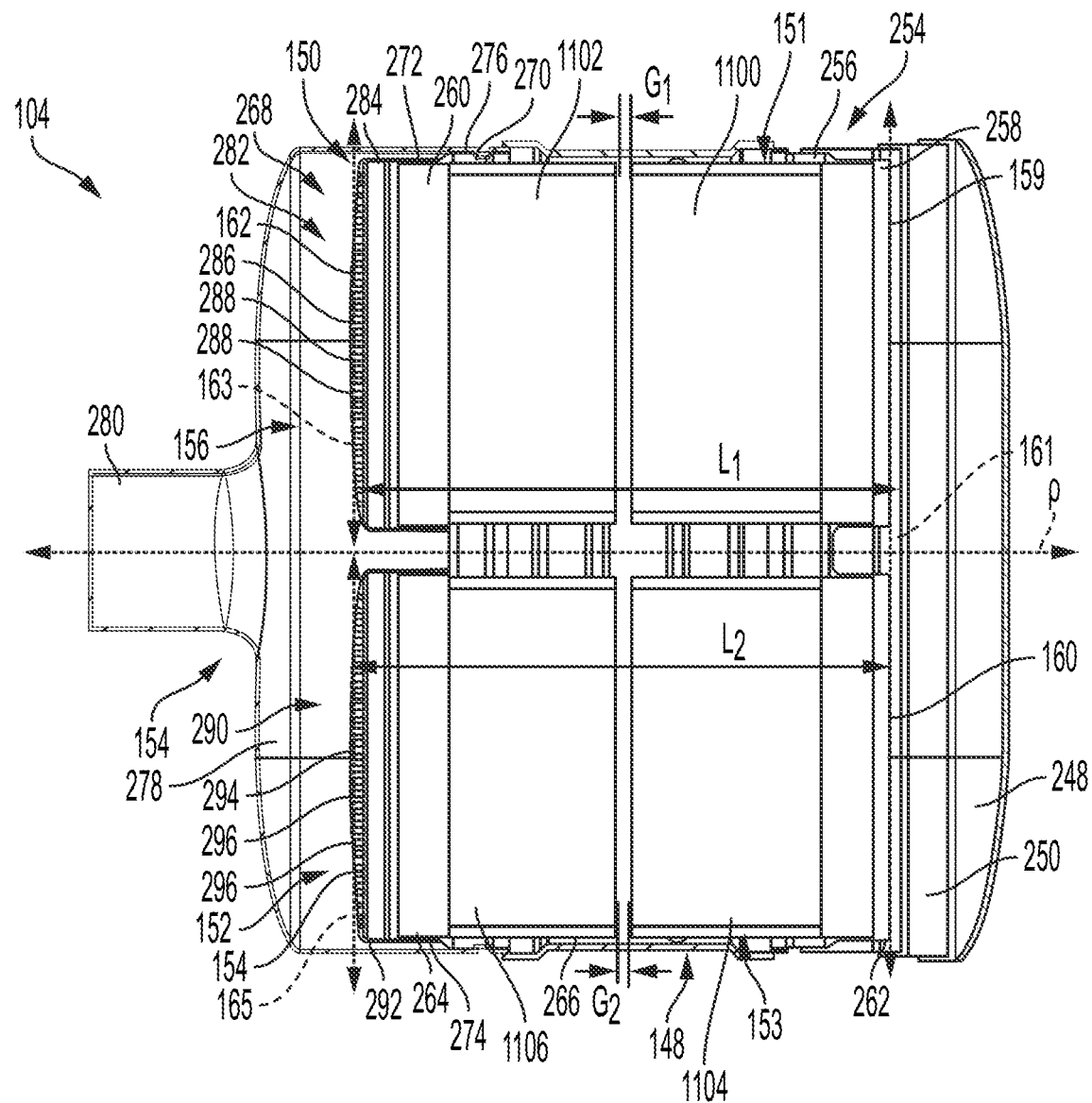
FIG. 11 is a cross-sectional view of yet another example housing assembly.

FIG. 11 illustrates the housing assembly 104 according to various embodiments. The first catalyst material 151 includes a first catalyst material first portion 1100 (e.g., catalyst metals, etc.). The first catalyst material first portion 1100 may include, for example, platinum, rhodium, palladium, or other similar materials. The first catalyst material first portion 1100 is configured to assist in the reduction of $NO_x$ emissions by accelerating a $NO_x$ reduction process between the reductant and the $NO_x$ of the exhaust gas into diatomic nitrogen, water, and/or carbon dioxide. In some embodiments, the first catalyst material first portion 1100 is a ceramic catalyst material. In some embodiments, the first catalyst material first portion 1100 is an extruded catalyst material.

The first catalyst material 151 also includes a first catalyst material second portion 1102 (e.g., catalyst metals, etc.). The first catalyst material second portion 1102 may include, for example, platinum, rhodium, palladium, or other similar materials. The first catalyst material second portion 1102 is configured to assist in the reduction of $NO_x$ emissions by accelerating a $NO_x$ reduction process between the reductant and the $NO_x$ of the exhaust gas into diatomic nitrogen, water, and/or carbon dioxide. In some embodiments, the first catalyst material second portion 1102 is a ceramic catalyst material. In some embodiments, the first catalyst material second portion 1102 is an extruded catalyst material.

In various embodiments, the first catalyst material second portion 1102 includes different materials than the first catalyst material first portion 1100. For example, the first catalyst material second portion 1102 may include platinum and the first catalyst material first portion 1100 may include rhodium or palladium. In another example, the first catalyst material second portion 1102 may include platinum, rhodium, or palladium and the first catalyst material first portion 1100 may include a ceramic material. By including different materials in the first catalyst material first portion 1100 and the first catalyst material second portion 1102, an ability of the first catalyst material 151 to assist in the reduction of $NO_x$ emissions may be tailored for a target application, and/or the first catalyst member separation length $L_1$ may be decreased.

In various embodiments, the first catalyst material second portion 1102 is separated from the first catalyst material first portion 1100 by a first gap $G_1$ (e.g., separation, etc.). The first gap $G_1$ may provide a mechanism for the exhaust gas to redistribute after exiting the first catalyst material first portion 1100 and prior to entering the first catalyst material second portion 1102. By selecting the first gap $G_1$, an ability of the first catalyst material 151 to assist in the reduction of $NO_x$ emissions may be tailored for a target application, and/or the first catalyst member separation length $L_1$ may be decreased.

The second catalyst material 153 includes a second catalyst material first portion 1104 (e.g., catalyst metals, etc.). The second catalyst material first portion 1104 may include, for example, platinum, rhodium, palladium, or other similar materials. The second catalyst material first portion 1104 is configured to assist in the reduction of $NO_x$ emissions by accelerating a $NO_x$ reduction process between the reductant and the $NO_x$ of the exhaust gas into diatomic nitrogen, water, and/or carbon dioxide. In some embodiments, the second catalyst material first portion 1104 is a ceramic catalyst material. In some embodiments, the second catalyst material first portion 1104 is an extruded catalyst material.

The second catalyst material 153 also includes a second catalyst material second portion 1106 (e.g., catalyst metals, etc.). The second catalyst material second portion 1106 may include, for example, platinum, rhodium, palladium, or other similar materials. The second catalyst material second portion 1106 is configured to assist in the reduction of $NO_x$ emissions by accelerating a $NO_x$ reduction process between the reductant and the $NO_x$ of the exhaust gas into diatomic nitrogen, water, and/or carbon dioxide. In some embodiments, the second catalyst material second portion 1106 is a ceramic catalyst material. In some embodiments, the second catalyst material second portion 1106 is an extruded catalyst material.

In various embodiments, the second catalyst material second portion 1106 includes different materials than the second catalyst material first portion 1104. For example, the second catalyst material second portion 1106 may include platinum and the second catalyst material first portion 1104 may include rhodium or palladium. In another example, the second catalyst material second portion 1106 may include platinum, rhodium, or palladium and the second catalyst material first portion 1104 may include a ceramic material. By including different materials in the second catalyst material first portion 1104 and the second catalyst material second portion 1106, an ability of the second catalyst material 153 to assist in the reduction of $NO_x$ emissions may be tailored for a target application, and/or the second catalyst member separation length $L_2$ may be decreased.

In various embodiments, the second catalyst material second portion 1106 is separated from the second catalyst material first portion 1104 by a second gap $G_2$ (e.g., separation, etc.). The second gap $G_2$ may provide a mechanism for the exhaust gas to redistribute after exiting the second catalyst material first portion 1104 and prior to entering the second catalyst material second portion 1106. By selecting the second gap $G_2$, an ability of the second catalyst material 153 to assist in the reduction of $NO_x$ emissions may be tailored for a target application, and/or the second catalyst member separation length $L_2$ may be decreased.

In some embodiments, the first catalyst material 151 does not include the first catalyst material first portion 1100 and the first catalyst material second portion 1102, and the second catalyst material 153 includes the second catalyst material first portion 1104 and the second catalyst material second portion 1106. In some embodiments, the first catalyst material 151 includes the first catalyst material first portion 1100 and the first catalyst material second portion 1102 and the second catalyst material 153 does not include the second catalyst material first portion 1104 or the second catalyst material second portion 1106.

Figure 3:
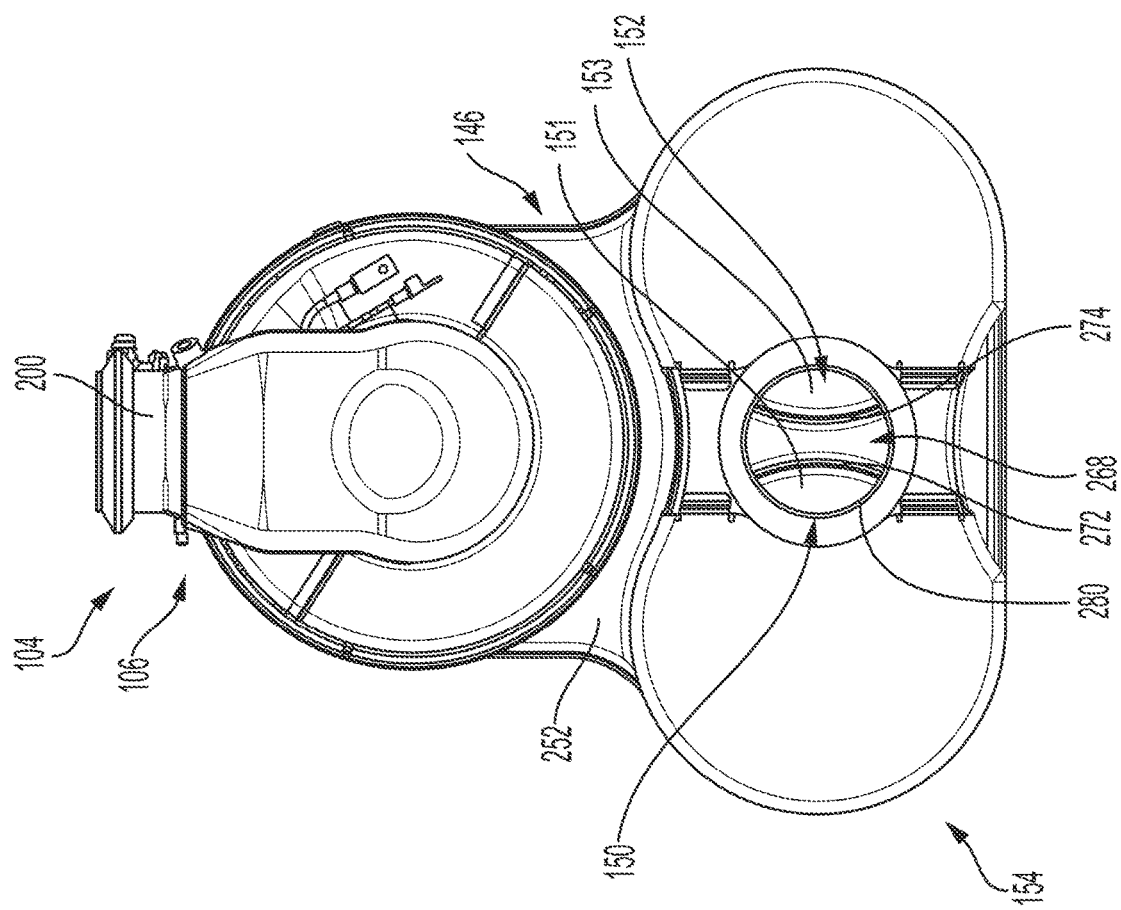
FIG. 3 is a front view of the housing assembly shown in FIG. 2.
Figure 4:
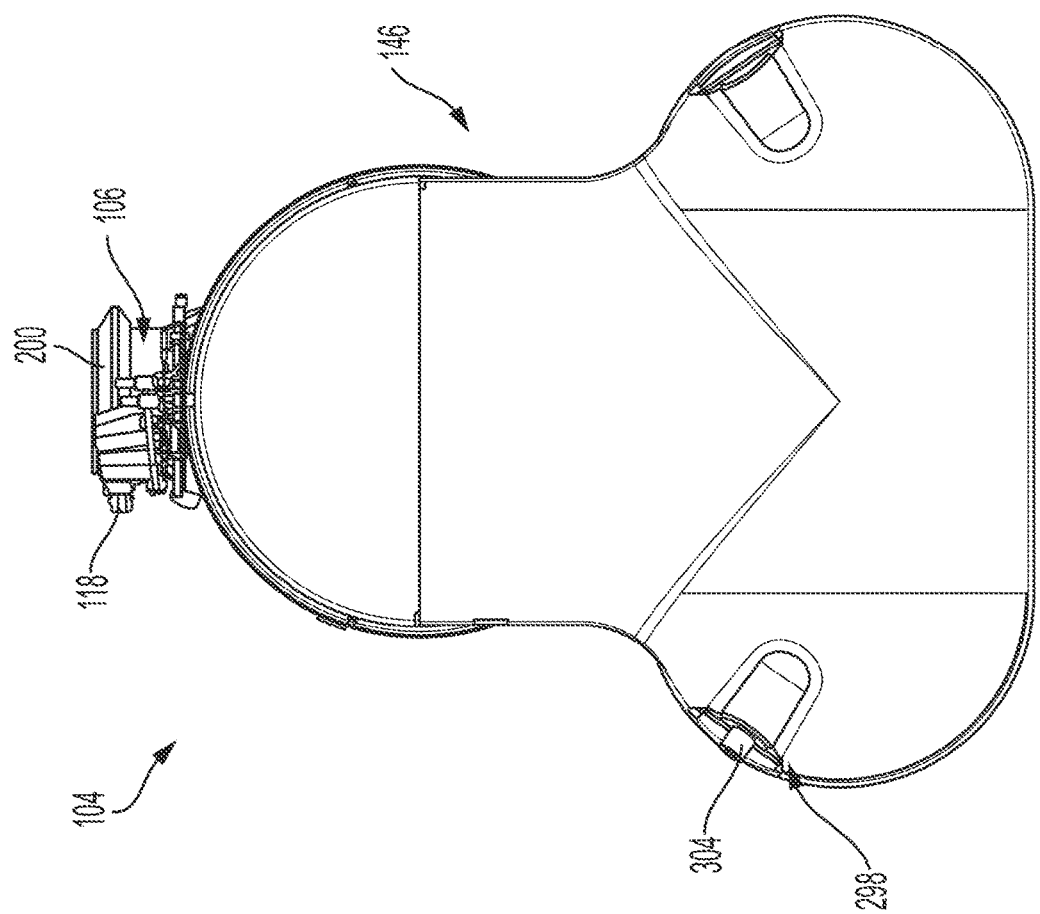
FIG. 4 is a rear view of the housing assembly shown in FIG. 2.
Figure 5:
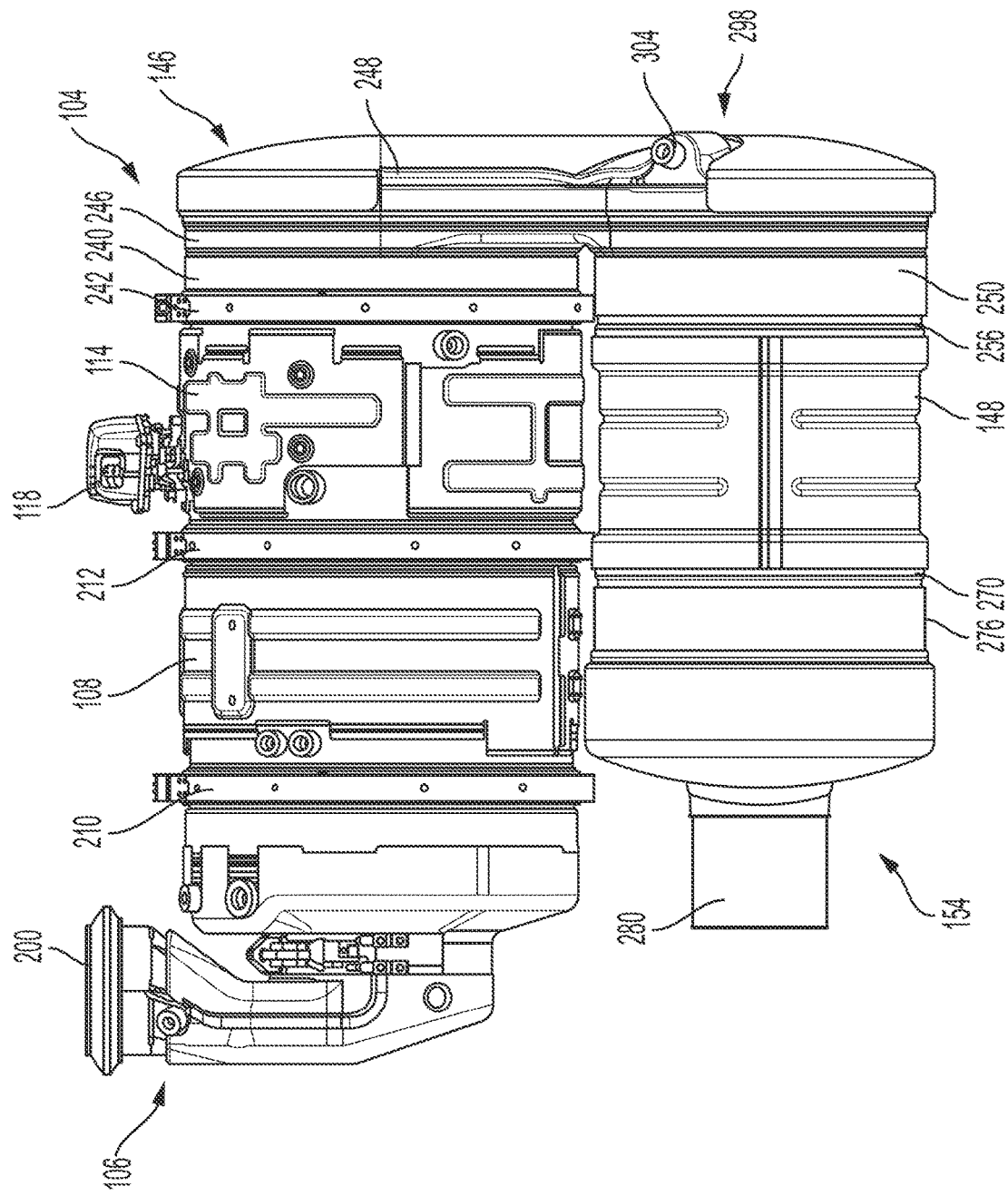
FIG. 5 is a side view of the housing assembly shown in FIG. 2.
Figure 6:
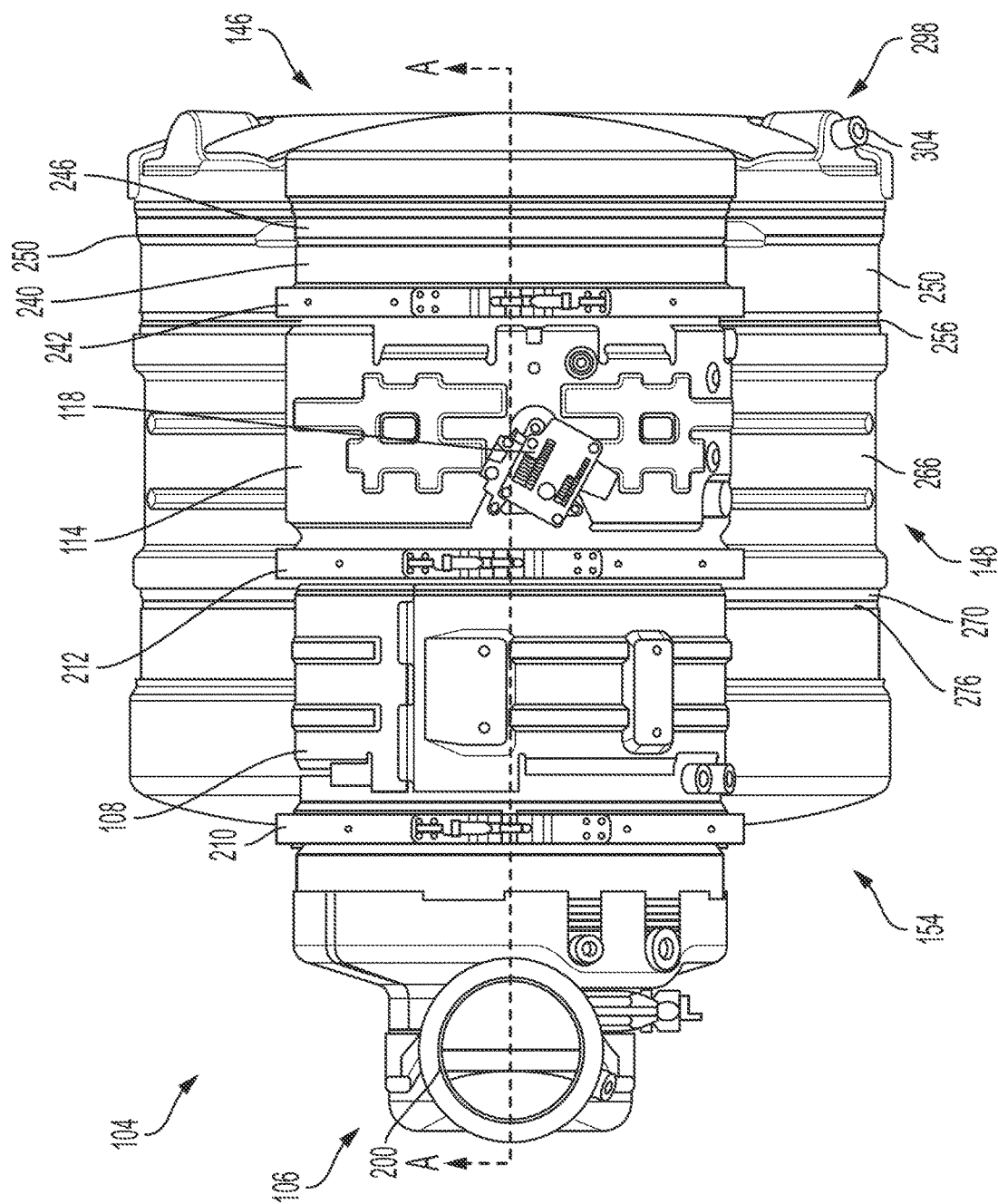
FIG. 6 is a top view of the housing assembly shown in FIG. 2.
Figure 7:
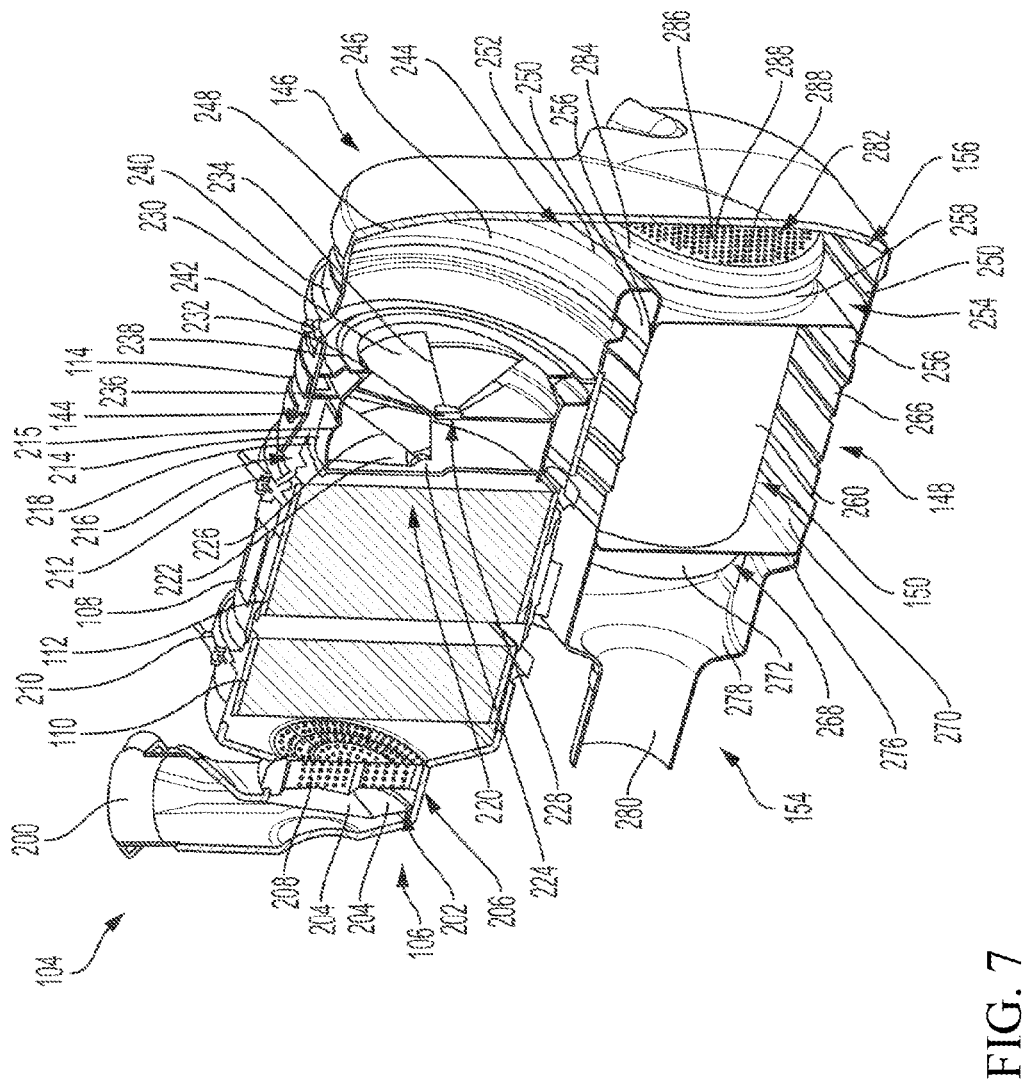
FIG. 7 is a cross-sectional view of the housing assembly shown in FIG. 2 taken along plane A-A in FIG. 6.

As discussed in more detail herein, the flow divider 156 can be deployed in various configurations. In FIGS. 3, 7, and 8, the flow divider 156 is arranged such that the first endcap flange 284 of the first endcap 282 is coupled to or integrally formed with the first support first catalyst member flange 258 of the first support 254 and the second endcap flange 292 of the second endcap 290 is coupled to or integrally formed with the first support second catalyst member flange 262 of the first support 254. In FIG. 11, the flow divider 156 is arranged such that the first endcap flange 284 of the first endcap 282 is coupled to or integrally formed with the second support first catalyst member flange 272 of the second support 268 and the second endcap flange 292 of the second endcap 290 is coupled to or integrally formed with the second support second catalyst member flange 274 of the second support 268.

FIG. 12 illustrates the housing assembly 104 according to various embodiments. In FIG. 12, the intake body 106 includes a plurality of deflecting plates 1200 (e.g., baffle ring, vanes, etc.). Each of the plurality of deflecting plates 1200 is disposed adjacent the intake body inlet 200 and is configured to deflect the exhaust gas flowing into the intake body inlet 200 radially outward. Through the use of the deflecting plates 1200, the exhaust gas can be more evenly distributed across the oxidation catalyst 110.

As shown in FIG. 12, the decomposition housing 114 is combined with the distributing housing 146 and the decomposition housing 114 is not centered on the upstream housing axis λ. As a result, the housing assembly 104 does not include a distributing housing band clamp 242.

IV. Overview of Second Exhaust Gas Aftertreatment System

Figure 13:
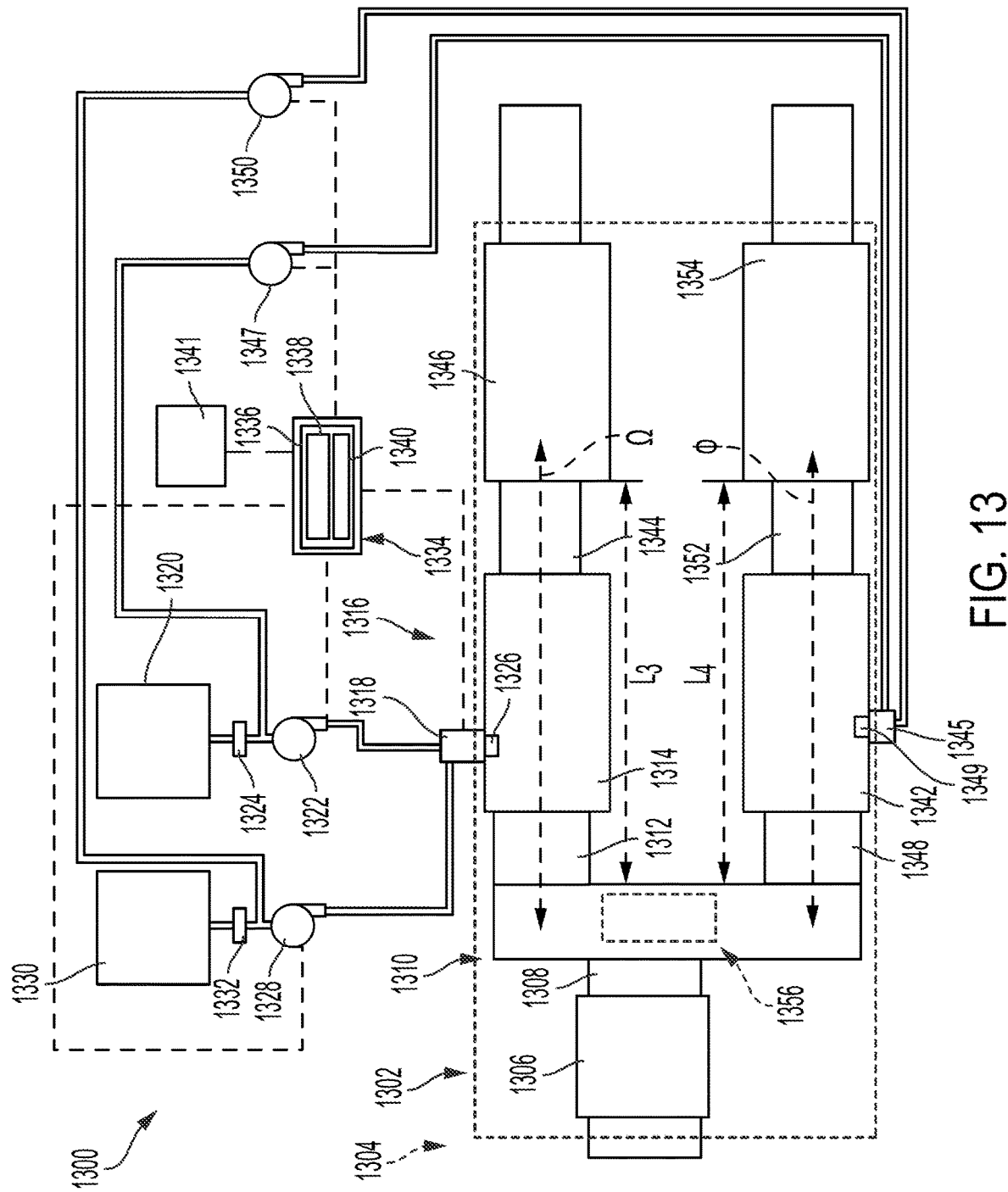
FIG. 13 is a schematic diagram of another example exhaust gas aftertreatment system including a housing assembly with a distributing housing.

FIG. 13 depicts an exhaust gas aftertreatment system 1300 for treating exhaust gas produced by an internal combustion engine. The exhaust gas aftertreatment system 1300 includes an exhaust gas conduit system 1302. As is explained in more detail herein, the exhaust gas conduit system 1302 is configured to route exhaust gas throughout the exhaust gas aftertreatment system 1300.

The exhaust gas aftertreatment system 1300 also includes a housing assembly 1304. As is explained in more detail herein, the housing assembly 1304 is configured to redirect the exhaust gas (e.g., from a first direction to a second direction, etc.) while facilitating treatment of the exhaust gas. In redirecting the exhaust gas, the housing assembly 1304 may function as a switchback (e.g., redirecting the exhaust gas from a first direction to a second direction that is opposite to the first direction, redirecting the exhaust gas from a first direction to a second direction that is opposite to the first direction and parallel to the first direction, etc.).

The housing assembly 1304 includes an exhaust gas filtration device 1306 (e.g., a DPF, etc.). The exhaust gas filtration device 1306 is configured to remove particulates, such as soot, from the exhaust gas flowing in the exhaust gas conduit system 1302. The exhaust gas filtration device 1306 includes an inlet, where the exhaust gas is received (e.g., from an exhaust manifold of an internal combustion engine, etc.), and an outlet, where the exhaust gas exits after having particulates substantially filtered from the exhaust gas and/or converting the particulates into carbon dioxide.

The exhaust gas conduit system 1302 includes an upstream exhaust gas conduit 1308 (e.g., line, pipe, etc.). The upstream exhaust gas conduit 1308 is fluidly coupled to the exhaust gas filtration device 1306 and is configured to receive the exhaust gas from the exhaust gas filtration device 1306 (e.g., after particulates have been substantially filtered from the exhaust gas, after particulates have been converted into carbon dioxide, etc.).

The housing assembly 1304 also includes a distributing housing 1310 (e.g., pressure regulator, flow plenum, flow balancer, flow balancing system, etc.). The distributing housing 1310 is fluidly coupled to the upstream exhaust gas conduit 1308 and is configured to receive the exhaust gas from the upstream exhaust gas conduit 1308. As discussed in greater detail herein, the distributing housing 1310 divides the exhaust gas into a first portion and a second portion. In this way, the exhaust gas aftertreatment system 1300 can desirably utilize two catalyst members.

The exhaust gas conduit system 1302 also includes a first catalyst exhaust gas conduit 1312 (e.g., line, pipe, etc.). The first catalyst exhaust gas conduit 1312 is fluidly coupled to the distributing housing 1310 and is configured to receive the exhaust gas from the distributing housing 1310.

The housing assembly 1304 also includes a first decomposition housing 1314 (e.g., decomposition reactor, decomposition chamber, reactor pipe, decomposition tube, reactor tube, etc.). The first decomposition housing 1314 is fluidly coupled to the first catalyst exhaust gas conduit 1312 and configured to receive the exhaust gas from the first catalyst exhaust gas conduit 1312.

The exhaust gas aftertreatment system 1300 also includes a reductant delivery system 1316. As is explained in more detail herein, the reductant delivery system 1316 is configured to facilitate the introduction of the reductant into the exhaust gas. The reductant delivery system 1316 includes a first dosing module 1318 (e.g., doser, etc.). The first dosing module 1318 is configured to facilitate passage of the reductant through the first decomposition housing 1314 and into the first decomposition housing 1314. As is explained in more detail herein, the first dosing module 1318 is configured to receive reductant, and in some embodiments, configured to receive air and reductant, and provide the reductant and/or air-reductant mixture into the first decomposition housing 1314 to facilitate treatment of the exhaust gas. The first dosing module 1318 may include an insulator interposed between a portion of the first dosing module 1318 and the portion of the first decomposition housing 1314 on which the first dosing module 1318 is mounted. In various embodiments, the first dosing module 1318 is coupled to the first decomposition housing 1314.

The reductant delivery system 1316 also includes a reductant source 1320 (e.g., reductant tank, etc.). The reductant source 1320 is configured to contain reductant. The reductant source 1320 is fluidly coupled to the first dosing module 1318 and configured to provide the reductant to the first dosing module 1318. The reductant source 1320 may include multiple reductant sources 1320 (e.g., multiple tanks connected in series or in parallel, etc.). The reductant source 1320 may be, for example, a diesel exhaust fluid tank containing Adblue®.

The reductant delivery system 1316 also includes a first reductant pump 1322 (e.g., supply unit, etc.). The first reductant pump 1322 is fluidly coupled to the reductant delivery system 1316 and the first dosing module 1318 and configured to receive the reductant from the reductant source 1320 and to provide the reductant to the first dosing module 1318. The first reductant pump 1322 is used to pressurize the reductant from the reductant source 1320 for delivery to the first dosing module 1318. In some embodiments, the first reductant pump 1322 is pressure controlled (e.g., controlled to obtain a target pressure, etc.). In some embodiments, the first reductant pump 1322 is coupled to a chassis of a vehicle associated with the exhaust gas aftertreatment system 1300.

In some embodiments, the reductant delivery system 1316 also includes a reductant filter 1324. The reductant filter 1324 is fluidly coupled to the reductant source 1320 and the first reductant pump 1322 and is configured to receive the reductant from the reductant source 1320 and to provide the reductant to the first reductant pump 1322. The reductant filter 1324 filters (e.g., strains, etc.) the reductant prior to the reductant being provided to internal components (e.g., pistons, vanes, etc.) of the first reductant pump 1322. For example, the reductant filter 1324 may inhibit or prevent the transmission of solids (e.g., solidified reductant, contaminants, etc.) to the internal components of the first reductant pump 1322. In this way, the reductant filter 1324 may facilitate prolonged desirable operation of the first reductant pump 1322.

The first dosing module 1318 includes at least one first injector 1326 (e.g., insertion device, etc.). The first injector 1326 is configured to dose the reductant received by the first dosing module 1318 into the exhaust gas (e.g., within the first decomposition housing 1314, etc.).

In some embodiments, the reductant delivery system 1316 also includes a first air pump 1328 and an air source 1330 (e.g., air intake, etc.). The first air pump 1328 is fluidly coupled to the air source 1330 and is configured to receive air from the air source 1330. The first air pump 1328 is fluidly coupled to the first dosing module 1318 and is configured to provide the air to the first dosing module 1318. The first dosing module 1318 is configured to mix the air and the reductant into an air-reductant mixture and to provide the air-reductant mixture to the first injector 1326 (e.g., for dosing into the first decomposition housing 1314, etc.). In some of these embodiments, the reductant delivery system 1316 also includes an air filter 1332. The air filter 1332 is fluidly coupled to the air source 1330 and the first air pump 1328 and is configured to receive the air from the air source 1330 and to provide the air to the first air pump 1328. The air filter 1332 is configured to filter the air prior to the air being provided to the first air pump 1328. In other embodiments, the reductant delivery system 1316 does not include the first air pump 1328 and/or the reductant delivery system 1316 does not include the air source 1330. In such embodiments, the first dosing module 1318 is not configured to mix the reductant with air (e.g., the first dosing module 1318 is a reductant-only dosing module, etc.).

The exhaust gas aftertreatment system 1300 also includes a controller 1334. The first dosing module 1318, the first reductant pump 1322, and the first air pump 1328 are also electrically or communicatively coupled to the controller 1334. The controller 1334 is configured to control the first dosing module 1318 to dose the reductant and/or the air-reductant mixture into the first decomposition housing 1314. The controller 1334 may also be configured to control the first reductant pump 1322 and/or the first air pump 1328 in order to control the reductant and/or the air-reductant mixture that is dosed into the first decomposition housing 1314.

The controller 1334 includes a processing circuit 1336. The processing circuit 1336 includes a processor 1338 and a memory 1340. The processor 1338 may include a microprocessor, an ASIC, a FPGA, etc., or combinations thereof. The memory 1340 may include, but is not limited to, electronic, optical, magnetic, or any other storage or transmission device capable of providing a processor, ASIC, FPGA, etc. with program instructions. This memory 1340 may include a memory chip, EEPROM, EPROM, flash memory, or any other suitable memory from which the controller 1334 can read instructions. The instructions may include code from any suitable programming language. The memory 1340 may include various modules that include instructions which are configured to be implemented by the processor 1338.

In various embodiments, the controller 1334 is configured to communicate with a central controller 1341 (e.g., ECU, ECM, etc.) of an internal combustion engine having the exhaust gas aftertreatment system 1300. In some embodiments, the central controller 1341 and the controller 1334 are integrated into a single controller.

In some embodiments, the central controller 1341 is communicable with a display device. The display device may be configured to change state in response to receiving information from the central controller 1341. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 1341. By changing state, the display device may provide an indication to a user (e.g., operator, etc.) of a status (e.g., operation, in need of service, etc.) of the reductant delivery system 1316.

The exhaust gas conduit system 1302 also includes a first catalyst member exhaust gas conduit 1344 (e.g., line, pipe, etc.). The first catalyst member exhaust gas conduit 1344 is fluidly coupled to the first decomposition housing 1314 and configured to receive the first portion of the exhaust gas from the first decomposition housing 1314 (e.g., after the exhaust gas has been provided with reductant, after the exhaust gas has been provided with an air-reductant mixture, etc.).

The exhaust gas aftertreatment system 1300 also includes a first catalyst member 1346 (e.g., first selective catalytic reduction (SCR) catalyst member, etc.). The first catalyst member 1346 is positioned within the housing assembly 1304. The first catalyst member 1346 is fluidly coupled to the first catalyst member exhaust gas conduit 1344 and is configured to receive the exhaust gas from the first catalyst member exhaust gas conduit 1344. The first catalyst member 1346 is configured to cause decomposition of the exhaust gas using the reductant. The first decomposition housing 1314 is disposed upstream of the first catalyst member 1346. As a result, the reductant is injected by the first injector 1326 upstream of the first catalyst member 1346 such that the first catalyst member 1346 is configured to receive a mixture of the reductant and exhaust gas. The reductant droplets undergo the processes of evaporation, thermolysis, and hydrolysis to form non-$NO_x$ emissions within the first decomposition housing 1314, the first catalyst member 1346, and/or the exhaust gas conduit system 1302.

The first catalyst member 1346 is configured to assist in the reduction of $NO_x$ emissions by accelerating a $NO_x$ reduction process between the reductant and the $NO_x$ of the exhaust gas into diatomic nitrogen, water, and/or carbon dioxide. The first catalyst member 1346 includes an inlet fluidly coupled to the first decomposition housing 1314 from which exhaust gas and reductant are configured to be received and an outlet fluidly coupled to an end (e.g., tailpipe, etc.) of the exhaust gas conduit system 1302 which provides the exhaust gas to atmosphere The first catalyst member 1346 is centered on a first axis $\Omega$. In other words, a center point of a cross-section of the first catalyst member 1346 is disposed on the first axis $\Omega$ along a length of the first catalyst member 1346.

A first catalyst member separation length $L_3$ is measured from an outlet of the distributing housing 1310 to an inlet of the first catalyst member 1346 along the first axis $\Omega$. In various embodiments, the first catalyst member separation length $L_3$ is approximately equal to between 6 inches (in) and 30 in, inclusive (e.g., 5.7 in, 6 in, 15 in, 23 in, 26 in, 28 in, 30 in, 31.5 in, etc.).

The exhaust gas conduit system 1302 also includes a second catalyst exhaust gas conduit 1348 (e.g., line, pipe, etc.). The second catalyst exhaust gas conduit 1348 is fluidly coupled to the distributing housing 1310 and configured to receive the second portion of the exhaust gas from the distributing housing 1310 (e.g., separate from the first portion of the exhaust gas received by the first catalyst exhaust gas conduit 1312, etc.).

The reductant delivery system 1316 further includes a second decomposition housing 1342 (e.g., decomposition reactor, decomposition chamber, reactor pipe, decomposition tube, reactor tube, etc.). The second decomposition housing 1342 is fluidly coupled to the second catalyst exhaust gas conduit 1348 and is configured to receive the exhaust gas from the second catalyst exhaust gas conduit 1348.

The reductant delivery system 1316 also includes a second dosing module 1345 (e.g., doser, etc.). The second dosing module 1345 is mounted on the second decomposition housing 1342. As is explained in more detail herein, the second dosing module 1345 is configured to receive reductant, and in some embodiments, configured to receive air and reductant, and provide the reductant and/or the air-reductant mixture into the exhaust gas conduit system 1302 to facilitate treatment of the exhaust gas.

In various embodiments, the first dosing module 1318 is configured to receive air and reductant, and provides the air-reductant mixture into the first decomposition housing 1314 and the second dosing module 1345 configured to receive reductant (and does not receive air), and provides the reductant into the second decomposition housing 1342. In various embodiments, the first dosing module 1318 is configured to receive reductant (and does not receive air), and provides the reductant into the first decomposition housing 1314 and the second dosing module 1345 configured to receive air and reductant, and provides the air-reductant mixture into the second decomposition housing 1342. In various embodiments, the first dosing module 1318 is configured to receive reductant (and does not receive air), and provides the reductant into the first decomposition housing 1314 and the second dosing module 1345 is configured to receive reductant (and does not receive air), and provides the reductant into the second decomposition housing 1342. In various embodiments, the first dosing module 1318 is configured to receive receives air and reductant, and provides the air-reductant mixture into the first decomposition housing 1314 and the second dosing module 1345 is configured to receive air and reductant, and provides the air-reductant mixture into the second decomposition housing 1342.

The second dosing module 1345 may include an insulator interposed between a portion of the second dosing module 1345 and the portion of the second decomposition housing 1342 on which the second dosing module 1345 is mounted. The second dosing module 1345 is fluidly coupled to the reductant source 1320.

The reductant delivery system 1316 also includes a second reductant pump 1347 (e.g., supply unit, etc.). The second reductant pump 1347 is fluidly coupled to the reductant source 1320 and is configured to receive the reductant from the reductant source 1320. The second reductant pump 1347 is used to pressurize the reductant from the reductant source 1320 for delivery to the second dosing module 1345. In some embodiments, the second reductant pump 1347 is pressure controlled (e.g., controlled to obtain a target pressure, etc.).

In embodiments where the reductant delivery system 1316 includes the reductant filter 1324, the second reductant pump 1347 may be configured to receive the reductant from the reductant filter 1324. The reductant filter 1324 filters the reductant prior to the reductant being provided to internal components of the second reductant pump 1347. For example, the reductant filter 1324 may inhibit or prevent the transmission of solids to the internal components of the second reductant pump 1347. In this way, the reductant filter 1324 may facilitate prolonged desirable operation of the second reductant pump 1347. In some embodiments, the second reductant pump 1347 is coupled to a chassis of a vehicle associated with the exhaust gas aftertreatment system 1300.

The second dosing module 1345 includes at least one second injector 1349 (e.g., insertion device, etc.). The second injector 1349 is configured to dose the reductant received by the second dosing module 1345 into the exhaust gas (e.g., within the second decomposition housing 1342, etc.).

In some embodiments, the reductant delivery system 1316 also includes a second air pump 1350. In these embodiments, the second air pump 1350 is fluidly coupled to the air source 1330 and is configured to receive air from the air source 1330. The second air pump 1350 is fluidly coupled to the second dosing module 1345 and is configured to provide the air to the second dosing module 1345. The second dosing module 1345 is configured to mix the air and the reductant into an air-reductant mixture and to provide the air-reductant mixture into the second decomposition housing 1342. In some of these embodiments, the reductant delivery system 1316 also includes the air filter 1332 and the second air pump 1350 is fluidly coupled to the air filter 1332 and configured to receive the air from the air filter 1332. In other embodiments, the reductant delivery system 1316 does not include the second air pump 1350 and/or the reductant delivery system 1316 does not include the air source 1330. In such embodiments, the second dosing module 1345 is not configured to mix the reductant with air (e.g., the second dosing module 1345 is a reductant-only dosing module, etc.).

The second dosing module 1345, the second reductant pump 1347, and the second air pump 1350 are also electrically or communicatively coupled to the controller 1334. The controller 1334 is configured to control the second dosing module 1345 to dose the reductant and/or the air-reductant mixture into the second decomposition housing 1342. The controller 1334 may also be configured to control the second reductant pump 1347 and/or the second air pump 1350 in order to control the reductant and/or the air-reductant mixture that is dosed into the second decomposition housing 1342.

The exhaust gas conduit system 1302 also includes a second catalyst member exhaust gas conduit 1352 (e.g., line, pipe, etc.). The second catalyst member exhaust gas conduit 1352 is fluidly coupled to the second decomposition housing 1342 and configured to receive the second portion of the exhaust gas from the second decomposition housing 1342.

The exhaust gas aftertreatment system 1300 also includes a second catalyst member 1354. The second catalyst member 1354 is positioned within the housing assembly 1304. The second catalyst member 1354 is fluidly coupled to the second catalyst member exhaust gas conduit 1352 and is configured to receive the exhaust gas from the second catalyst member exhaust gas conduit 1352. The second catalyst member 1354 is configured to cause decomposition of the exhaust gas using the reductant. The second decomposition housing 1342 is disposed upstream of the second catalyst member 1354. As a result, the reductant is injected by the second injector 1349 upstream of the second catalyst member 1354 such that the second catalyst member 1354 is configured to receive a mixture of the reductant and exhaust gas. The reductant droplets undergo the processes of evaporation, thermolysis, and hydrolysis to form non-$NO_x$ emissions (e.g., gaseous ammonia, etc.) within the second decomposition housing 1342, the second catalyst member 1354, and/or the exhaust gas conduit system 1302.

The second catalyst member 1354 is configured to assist in the reduction of $NO_x$ emissions by accelerating a $NO_x$ reduction process between the reductant and the $NO_x$ of the exhaust gas into diatomic nitrogen, water, and/or carbon dioxide. The second catalyst member 1354 includes an inlet fluidly coupled to the second decomposition housing 1342 from which exhaust gas and reductant are configured to be received and an outlet fluidly coupled to an end (e.g., tailpipe, etc.) of the exhaust gas conduit system 1302 which provides the exhaust gas to atmosphere.

The second catalyst member 1354 is centered on a second axis $\Phi$. In other words, a center point of a cross-section of the second catalyst member 1354 is disposed on the second axis $\Phi$ along a length of the second catalyst member 1354. In various embodiments, the second axis $\Phi$ is approximately parallel to (e.g., is within 5° of parallel to, is parallel to, etc.) the first axis $\Omega$.

A second catalyst member separation length $L_4$ is measured from an outlet of the distributing housing 1310 to an inlet of the second catalyst member 1354 along the second axis $\Phi$. In various embodiments, the second catalyst member separation length $L_4$ is approximately equal to the first catalyst member separation length $L_3$ (e.g., $L_4=0.95*L_3$, $L_4=L_3$, $L_4=1.05*L_3$, etc.), inclusive. The second catalyst member separation length $L_4$ being approximately equal to the first catalyst member separation length $L_3$ may result in the exhaust gas aftertreatment system 1300 having a shorter system length and a symmetric architecture which is advantageous.

In various embodiments, the second catalyst member separation length $L_4$ is approximately equal to between 6 in and 30 in, inclusive (e.g., 5.7 in, 6 in, 15 in, 23 in, 26 in, 28 in, 30 in, 31.5 in, etc.).

In various embodiments, the housing assembly 1304 also includes a flow divider 1356 (e.g., flow splitter, stream partition, etc.). The flow divider 1356 is configured to balance (e.g., equalize, evenly divide, etc.) the first portion of the exhaust gas provided by the first catalyst member 1346 and the second portion of the exhaust gas provided by the second catalyst member 1354. For example, the first portion may be balanced with the second portion when a first parameter (e.g., flow rate, mass flow rate, volumetric flow rate, velocity, pressure, etc.) of the first portion is approximately equal to the second parameter (e.g., flow rate, mass flow rate, volumetric flow rate, velocity, pressure, etc.). By balancing the first portion and the second portion, reduction of emission of undesirable components in the exhaust gas is more desirable. For example, balancing the first portion and the second portion may decrease a backpressure of the exhaust gas aftertreatment system 1300, thereby increasing an efficiency and/or output of an internal combustion engine having the exhaust gas aftertreatment system 1300.

In some embodiments, the flow divider 1356 is located upstream of the first catalyst member 1346 and/or the second catalyst member 1354. For example, the flow divider 1356 may be located within the distributing housing 1310. In this example, the flow divider 1356 may separate a first portion of the exhaust gas provided to the first catalyst member 1346 from a second portion of the exhaust gas provided to the second catalyst member 1354 after balancing the first portion and the second portion. In another example, a portion of the flow divider 1356 may be coupled to an inlet of the first catalyst member 1346 and another portion of the flow divider 1356 may be coupled to an inlet of the second catalyst member 1354.

In some embodiments, the flow divider 1356 is located downstream of the first catalyst member 1346 and/or the second catalyst member 1354. For example, a portion of the flow divider 1356 may be coupled to an outlet of the first catalyst member 1346 and another portion of the flow divider 1356 may be coupled to an outlet of the second catalyst member 1354.

While the exhaust gas aftertreatment system 1300 has been shown and described in the context of use with a diesel internal combustion engine, it is understood that the exhaust gas aftertreatment system 1300 may be used with other internal combustion engines, such as gasoline internal combustion engines, hybrid internal combustion engines, propane internal combustion engines, and other similar internal combustion engines.

V. Example Distributing Housings for the Second Exhaust Gas Aftertreatment System FIGS. 14-17 illustrate the distributing housing 1310 in greater detail, according to various embodiments. The distributing housing 1310 includes an inlet section 1400 (e.g., vent, intake, recess, etc.). The inlet section 1400 includes an inlet section inlet 1402. The inlet section inlet 1402 is fluidly coupled to the upstream exhaust gas conduit 1308 and configured to receive the exhaust gas from the upstream exhaust gas conduit 1308 (e.g., after the particulate has been removed from the exhaust gas by the exhaust gas filtration device 1306, etc.). In various embodiments, the inlet section 1400 is coupled to the upstream exhaust gas conduit 1308. For example, the inlet section 1400 may be fastened, welded, riveted, or otherwise attached to the upstream exhaust gas conduit 1308. In other embodiments, the inlet section 1400 is integrally formed with the upstream exhaust gas conduit 1308.

The inlet section inlet 1402 is centered on an inlet axis $\alpha$. In other words, a center point of a cross-section of the inlet section inlet 1402 is disposed on the inlet axis $\alpha$. In some embodiments, the inlet axis $\alpha$ is approximately parallel to the first axis $\Omega$ and/or is approximately parallel to the second axis $\Phi$.

The inlet section 1400 also includes an inlet section flange 1404 (e.g., ring-shaped projection, circular protuberance, annular rib, etc.). The inlet section flange 1404 extends at least partially around the inlet section inlet 1402 (e.g., the inlet section flange 1404 circumscribes the inlet section inlet 1402, etc.). In some embodiments, the inlet section flange 1404 abuts the upstream exhaust gas conduit 1308. In various embodiments, the inlet section flange 1404 wraps (e.g., extends, etc.) around the upstream exhaust gas conduit 1308. In some embodiments, the inlet section flange 1404 is generally annular. In other embodiments, the inlet section flange 1404 is rectangular or prismatic.

The inlet section 1400 also includes an inlet section outlet 1406 (e.g., exhaust, exit, etc.). The inlet section outlet 1406 is fluidly coupled to the inlet section inlet 1402 and configured to receive the exhaust gas from the inlet section inlet 1402.

Figure 15:
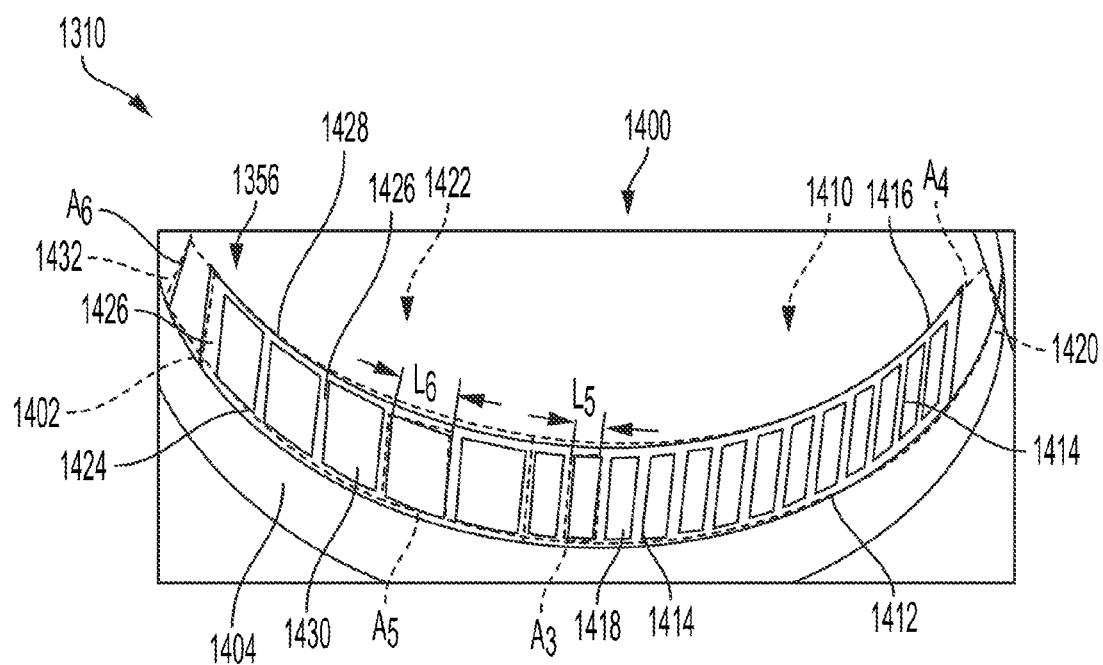
FIG. 15 is a view of Detail A shown in FIG. 14.

FIG. 15 illustrates a view of Detail A of the distributing housing 1310. The flow divider 1356 divides the exhaust gas into the first portion of the exhaust gas (e.g., that is provided into the first catalyst exhaust gas conduit 1312, etc.) and into the second portion of the exhaust gas (e.g., that is provided into the second catalyst exhaust gas conduit 1348, etc.). In this way, the flow divider 1356 can be used to control flows of the exhaust gas to the first catalyst member 1346 and the second catalyst member 1354, thereby enhancing desirable operation of the exhaust gas aftertreatment system 1300. In various embodiments, the flow divider 1356 is coupled to the inlet section 1400 at least partially along the inlet section outlet 1406.

The flow divider 1356 includes a first portion 1410 (e.g., section, fragment, segment, plate, etc.). As is explained in more detail herein, the first portion 1410 is configured to control flow of the exhaust gas towards the first catalyst exhaust gas conduit 1312. The first portion 1410 includes a first portion first frame 1412 (e.g., mount, body, etc.) that extends along the inlet section 1400. In various embodiments, the first portion first frame 1412 is coupled to the inlet section 1400.

The first portion 1410 also includes a plurality of first dividers 1414 (e.g., cross-members, braces, etc.). In various embodiments, each of the first dividers 1414 extends from the first portion first frame 1412 and is coupled to, or integrally formed with, the first portion first frame 1412.

The first portion 1410 also includes a first portion second frame 1416 (e.g., mount, body, etc.) that extends along a second side of the first portion 1410. The first dividers 1414 each extend from the first portion first frame 1412 to the first portion second frame 1416 to define one or more first apertures 1418 (e.g., holes, perforations, etc.). The first apertures 1418 are configured to receive the first portion of the exhaust gas from the inlet section 1400 and facilitate passage of the first portion of the exhaust gas through the first portion 1410 and to the inlet section outlet 1406. The first apertures 1418 each define a first aperture area $A_3$. The first aperture area $A_3$ of each of the first apertures 1418 may be different from, or the same as, the first aperture areas $A_3$ of the others of the first apertures 1418. In various embodiments, the first aperture areas $A_3$ are each approximately equal to between 0.50 in$^2$ and 2.50 in$^2$, inclusive (e.g., 0.475 in$^2$, 0.50 in$^2$, 1.0 in$^2$, 1.8 in$^2$, 2.50 in$^2$, 2.625 in$^2$, etc.). In some embodiments, the first aperture area $A_3$ of each of the first apertures 1418 are equal. Each of the first dividers 1414 is separated from another of the first dividers 1414 by a first divider length $L_5$. The first divider length $L_5$ of each of the first dividers 1414 may be different from, or the same as, the first divider lengths $L_5$ of the others of the first dividers 1414. In various embodiments, the first divider lengths $L_5$ are each approximately equal to between 0.10 in and 2 in, inclusive (e.g., 0.095 in, 0.15 in, 0.4 in, 1 in, 1.2 in, 1.6 in, 2.1 in, etc.). In some embodiments, the first divider lengths $L_5$ of each of the first dividers 1414 are equal.

In various embodiments, the first portion 1410 and the inlet section 1400 define a first window 1420 (e.g., gap, etc.). Similar to the first apertures 1418, the first window 1420 is configured to receive the first portion of the exhaust gas from the inlet section 1400 and facilitate passage of the first portion of the exhaust gas through the first portion 1410 and to the inlet section outlet 1406. The first window 1420 defines a first window area $A_4$. In various embodiments, the first window area $A_4$ is approximately equal to between 0.05 in$^2$ and line, inclusive (e.g., 0.0475 in$^2$, 0.05 in$^2$, 0.8 in$^2$, 1 in$^2$, 1.05 in$^2$, etc.). In other embodiments, the first portion 1410 and the inlet section 1400 do not define the first window 1420 (e.g., the first window area $A_4$ is equal to 0, etc.).

A sum of the first aperture areas $A_3$ for all of the first apertures 1418 and the first window area $A_4$ defines a first total area $\xi$ of the first portion 1410. This first total area $\xi$ is the entirety of the area in and around the first portion 1410 that the exhaust gas can flow through towards the inlet section outlet 1406. In some embodiments, the first portion 1410 and the inlet section 1400 do not define the first window 1420. In these embodiments, the first total area $\xi$ of the first portion 1410 only includes the sum of the first aperture areas $A_3$ for all of the first apertures 1418 (e.g., because the first window area $A_4$ is equal to 0).

The flow divider 1356 includes a second portion 1422 (e.g., section, fragment, segment, plate, etc.). As is explained in more detail here, the second portion 1422 is configured to control flow of the exhaust gas towards the second catalyst exhaust gas conduit 1348. The second portion 1422 includes a second portion first frame 1424 (e.g., mount, body, etc.) that extends along the inlet section 1400. In various embodiments, the second portion first frame 1424 is coupled to the inlet section 1400.

In some embodiments, such as shown in FIG. 15, the second portion 1422 is integrally formed with the first portion 1410. In various embodiments, the second portion 1422 is not integrally formed with the first portion 1410, but is contiguous with the first portion 1410 (e.g., the second portion 1422 abuts the first portion 1410, etc.). In various embodiments, the first portion 1410 and the second portion 1422 define a spacing between the first portion 1410 and the second portion 1422. Similar to the first window 1420, this spacing may facilitate passage of the first portion of the exhaust gas to the inlet section outlet 1406.

The second portion 1422 also includes a plurality of second dividers 1426 (e.g., cross-member, brace, etc.). In various embodiments, each of the second dividers 1426 extends from the second portion first frame 1424 and is coupled to, or integrally formed with, the second portion first frame 1424.

The second portion 1422 also includes a second portion second frame 1428 (e.g., mount, body, etc.) that extends along a second side of the second portion 1422. The second dividers 1426 each extend from the second portion first frame 1424 to the second portion second frame 1428 to define one or more second apertures 1430 (e.g., hole, perforation, etc.). The second apertures 1430 are configured to receive the second portion of the exhaust gas from the inlet section 1400 through the inlet section outlet 1406 and facilitate passage of the second portion of the exhaust gas through the second portion 1422. The second apertures 1430 each define a second aperture area $A_5$. The second aperture area $A_5$ of each of the second apertures 1430 may be different from, or the same as, the second aperture areas $A_5$ of the others of the second apertures 1430. In various embodiments, the second aperture area $A_5$ is approximately equal to between line and 5 in$^2$, inclusive (e.g., 0.95 in$^2$, 1 in$^2$, 1.8 in$^2$, 3 in$^2$, 3.15 in$^2$, etc.). In some embodiments, the second aperture area $A_5$ of each of the second apertures 1430 are equal. Each of the second dividers 1426 are separated from another of the second dividers 1426 by a second divider length $L_6$. The second divider length $L_6$ of each of the second dividers 1426 may be different from, or the same as, the second divider lengths $L_6$ of the others of the second dividers 1426. In various embodiments, the second divider lengths $L_6$ are each approximately equal to between 0.50 in and 3 in, inclusive (e.g., 0.475 in, 1 in, 3 in, 3.15 in, etc.). In some embodiments, the second divider lengths $L_6$ of each of the second dividers 1426 are equal.

In various embodiments, the second portion 1422 and the inlet section 1400 define a second window 1432 (e.g., gap, etc.). Similar to the second apertures 1430, the second window 1432 is configured to receive the second portion of the exhaust gas from the inlet section 1400 and facilitate passage of the second portion of the exhaust gas through the second portion 1422 and to the inlet section outlet 1406. The second window 1432 defines a second window area $A_6$. In various embodiments, the second window area $A_6$ is approximately equal to between 0.05 in$^2$ and line, inclusive (e.g., 0.0475 in$^2$, 0.05 in$^2$, 0.8 in$^2$, 1 in$^2$, 1.05 in$^2$, etc.). In other embodiments, the second portion 1422 and the inlet section 1400 do not define the second window 1432 (e.g., the second window area $A_6$ is equal to 0, etc.).

A sum of the second aperture areas $A_5$ for all of the second apertures 1430 and the second window area $A_6$ defines a second total area ν of the second portion 1422. This second total area ν is the entirety of the area in and around the second portion 1422 that the exhaust gas can flow through towards the inlet section outlet 1406. In some embodiments, the second portion 1422 and the inlet section 1400 do not define the second window 1432. In these embodiments, the second total area ν of the second portion 1422 only includes the sum of the second aperture areas $A_5$ for all of the second apertures 1430 (e.g., because the second window area $A_6$ is equal to 0).

In various embodiments, the second total area ν is not equal to the first total area ξ. A ratio, κ, of the first total area to the second total area ν (κ=ξ/ν) is selected such that flow of the exhaust gas is balanced (e.g., equalized, etc.) between the first catalyst exhaust gas conduit 1312 and the second catalyst exhaust gas conduit 1348. As a result, the first catalyst member 1346 and the second catalyst member 1354 receive the same amount (e.g., volume per unit time, etc.) of exhaust gas. Balancing the flow of the exhaust gas between the first catalyst exhaust gas conduit 1312 and the second catalyst exhaust gas conduit 1348 mitigates backpressure on an internal combustion engine having the exhaust gas aftertreatment system 1300. By using the distributing housing 1310, the first catalyst member separation length $L_3$ can be approximately equal to the second catalyst member separation length $L_4$. In other systems without a component to balance flows, exhaust conduits must be different lengths, thereby resulting in increased overall system length and an undesirable space claim.

In various embodiments, the ratio κ is approximately equal to between 1.25 and 10, inclusive (e.g., 1.1875, 1.25, 2, 4, 10, 10.5, etc.).

The distributing housing 1310 also includes a first body panel 1434 (e.g., plate, etc.). The first body panel 1434 is coupled to the inlet section 1400 and partially defines the inlet section outlet 1406. In some embodiments, the first body panel 1434 is planar. In various embodiments, the first body panel 1434 has a circular shape or rectangular shape.

The distributing housing 1310 also includes a second body panel 1436 (e.g., plate, etc.). The second body panel 1436 is coupled to the inlet section 1400, separated from the first body panel 1434, and partially defines the inlet section outlet 1406. The first body panel 1434 and the second body panel 1436 cooperatively define a casing (e.g., housing, etc.) for the distributing housing 1310 within which the exhaust gas is routed. In some embodiments, the second body panel 1436 is planar.

Figure 14:
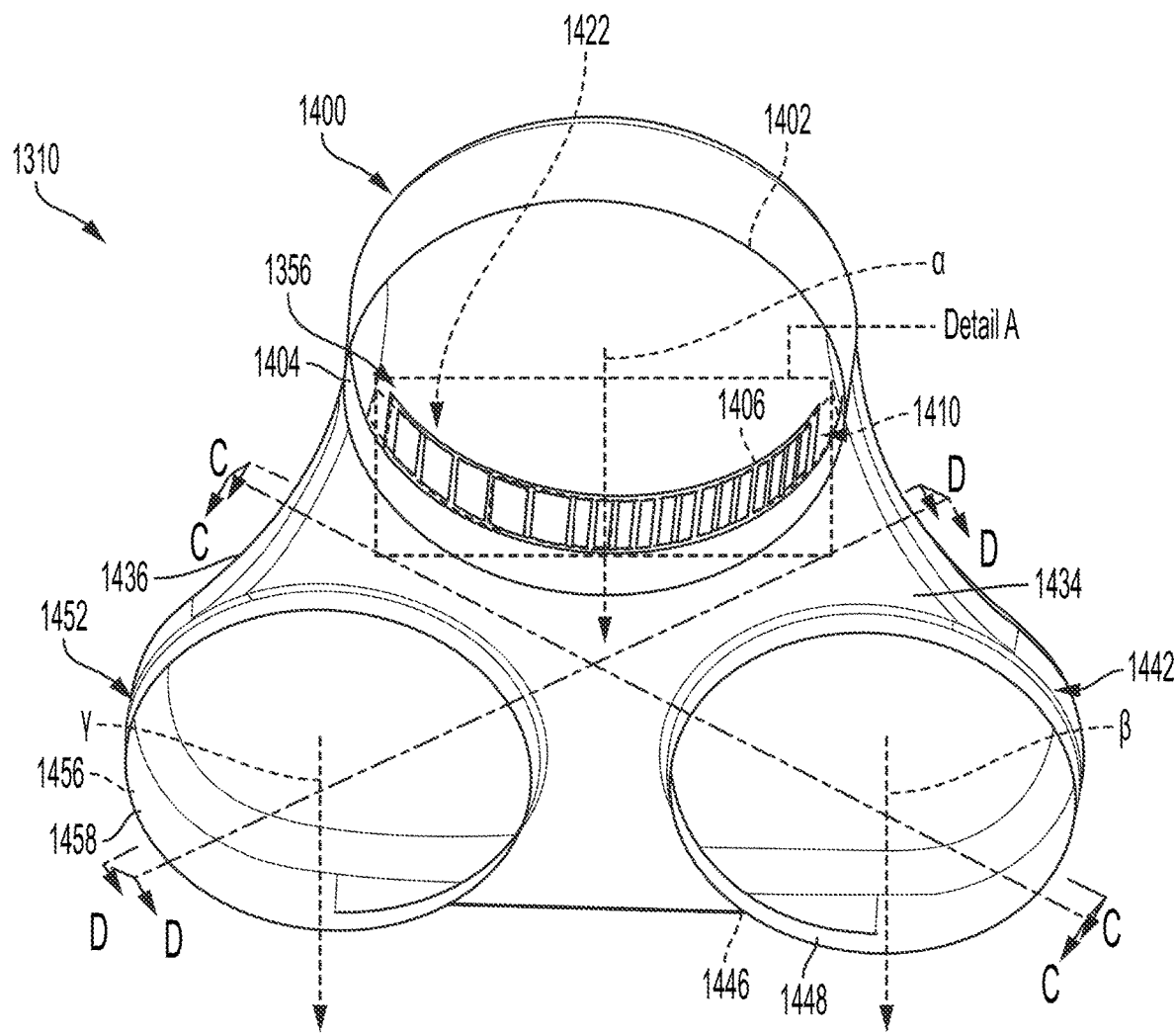
FIG. 14 is a perspective view of an example distributing housing for an exhaust gas aftertreatment system.
Figure 16:
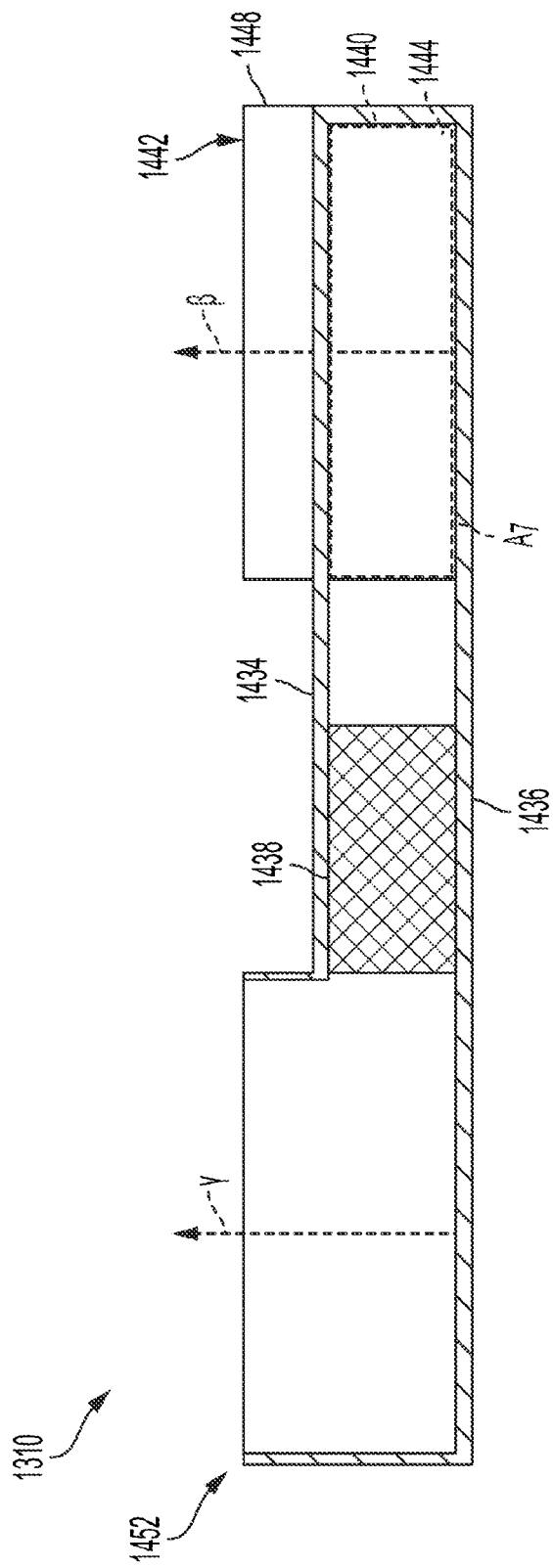
FIG. 16 is a cross-sectional view of the distributing housing shown in FIG. 14 taken along plane C-C.

FIG. 16 illustrates a cross-sectional view of the distributing housing 1310 shown in FIG. 14 taken along plane C-C. The distributing housing 1310 also includes a body divider 1438 (e.g., separator, partition, wall, rib, etc.). The body divider 1438 is coupled to the first body panel 1434 on a first end of the body divider 1438 and the second body panel 1436 on a second end of the body divider 1438. In this way, the body divider 1438 functions to divide exhaust gas flow exiting the inlet section outlet 1406 into the first portion of the exhaust gas, to be provided to the first catalyst member 1346, and the second portion of the exhaust gas, to be provided to the second catalyst member 1354. In some embodiments, the body divider 1438 is aligned with a center point between the first portion 1410 and the second portion 1422.

The distributing housing 1310 also includes a first body channel 1440 (e.g., passage, funnel, etc.). The first body channel 1440 is defined by the body divider 1438, the first body panel 1434, and the second body panel 1436. The first body channel 1440 is fluidly coupled to inlet section 1400 via the first portion 1410, such that the first body channel 1440 is configured to receive the first portion of the exhaust gas from the inlet section 1400 via the first portion 1410. The first body channel 1440 defines an area along a length of the first body channel 1440 and has a first cross-sectional area $A_7$. The first cross-sectional area $A_7$ may change, or be constant, along the length of the first body channel 1440. In various embodiments, the first cross-sectional area $A_7$ is approximately equal to between 5 $in^2$ and 15 $in^2$, inclusive (e.g., 4.75 $in^2$, 5 $in^2$, 10 $in^2$, 15 $in^2$, 15.75 $in^2$, etc.).

The distributing housing 1310 also includes a first outlet section 1442 (e.g., exhaust, exit, etc.). In some applications, the first outlet section 1442 is integrally formed with the first body panel 1434. The first outlet section 1442 includes a first outlet section inlet 1444. The first outlet section inlet 1444 is fluidly coupled to the first body channel 1440 and configured to receive the first portion of the exhaust gas from the first body channel 1440. The first outlet section inlet 1444 may be, for example, welded, fastened, or otherwise physically attached to the first body panel 1434. In some embodiments, the first outlet section inlet 1444 is integrally formed with the first body panel 1434. The first outlet section inlet 1444 defines a first outlet section inlet area $S_1$. In various embodiments, the first outlet section inlet area $S_1$ is approximately equal to between 5 $in^2$ and 25 $in^2$, inclusive (e.g., 4.75 $in^2$, 5 $in^2$, 10 $in^2$, 15 $in^2$, 20 $in^2$, 25 $in^2$, 26.25 $in^2$, etc.).

The first outlet section 1442 also includes a first outlet section outlet 1446 (e.g., exhaust, exit, etc.). The first outlet section outlet 1446 is fluidly coupled to the first outlet section inlet 1444 and is configured to receive the first portion of the exhaust gas from the first outlet section inlet 1444. The first outlet section outlet 1446 is fluidly coupled to the first catalyst exhaust gas conduit 1312 and is configured to provide the first portion of the exhaust gas to the first catalyst exhaust gas conduit 1312. In some embodiments, the first outlet section outlet 1446 is integrally formed with the first catalyst exhaust gas conduit 1312. The first outlet section outlet 1446 may be, for example, welded, fastened, or otherwise physically attached to the first catalyst exhaust gas conduit 1312.

The first outlet section outlet 1446 is centered on a first outlet axis β. In other words, a center point of a cross-section of the first outlet section outlet 1446 is disposed on the first outlet axis β. In some embodiments, the first outlet axis β is approximately parallel to the first axis Ω and/or is approximately parallel to the second axis Φ.

The first outlet section 1442 also includes a first outlet section flange 1448 (e.g., ring-shaped projection, circular protuberance, annular rib, etc.). The first outlet section flange 1448 extends at least partially around the first outlet section outlet 1446 (e.g., the first outlet section flange 1448 circumscribes the first outlet section outlet 1446, etc.). In some embodiments, the first outlet section flange 1448 is contiguous with the first catalyst exhaust gas conduit 1312. In various embodiments, the first outlet section flange 1448 wraps (e.g., extends, etc.) around the first catalyst exhaust gas conduit 1312. In some embodiments, the first outlet section flange 1448 is generally annular. In other embodiments, the first outlet section flange 1448 is rectangular or prismatic.

Figure 17:
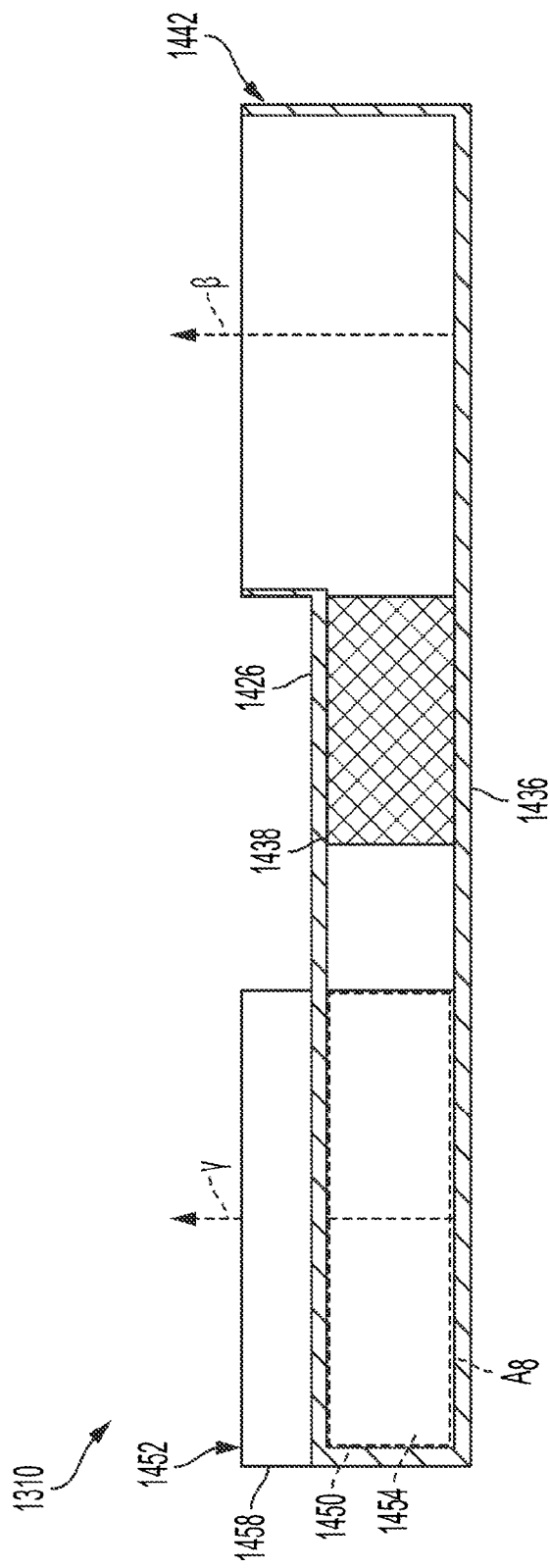
FIG. 17 is a cross-sectional view of the distributing housing shown in FIG. 14 taken along plane D-D.

FIG. 17 illustrates a cross-sectional view of the distributing housing 1310 shown in FIG. 14 taken along plane D-D. The distributing housing 1310 also includes a second body channel 1450 (e.g., passage, funnel, etc.). The second body channel 1450 is defined by the body divider 1438, the first body panel 1434, and the second body panel 1436. The second body channel 1450 is fluidly coupled to inlet section 1400 via the second portion 1422, such that the second body channel 1450 is configured to receive the second portion of the exhaust gas from the inlet section 1400 via the second portion 1422. The second body channel 1450 defines an area along a length of the second body channel 1450 and has a second cross-sectional area $A_8$. The second cross-sectional area $A_8$ may change, or be constant, along the length of the second body channel 1450. In various embodiments, the second cross-sectional area $A_8$ is approximately equal to between 5 $in^2$ and 15 $in^2$, inclusive (e.g., 4.75 $in^2$, 5 $in^2$, 10 $in^2$, 15 $in^2$, 15.75 $in^2$, etc.).

The distributing housing 1310 also includes a second outlet section 1452 (e.g., exhaust, exit, etc.). In some applications, the second outlet section 1452 is integrally formed with the first body panel 1434. The second outlet section 1452 includes a second outlet section inlet 1454.

The second outlet section inlet 1454 is fluidly coupled to second body channel 1450 and is configured to receive the second portion of the exhaust gas from the second body channel 1450. In some embodiments, the second outlet section inlet 1454 is integrally formed with the second body channel 1450. The second outlet section inlet 1454 may be, for example, welded, fastened, or otherwise physically attached to the second body channel 1450 The second outlet section inlet 1454 defines a second outlet section inlet area $S_2$. In various embodiments, the second outlet section inlet area $S_2$ is approximately equal to between 5 $in^2$ and 25 $in^2$, inclusive (e.g., 4.75 $in^2$, 5 $in^2$, 10 $in^2$, 15 $in^2$, 20 $in^2$, 25 $in^2$, 26.25 $in^2$, etc.).

The second outlet section 1452 also includes a second outlet section outlet 1456 (e.g., exhaust, exit, etc.). The second outlet section outlet 1456 is fluidly coupled to the second outlet section inlet 1454 and is configured to receive the second portion of the exhaust gas from the second outlet section inlet 1454.

The second outlet section outlet 1456 is fluidly coupled to second catalyst exhaust gas conduit 1348 and is configured to provide the second portion of the exhaust gas to the second catalyst exhaust gas conduit 1348. In some embodiments, the second outlet section outlet 1456 is integrally formed with the second catalyst exhaust gas conduit 1348. The second outlet section outlet 1456 may be, for example, welded, fastened, or otherwise physically attached to the second catalyst exhaust gas conduit 1348.

The second outlet section outlet 1456 is centered on a second outlet axis γ. In other words, a center point of a cross-section of the second outlet section outlet 1456 is disposed on the second outlet axis γ. In some embodiments, the second outlet axis γ is approximately parallel to the first axis Ω and/or is approximately parallel to the second axis Φ. In some embodiments, the second outlet axis γ is approximately parallel to the inlet axis α. In some embodiments, the second outlet axis γ is approximately parallel to the first outlet axis β. In some embodiments, the first outlet axis β is approximately parallel to the second outlet axis γ, the first outlet axis is approximately parallel to the inlet axis α, and at least one of: the first outlet axis is approximately parallel to the first axis Ω, or the second outlet axis γ is approximately parallel to the second axis Φ. In some embodiments, the first outlet axis β is coincident with the first axis Ω and/or the second outlet axis γ is coincident with the second axis Φ.

The second outlet section 1452 also includes a second outlet section flange 1458 (e.g., ring-shaped projection, circular protuberance, annular rib, etc.). The second outlet section flange 1458 extends at least partially around the second outlet section outlet 1456 (e.g., the second outlet section flange 1458 circumscribes the second outlet section outlet 1456, etc.). In some embodiments, the second outlet section flange 1458 is contiguous with the second catalyst exhaust gas conduit 1348. In various embodiments, the second outlet section flange 1458 wraps (e.g., extends, etc.) around the second catalyst exhaust gas conduit 1348. In some embodiments, the second outlet section flange 1458 is generally annular. In other embodiments, the second outlet section flange 1458 is rectangular or prismatic.

Figure 18:
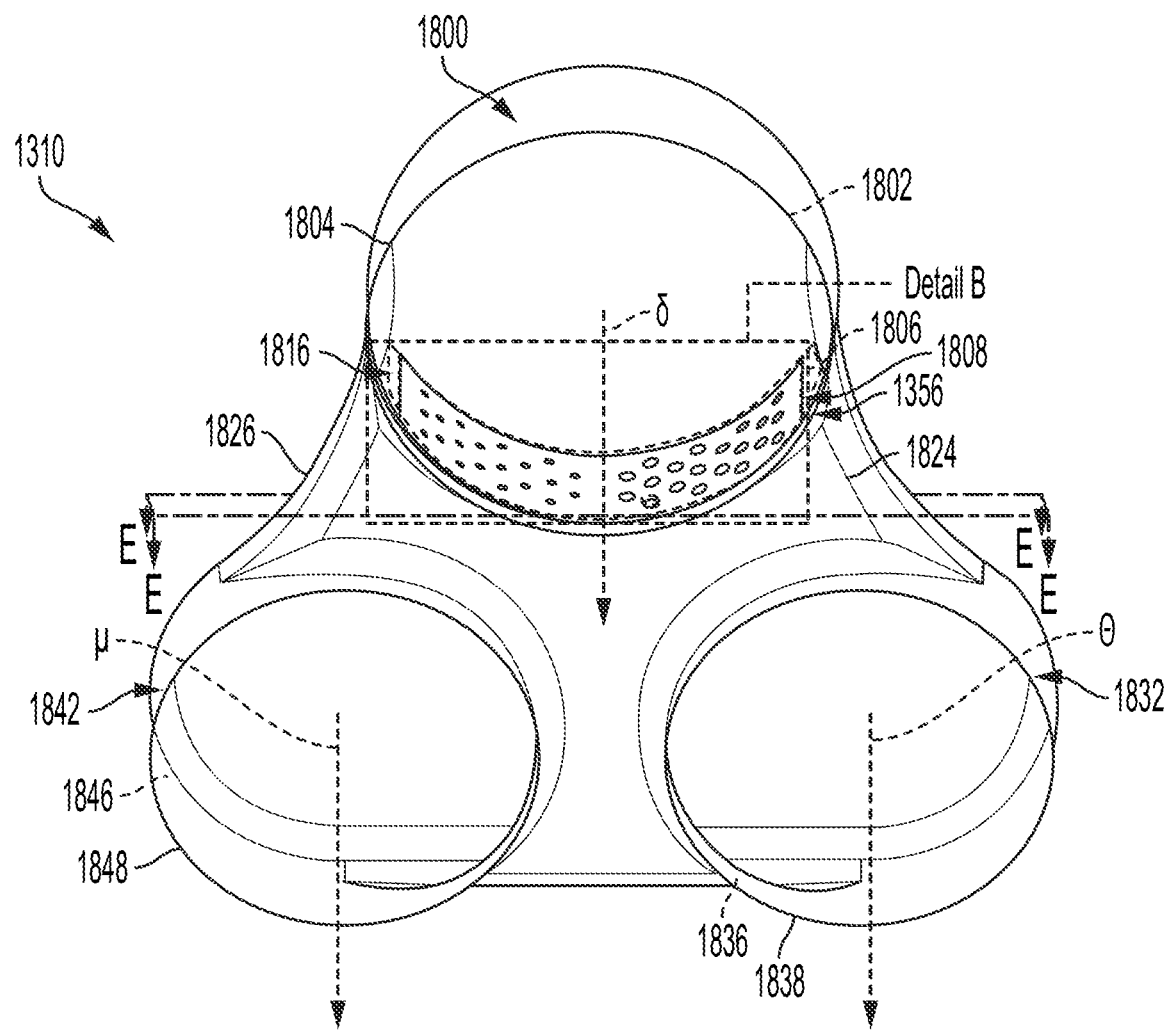
FIG. 18 is a perspective view of another example distributing housing for an exhaust gas aftertreatment system.
Figure 19:
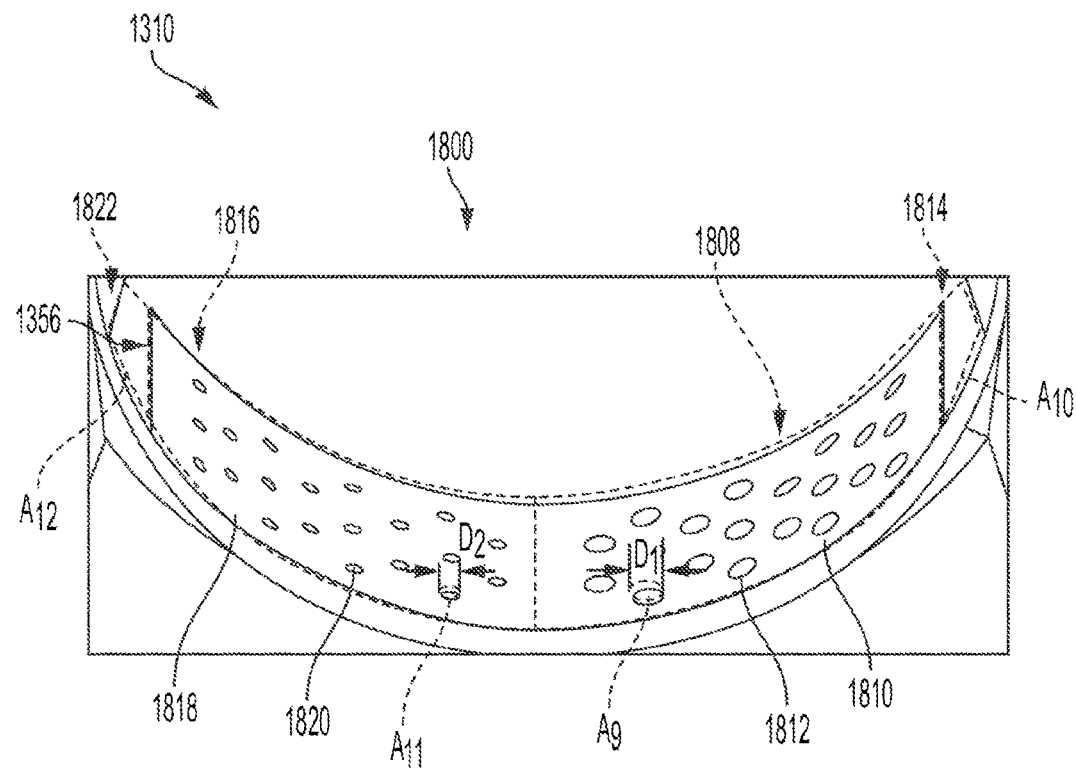
FIG. 19 is a view of Detail B shown in FIG. 18.
Figure 20:
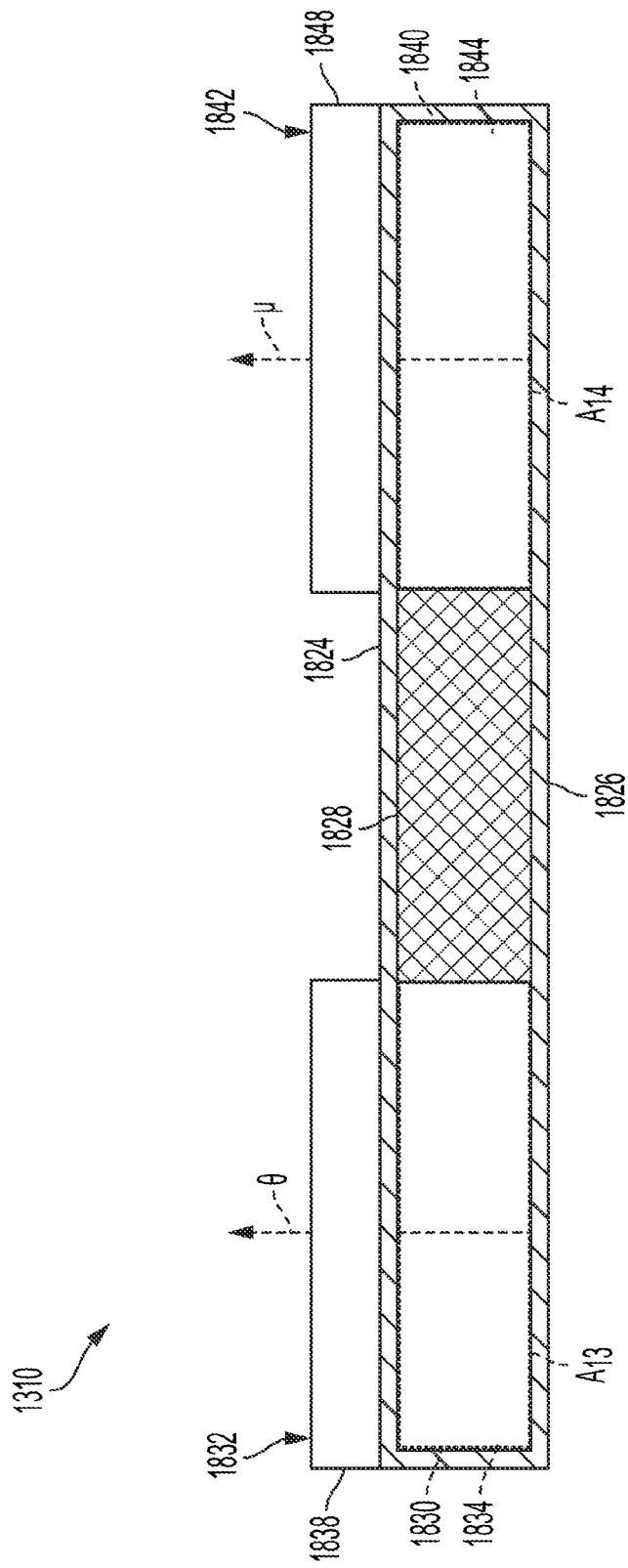
FIG. 20 is a cross-sectional view of the distributing housing shown in FIG. 18 taken along plane E-E.
Figure 21:
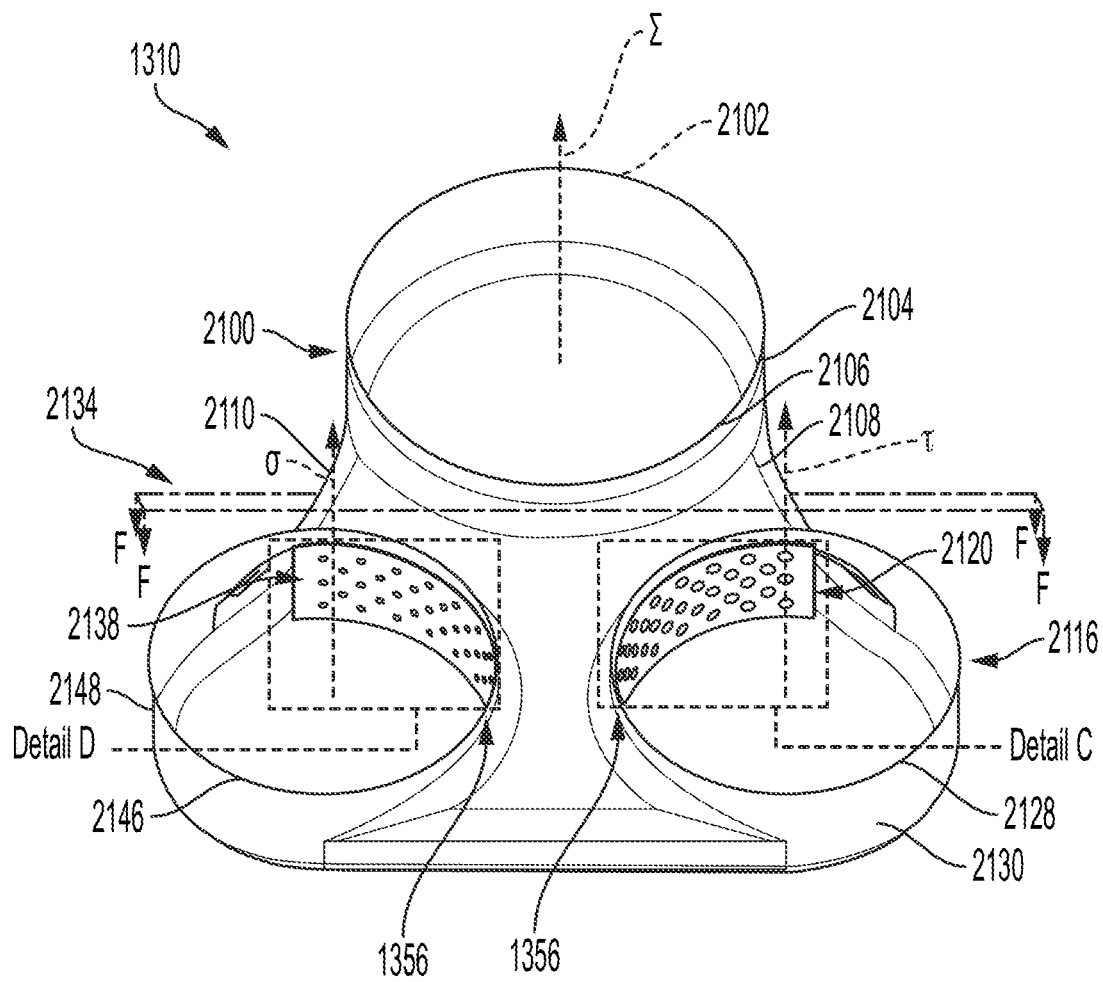
FIG. 21 is a perspective view of another example distributing housing for an exhaust gas aftertreatment system.

FIGS. 18-20 illustrate the distributing housing 1310, according to some embodiments. The distributing housing 1310 includes an inlet section 1800 (e.g., vent, intake, recess, etc.). In some applications, the inlet section 1800 is integrally formed with the upstream exhaust gas conduit 1308.

The inlet section 1800 is fluidly coupled to the upstream exhaust gas conduit 1308 and is configured to receive the exhaust gas from the upstream exhaust gas conduit 1308. In some embodiments, the inlet section 1800 is integrally formed with the upstream exhaust gas conduit 1308. The inlet section 1800 may be, for example, welded, fastened, or otherwise physically attached to the upstream exhaust gas conduit 1308.

The inlet section 1800 includes an inlet section inlet 1802. The inlet section inlet 1802 is fluidly coupled to the upstream exhaust gas conduit 1308 and configured to receive the exhaust gas from the upstream exhaust gas conduit 1308. The inlet section inlet 1802 is centered on an inlet axis δ. In other words, a center point of a cross-section of the inlet section inlet 1802 is disposed on the inlet axis δ. In some embodiments, the inlet axis δ is approximately parallel to the first axis Ω and/or is approximately parallel to the second axis Φ.

The inlet section 1800 also includes an inlet section flange 1804 (e.g., ring-shaped projection, circular protuberance, annular rib, etc.). The inlet section flange 1804 extends at least partially around the inlet section inlet 1802 (e.g., the inlet section flange 1804 circumscribes the inlet section inlet 1802, etc.). In some embodiments, the inlet section flange 1804 abuts the upstream exhaust gas conduit 1308. In various embodiments, the inlet section flange 1804 wraps (e.g., extends, etc.) around the upstream exhaust gas conduit 1308. In some embodiments, the inlet section flange 1804 is generally annular. In other embodiments, the inlet section flange 1804 is rectangular or prismatic.

The inlet section 1800 also includes an inlet section outlet 1806 (e.g., exhaust, exit, etc.). The inlet section outlet 1806 is fluidly coupled to the inlet section inlet 1802 and configured to receive the exhaust gas from the inlet section inlet 1802.

FIG. 19 illustrates a view of Detail B of the distributing housing 1310. In some embodiments, the distributing housing 1310 also includes the flow divider 1356 (e.g., panels, channeling members, etc.). The flow divider 1356 divides the exhaust gas into the first portion of the exhaust gas (e.g., that is provided into the first catalyst exhaust gas conduit 1312, etc.) and into the second portion of the exhaust gas (e.g., that is provided into the second catalyst exhaust gas conduit 1348, etc.). In this way, the flow divider 1356 can be used to control flows of the exhaust gas to the first catalyst member 1346 and the second catalyst member 1354, thereby enhancing desirable operation of the exhaust gas aftertreatment system 1300. In various embodiments, each of the flow divider 1356 is coupled to the inlet section 1800 at least partially along the inlet section outlet 1806.

The flow divider 1356 includes a first portion 1808 (e.g., section, fragment, segment, plate, etc.). As is explained in more detail herein, the first portion 1808 is configured to control flow of the exhaust gas towards the first catalyst exhaust gas conduit 1312. The first portion 1808 includes a first panel 1810 (e.g., frame, body, etc.) that extends along the inlet section 1800. The first panel 1810 is coupled to the inlet section 1800.

The first panel 1810 includes one or more first apertures 1812 (e.g., holes, perforations, etc.). The first apertures 1812 are configured to receive the first portion of the exhaust gas from the inlet section 1800 and facilitate passage of the first portion of the exhaust gas through the first portion 1808 and to the inlet section outlet 1806. The first apertures 1812 each define a first aperture diameter $D_1$. In various embodiments, the first aperture diameter $D_1$ is approximately equal to between 0.25 in and 1 in, inclusive (e.g., 0.2375 in, 0.5 in, 1 in, 1.25 in, etc.).

The first apertures 1812 also each define a first aperture area $A_9$. The first apertures area $A_9$ of each of the first apertures 1812 may be different from, or the same as, the first aperture areas $A_9$ of the others of the first apertures 1812. In various embodiments, the first aperture areas $A_9$ are each approximately equal to between 0.05 in$^2$ and line, inclusive (e.g., 0.0475 in$^2$, 0.05 in$^2$, 1.0 in$^2$, 1.25 in$^2$, etc.). In some embodiments, the first aperture area $A_9$ of each of the first apertures 1812 are equal.

In various embodiments, the first portion 1808 and the inlet section 1800 define a first window 1814 (e.g., gap, etc.). Similar to the first apertures 1812, the first window 1814 is configured to receive the first portion of the exhaust gas from the inlet section 1800 and facilitate passage of the first portion of the exhaust gas through the first portion 1808 and to the inlet section outlet 1806. The first window 1814 defines a first window area $A_{10}$. In various embodiments, the first window area $A_{10}$ is approximately equal to between 0.05 in$^2$ and line, inclusive (e.g., 0.0475 in$^2$, 0.05 in$^2$, 0.8 in$^2$, 1 in$^2$, 1.05 in$^2$, etc.). In other embodiments, the first portion 1808 and the inlet section 1800 do not define the first window 1814 (e.g., the first window area $A_{10}$ is equal to 0, etc.).

A sum of the first aperture areas $A_9$ for all of the first apertures 1812 and the first window area $A_{10}$ defines a first total area χ of the first portion 1808. This first total area χ is the entirety of the area in and around the first portion 1808 that the exhaust gas can flow through towards the inlet section outlet 1806. In some embodiments, the first portion 1808 and the inlet section 1800 do not define the first window 1814. In these embodiments, the first total area χ of the first portion 1808 only includes the sum of the first aperture areas $A_9$ for all of the first apertures 1812 (e.g., because the first window area $A_{10}$ is equal to 0).

The flow divider 1356 includes a second portion 1816 (e.g., section, fragment, segment, plate, etc.). As is explained in more detail herein, the second portion 1816 is configured to control flow of the exhaust gas towards the second catalyst exhaust gas conduit 1348. The second portion 1816 includes a second panel 1818 (e.g., frame, body, etc.) that extends along the inlet section 1800. The second panel 1818 is coupled to the inlet section 1800. In various embodiments, the first portion 1808 and the second portion 1816 define a spacing between the first portion 1808 and the second portion 1816. Similar to the first window 1814, this spacing may facilitate passage of the first portion of the exhaust gas to the inlet section outlet 1806.

The second panel 1818 includes one or more second apertures 1820 (e.g., holes, perforations, etc.). The second apertures 1820 are configured to receive the second portion of the exhaust gas from the inlet section 1800 and facilitate passage of the second portion of the exhaust gas through the second portion 1816 and to the inlet section outlet 1806. The second apertures 1820 each define a second aperture diameter $D_2$. In various embodiments, the second aperture diameter $D_2$ is approximately equal to between 0.10 in and 1 in, inclusive (e.g., 0.095 in, 0.15 in, 0.4 in, 1 in, 1.05 in, etc.).

The second apertures 1820 also each define a second aperture area $A_{11}$. The second apertures area $A_{11}$ of each of the second apertures 1820 may be different from, or the same as, the second aperture areas $A_{11}$ of the others of the second apertures 1820. In various embodiments, the second aperture areas Au are each approximately equal to between 0.025 in$^2$ and line, inclusive (e.g., 0.02375 in$^2$, 0.025 in$^2$, 0.50 in$^2$, 1 in$^2$, 1.05 in$^2$, etc.). In some embodiments, the second aperture area $A_{11}$ of each of the second apertures 1820 are equal.

In various embodiments, the second portion 1816 and the inlet section 1800 define a second window 1822 (e.g., gap, etc.). Similar to the second apertures 1820, the second window 1822 is configured to receive the second portion of the exhaust gas from the inlet section 1800 and facilitate passage of the second portion of the exhaust gas through the second portion 1816 and to the inlet section outlet 1806. The second window 1822 defines a second window area $A_{12}$. In various embodiments, the second window area $A_{12}$ is approximately equal to between 0.05 in$^2$ and line, inclusive (e.g., 0.0475 in$^2$, 0.05 in$^2$, 0.8 in$^2$, 1 in$^2$, 1.05 in$^2$, etc.). In other embodiments, the second portion 1816 and the inlet section 1800 do not define the second window 1822 (e.g., the second window area $A_{12}$ is equal to 0, etc.).

A sum of the second aperture areas $A_{11}$ for all of the second apertures 1820 and the second window area $A_{12}$ defines a second total area $\zeta$ of the second portion 1816. This second total area $\zeta$ is the entirety of the area in and around the second portion 1816 that the exhaust gas can flow through towards the inlet section outlet 1806. In some embodiments, the second portion 1816 and the inlet section 1800 do not define the second window 1822. In these embodiments, the second total area $\zeta$ of the second portion 1816 only includes the sum of the second aperture areas $A_{11}$ for all of the second apertures 1820 (e.g., because the second window area $A_{12}$ is equal to 0).

In various embodiments, the second total area $\zeta$ is not equal to the first total area $\chi$. A ratio, $\varsigma$, of the first total area $\chi$ to the second total area $$\varsigma\left(\varsigma = \frac{\chi}{\zeta}\right)$$

is selected such that flow of the exhaust gas is balanced (e.g., equalized, etc.) between the first catalyst exhaust gas conduit 1312 and the second catalyst exhaust gas conduit 1348. As a result, the first catalyst member 1346 and the second catalyst member 1354 receive the same amount (e.g., volume per unit time, etc.) of exhaust gas. Balancing the flow of the exhaust gas between the first catalyst exhaust gas conduit 1312 and the second catalyst exhaust gas conduit 1348 mitigates backpressure on an internal combustion engine having the exhaust gas aftertreatment system 1300.

By using the distributing housing 1310, the first catalyst member separation length $L_3$ can be approximately equal to the second catalyst member separation length $L_4$. In other systems without a component to balance flows, exhaust conduits must be different lengths, thereby resulting in increased overall system length and an undesirable space claim.

In various embodiments, the ratio $\varsigma$ is approximately equal to between 1.25 and 10, inclusive (e.g., 1.1875, 1.25, 2, 4, 10, 10.5, etc.).

The distributing housing 1310 also includes a first body panel 1824 (e.g., plate, etc.). The first body panel 1824 is coupled to the inlet section 1800 and partially defines the inlet section outlet 1806. In some embodiments, the first body panel 1824 is planar. In various embodiments, the first body panel 1824 has a circular shape or rectangular shape.

The distributing housing 1310 also includes a second body panel 1826 (e.g., plate, etc.). The second body panel 1826 is coupled to the inlet section 1800, separated from the first body panel 1824, and partially defines the inlet section outlet 1806. The first body panel 1824 and the second body panel 1826 cooperatively define a casing (e.g., housing, etc.) for the distributing housing 1310 within which the exhaust gas is routed. In some embodiments, the second body panel 1826 is planar.

FIG. 20 illustrates a cross-sectional view of the distributing housing 1310 shown in FIG. 18 taken along plane E-E. In various embodiments, the distributing housing 1310 also includes a body divider 1828 (e.g., separator, partition, wall, rib, etc.). The body divider 1828 is coupled to the first body panel 1824 on a first end of the body divider 1828 and the second body panel 1826 on a second end of the body divider 1828. In this way, the body divider 1828 functions to divide exhaust gas flow exiting the inlet section outlet 1806 into the first portion of the exhaust gas, to be provided to the first catalyst member 1346, and the second portion of the exhaust gas, to be provided to the second catalyst member 1354. In some embodiments, the body divider 1828 is aligned with a center point between the first portion 1808 and the second portion 1816. In some embodiments, the distributing housing 1310 does not include a body divider 1828.

The distributing housing 1310 also includes a first body channel 1830 (e.g., passage, funnel, etc.). The first body channel 1830 is defined by the body divider 1828, the first body panel 1824, and the second body panel 1826. The first body channel 1830 is fluidly coupled to inlet section 1800 via the first portion 1808, such that the first body channel 1830 is configured to receive the first portion of the exhaust gas from the inlet section 1800 via the first portion 1808. The first body channel 1830 defines an area along a length of the first body channel 1830 and has a first cross-sectional area $A_{13}$. The first cross-sectional area $A_{13}$ may change, or be constant, along the length of the first body channel 1830. In various embodiments, the first cross-sectional area $A_{13}$ is approximately equal to between 5 in$^2$ and 15 in$^2$, inclusive (e.g., 4.75 in$^2$, 5 in$^2$, 10 in$^2$, 15 in$^2$, 15.75 in$^2$, etc.).

The distributing housing 1310 also includes a first outlet section 1832 (e.g., exhaust, exit, etc.). In some applications, the first outlet section 1832 is integrally formed with the first body channel 1830. The first outlet section 1832 includes a first outlet section inlet 1834.

The first outlet section inlet 1834 is fluidly coupled to the first body channel 1830 and is configured to receive the exhaust gas from the first body channel 1830. In some embodiments, the first outlet section inlet 1834 is integrally formed with the first body channel 1830. The first outlet section inlet 1834 may be, for example, welded, fastened, or otherwise physically attached to the first body channel 1830.

The first outlet section inlet 1834 defines a first outlet section inlet area $S_3$. In various embodiments, the first outlet section inlet area $S_3$ is approximately equal to between 5 in$^2$ and 25 in$^2$, inclusive (e.g., 4.75 in$^2$, 5 in$^2$, 10 in$^2$, 15 in$^2$, 20 in$^2$, 25 in$^2$, 26.25 in$^2$, etc.).

The first outlet section 1832 also includes a first outlet section outlet 1836 (e.g., exhaust, exit, etc.). The first outlet section outlet 1836 is fluidly coupled to the first outlet section inlet 1834 and is configured to receive the first portion of the exhaust gas from the first outlet section inlet 1834. In some embodiments, the first outlet section outlet 1836 is integrally formed with the first outlet section inlet 1834. The first outlet section outlet 1836 may be, for example, welded, fastened, or otherwise physically attached to the first outlet section inlet 1834.

The first outlet section outlet 1836 is centered on a first outlet axis $\Theta$. In other words, a center point of a cross-section of the first outlet section outlet 1836 is disposed on the first outlet axis $\Theta$. In some embodiments, the first outlet axis $\Theta$ is approximately parallel to the first axis $\Omega$ and/or is approximately parallel to the second axis $\Phi$.

The first outlet section 1832 also includes a first outlet section flange 1838 (e.g., ring-shaped projection, circular protuberance, annular rib, etc.). The first outlet section flange 1838 extends at least partially around the first outlet section outlet 1836 (e.g., the first outlet section flange 1838 circumscribes the first outlet section outlet 1836, etc.). In some embodiments, the first outlet section flange 1838 is contiguous with the first catalyst exhaust gas conduit 1312. In various embodiments, the first outlet section flange 1838 wraps (e.g., extends, etc.) around the first catalyst exhaust gas conduit 1312. In some embodiments, the first outlet section flange 1838 is generally annular. In other embodiments, the first outlet section flange 1838 is rectangular or prismatic.

The distributing housing 1310 also includes a second body channel 1840 (e.g., passage, funnel, etc.). The second body channel 1840 is defined by the body divider 1828, the first body panel 1824, and the second body panel 1826. The second body channel 1840 is fluidly coupled to inlet section 1800 via the second portion 1816, such that the second body channel 1840 is configured to receive the second portion of the exhaust gas from the inlet section 1800 via the second portion 1816. The second body channel 1840 defines an area along a length of the second body channel 1840 and has a second cross-sectional area $A_{14}$. The second cross-sectional area $A_{14}$ may change, or be constant, along the length of the second body channel 1840. In various embodiments, the second cross-sectional area $A_{14}$ is approximately equal to between 5 in$^2$ and 15 in$^2$, inclusive (e.g., 4.75 in$^2$, 5 in$^2$, 10 in$^2$, 15 in$^2$, 15.75 in$^2$, etc.). The distributing housing 1310 also includes a second outlet section 1842 (e.g., exhaust, exit, etc.). In some applications, the second outlet section 1842 is integrally formed with the second body channel 1840.

The second outlet section 1842 includes a second outlet section inlet 1844. The second outlet section inlet 1844 is fluidly coupled to the second body channel 1840 and is configured to receive the second portion of the exhaust gas from the second body channel 1840. In some embodiments, the second outlet section inlet 1844 is integrally formed with the second body channel 1840. The second outlet section inlet 1844 may be, for example, welded, fastened, or otherwise physically attached to the second body channel 1840. The second outlet section inlet 1844 defines a second outlet section inlet area $S_4$. In various embodiments, the second outlet section inlet area $S_4$ is approximately equal to between 5 in$^2$ and 25 in$^2$, inclusive (e.g., 4.75 in$^2$, 5 in$^2$, 10 in$^2$, 15 in$^2$, 20 in$^2$, 25 in$^2$, 26.25 in$^2$, etc.).

The second outlet section 1842 also includes a second outlet section outlet 1846 (e.g., exhaust, exit, etc.). The second outlet section outlet 1846 is fluidly coupled to the second outlet section inlet 1844 and is configured to receive the second portion of the exhaust gas from the second outlet section inlet 1844. In some embodiments, the second outlet section outlet 1846 is integrally formed with the second outlet section inlet 1844. The second outlet section outlet 1846 may be, for example, welded, fastened, or otherwise physically attached to the second outlet section inlet 1844.

The second outlet section outlet 1846 is centered on a second outlet axis $\mu$. In other words, a center point of a cross-section of the second outlet section outlet 1846 is disposed on the second outlet axis $\mu$. In some embodiments, the second outlet axis $\mu$ is approximately parallel to the first axis $\Omega$ and/or is approximately parallel to the second axis $\Phi$. In some embodiments, the second outlet axis $\mu$ is approximately parallel to the inlet axis $\alpha$. In some embodiments, the second outlet axis $\mu$ is approximately parallel to the first outlet axis $\Theta$. In some embodiments, the first outlet axis $\Theta$ is approximately parallel to the second outlet axis $\mu$, the first outlet axis $\Theta$ is approximately parallel to the inlet axis $\delta$, and at least one of: the first outlet axis $\Theta$ is approximately parallel to the first axis $\Omega$, or the second outlet axis $\mu$ is approximately parallel to the second axis $\Phi$. In some embodiments, the first outlet axis $\Theta$ is coincident with the first axis $\Omega$ and/or the second outlet axis $\mu$ is coincident with the second axis $\Phi$.

The second outlet section 1842 also includes a second outlet section flange 1848 (e.g., ring-shaped projection, circular protuberance, annular rib, etc.). The second outlet section flange 1848 extends at least partially around the second outlet section outlet 1846 (e.g., the second outlet section flange 1848 circumscribes the second outlet section outlet 1846, etc.). In some embodiments, the second outlet section flange 1848 is contiguous with the second catalyst exhaust gas conduit 1348. In various embodiments, the second outlet section flange 1848 wraps (e.g., extends, etc.) around the second catalyst exhaust gas conduit 1348. In some embodiments, the second outlet section flange 1848 is generally annular. In other embodiments, the second outlet section flange 1848 is rectangular or prismatic.

FIGS. 21-25 illustrate the distributing housing 1310, according to some embodiments. The distributing housing 1310 includes an inlet section 2100 (e.g., vent, intake, recess, etc.). In some applications, the inlet section 2100 is integrally formed with the upstream exhaust gas conduit 1308.

The inlet section 2100 includes an inlet section inlet 2102. The inlet section inlet 2102 is fluidly coupled to the upstream exhaust gas conduit 1308 and is configured to receive the exhaust gas from the upstream exhaust gas conduit 1308. In some embodiments, the inlet section inlet 2102 is integrally formed with the upstream exhaust gas conduit 1308. The inlet section inlet 2102 may be, for example, welded, fastened, or otherwise physically attached to the upstream exhaust gas conduit 1308.

The inlet section inlet 2102 is centered on an inlet axis $\Sigma$. In other words, a center point of a cross-section of the inlet section inlet 2102 is disposed on the inlet axis $\Sigma$. In some embodiments, the inlet axis $\Sigma$ is approximately parallel to the first axis $\Omega$ and/or is approximately parallel to the second axis $\Phi$.

The inlet section 2100 also includes an inlet section flange 2104 (e.g., ring-shaped projection, circular protuberance, annular rib, etc.). The inlet section flange 2104 extends at least partially around the inlet section inlet 2102 (e.g., the inlet section flange 2104 circumscribes the inlet section inlet 2102, etc.). In some embodiments, the inlet section flange 2104 abuts the upstream exhaust gas conduit 1308. In various embodiments, the inlet section flange 2104 wraps (e.g., extends, etc.) around the upstream exhaust gas conduit 1308. In some embodiments, the inlet section flange 2104 is generally annular. In other embodiments, the inlet section flange 2104 is rectangular or prismatic.

The inlet section 2100 also includes an inlet section outlet 2106 (e.g., exhaust, exit, etc.). The inlet section outlet 2106 is fluidly coupled to the inlet section inlet 2102 and configured to receive the exhaust gas from the inlet section inlet 2102.

The distributing housing 1310 also includes a first body panel 2108 (e.g., plate, etc.). The first body panel 2108 is coupled to the inlet section 2100 and partially defines the inlet section outlet 2106. In some embodiments, the first body panel 2108 is planar.

The distributing housing 1310 also includes a second body panel 2110 (e.g., plate, etc.). The second body panel 2110 is coupled to the inlet section 2100, separated from the first body panel 2108, and partially defines the inlet section outlet 2106. The first body panel 2108 and the second body panel 2110 cooperatively define a casing (e.g., housing, etc.) for the distributing housing 1310 within which the exhaust gas is routed. In some embodiments, the second body panel 2110 is planar.

The distributing housing 1310 also includes a body divider 2112 (e.g., separator, partition, wall, rib, etc.). The body divider 2112 is coupled to the first body panel 2108 on a first end of the body divider 2112 and the second body panel 2110 on a second end of the body divider 2112. In this way, the body divider 2112 functions to divide exhaust gas flow exiting the inlet section outlet 2106 into the first portion of the exhaust gas, to be provided to the first catalyst member 1346, and the second portion of the exhaust gas, to be provided to the second catalyst member 1354.

The distributing housing 1310 also includes a first body channel 2114 (e.g., passage, funnel, etc.). The first body channel 2114 is defined by the body divider 2112, the first body panel 2108, and the second body panel 2110. The first body channel 2114 is fluidly coupled to inlet section 2100 and is configured to receive the first portion of the exhaust gas from the inlet section 2100. The first body channel 2114 defines an area along a length of the first body channel 2114 and has a first cross-sectional area $A_{15}$. The first cross-sectional area $A_{15}$ may change, or be constant, along the length of the first body channel 2114. In various embodiments, the first cross-sectional area $A_{15}$ is approximately equal to between 15 in$^2$ and 50 in$^2$, inclusive (e.g., 14.25 in$^2$, 15 in$^2$, 20 in$^2$, 50 in$^2$, 52.50 in$^2$, etc.).

The distributing housing 1310 also includes a first outlet section 2116 (e.g., exhaust, exit, etc.). In some applications, the first outlet section 2116 is integrally formed with the first body channel 2114. The first outlet section 2116 includes a first outlet section inlet 2118. The first outlet section inlet 2118 defines a first outlet section inlet area $S_5$. In various embodiments, the first outlet section inlet area $S_5$ is approximately equal to between 5 in$^2$ and 25 in$^2$, inclusive (e.g., 4.75 in$^2$, 5 in$^2$, 10 in$^2$, 15 in$^2$, 20 in$^2$, 25 in$^2$, 26.25 in$^2$, etc.).

Figure 22:
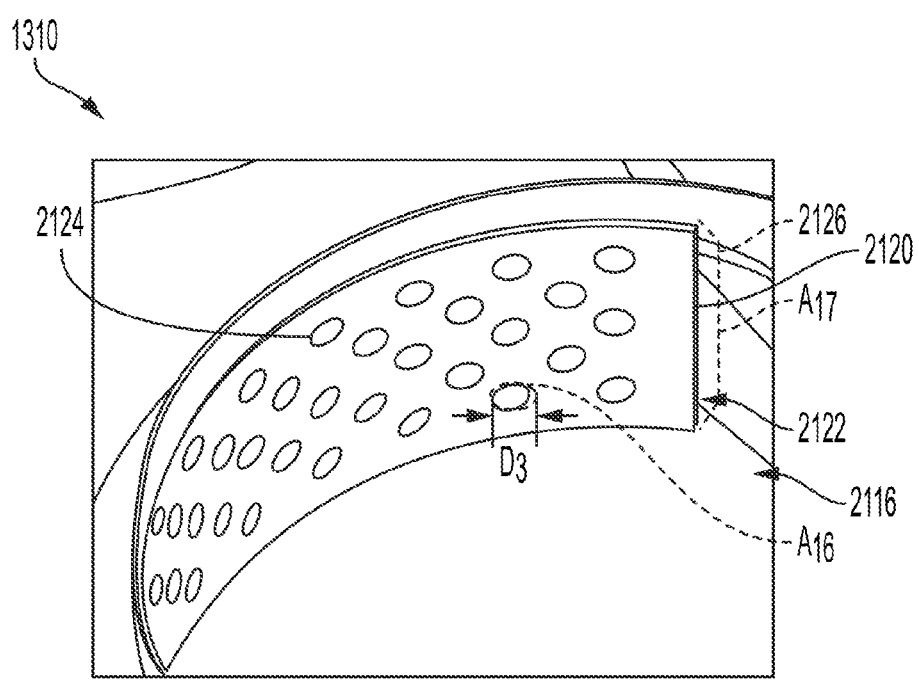
FIG. 22 is a view of Detail C shown in FIG. 21.

FIG. 22 illustrates a view of Detail C of the distributing housing 1310. In some embodiments, the distributing housing 1310 also includes the flow divider 1356 (e.g., panels, channeling members, etc.). The flow divider 1356 divides the exhaust gas into the first portion of the exhaust gas (e.g., that is provided into the first catalyst exhaust gas conduit 1312, etc.) and into the second portion of the exhaust gas (e.g., that is provided into the second catalyst exhaust gas conduit 1348, etc.). In this way, the flow divider 1356 can be used to control flows of the exhaust gas to the first catalyst member 1346 and the second catalyst member 1354, thereby enhancing desirable operation of the exhaust gas aftertreatment system 1300.

The flow divider 1356 includes a first portion 2120 (e.g., section, fragment, segment, plate, etc.). As is explained in more detail herein, the first portion 2120 is configured to control flow of the exhaust gas towards the first catalyst exhaust gas conduit 1312. The first portion 2120 includes a first panel 2122 (e.g., frame, body, etc.) that extends along the first outlet section 2116. In various embodiments, the first panel 2122 is coupled to the first outlet section 2116 along the first outlet section inlet 2118.

The first portion 2120 also includes one or more first apertures 2124 (e.g., holes, perforations, etc.). The first apertures 2124 are configured to receive the first portion of the exhaust gas from the first body channel 2114 and facilitates passage of the first portion of the exhaust gas through the first portion 2120 and to the first outlet section 2116. The first apertures 2124 each define a first aperture diameter $D_3$. In various embodiments, the first aperture diameter $D_3$ is approximately equal to between 0.10 in and 1 in, inclusive (e.g., 0.095 in, 0.15 in, 0.4 in, 1 in, 1.05 in, etc.). The first apertures 2124 also each define a first aperture area $A_{16}$. The first apertures area $A_{16}$ of each of the first apertures 2124 may be different from, or the same as, the first aperture areas $A_{16}$ of the others of the first apertures 2124. In various embodiments, the first aperture areas $A_{16}$ are each approximately equal to between 0.05 in$^2$ and line, inclusive (e.g., 0.0475 in$^2$, 0.05 in$^2$, 1.0 in$^2$, 1.25 in$^2$, etc.). In some embodiments, the first aperture areas $A_{16}$ of each of the first apertures 2124 are equal.

In various embodiments, the first portion 2120 and the first outlet section 2116 define a first window 2126 (e.g., gap, etc.). Similar to the first apertures 2124, the first window 2126 is configured to receive the first portion of the exhaust gas from the first body channel 2114 and facilitate passage of the first portion of the exhaust gas through the first portion 2120 and to the first outlet section 2116. The first window 2126 defines a first window area $A_{17}$. In various embodiments, the first window area $A_{17}$ is approximately equal to between 0.5 in$^2$ and 5 in$^2$, inclusive (e.g., 0.0475 in$^2$, 0.5 in$^2$, 1 in$^2$, 4 in$^2$, 5.0 in$^2$, 5.25 in$^2$, etc.).

A sum of the first aperture areas $A_{16}$ for all of the first apertures 2124 and the first window area $A_{17}$ defines a first total area ω of the first portion 2120. This first total area ω is the entirety of the area in and around the first portion 2120 that the exhaust gas can flow through towards the first body channel 2114. In some embodiments, the first portion 2120 and the first outlet section 2116 do not define the first window 2126. This first total area ω of the first portion 2120 only includes the sum of the first aperture areas $A_{16}$ for all of the first apertures 2124.

The first outlet section 2116 also includes a first outlet section outlet 2128 (e.g., exhaust, exit, etc.). The first outlet section outlet 2128 is fluidly coupled to the first outlet section inlet 2118 and is configured to receive the first portion of the exhaust gas from the first outlet section inlet 2118. In some embodiments, the first outlet section outlet 2128 is integrally formed with the first outlet section inlet 2118. The first outlet section outlet 2128 may be, for example, welded, fastened, or otherwise physically attached to the first outlet section inlet 2118.

The first outlet section outlet 2128 is centered on a first outlet axis τ. In other words, a center point of a cross-section of the first outlet section outlet 2128 is disposed on the first outlet axis τ. In some embodiments, the first outlet axis τ is approximately parallel to the first axis Ω and/or is approximately parallel to the second axis Φ.

The first outlet section 2116 also includes a first outlet section flange 2130 (e.g., ring-shaped projection, circular protuberance, annular rib, etc.). The first outlet section flange 2130 extends at least partially around the first outlet section outlet 2128 (e.g., the first outlet section flange 2130 circumscribes the first outlet section outlet 2128, etc.). In some embodiments, the first outlet section flange 2130 is contiguous with the first catalyst exhaust gas conduit 1312. In various embodiments, the first outlet section flange 2130 wraps (e.g., extends, etc.) around the first catalyst exhaust gas conduit 1312. In some embodiments, the first outlet section flange 2130 is generally annular. In other embodiments, the first outlet section flange 2130 is rectangular or prismatic.

The distributing housing 1310 also includes a second body channel 2132 (e.g., passage, funnel, etc.). The second body channel 2132 is defined by the body divider 2112, the first body panel 2108, and the second body panel 2110. The second body channel 2132 is fluidly coupled to inlet section 2100 via a second portion of the flow divider 1356, such that the second body channel 2132 is configured to receive the second portion of the exhaust gas from the inlet section 2100 via the second portion of the flow divider 1356. The second body channel 2132 defines an area along a length of the second body channel 2132 and has a cross-sectional area $A_{18}$. The second cross-sectional area $A_{18}$ may change, or be constant, along the length of the second body channel 2132. In various embodiments, the second cross-sectional area $A_{18}$ is approximately equal to between 15 in² and 50 in², inclusive (e.g., 14.25 in², 15 in², 20 in², 50 in², 52.50 in², etc.).

The distributing housing 1310 also includes a second outlet section 2134 (e.g., exhaust, exit, etc.). The second outlet section 2134 is fluidly coupled to the second body channel 2132 and is configured to receive the second portion of the exhaust gas from the second body channel 2132. In some embodiments, the second outlet section 2134 is integrally formed with the second body channel 2132. The second outlet section 2134 may be, for example, welded, fastened, or otherwise physically attached to the second body channel 2132.

The second outlet section 2134 includes a second outlet section inlet 2136. The second outlet section inlet 2136 is fluidly coupled to the second body channel 2132 and is configured to receive the second portion of the exhaust gas from the second body channel 2132. In some embodiments, the second outlet section inlet 2136 is integrally formed with the second body channel 2132. The second outlet section inlet 2136 may be, for example, welded, fastened, or otherwise physically attached to the second body channel 2132. The second outlet section inlet 2136 may be, for example, welded, fastened, or otherwise physically attached to the first body panel 2108.

The second outlet section inlet 2136 defines a second outlet section inlet area $S_6$. In various embodiments, the second outlet section inlet area $S_6$ is approximately equal to between 5 in² and 25 in², inclusive (e.g., 4.75 in², 5 in², 10 in², 15 in², 20 in², 25 in², 26.25 in², etc.).

Figure 23:
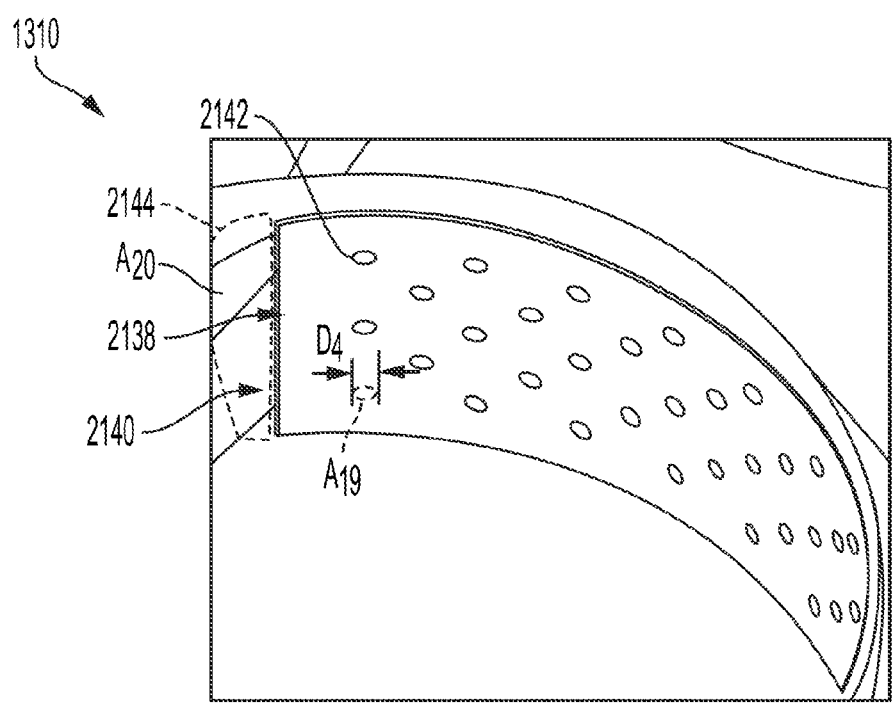
FIG. 23 is a view of Detail D shown in FIG. 21.
Figure 24:
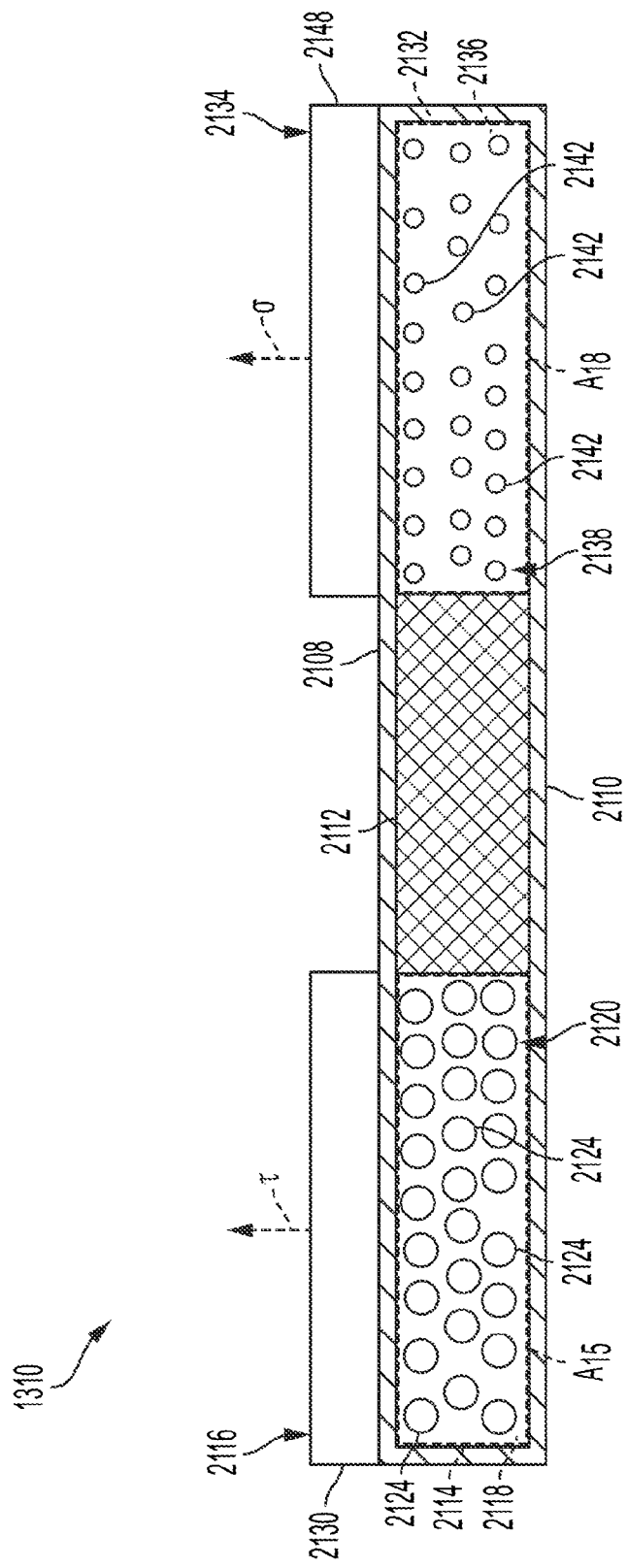
FIG. 24 is a cross-sectional view of the distributing housing shown in FIG. 21 taken along plane F-F.
Figure 25:
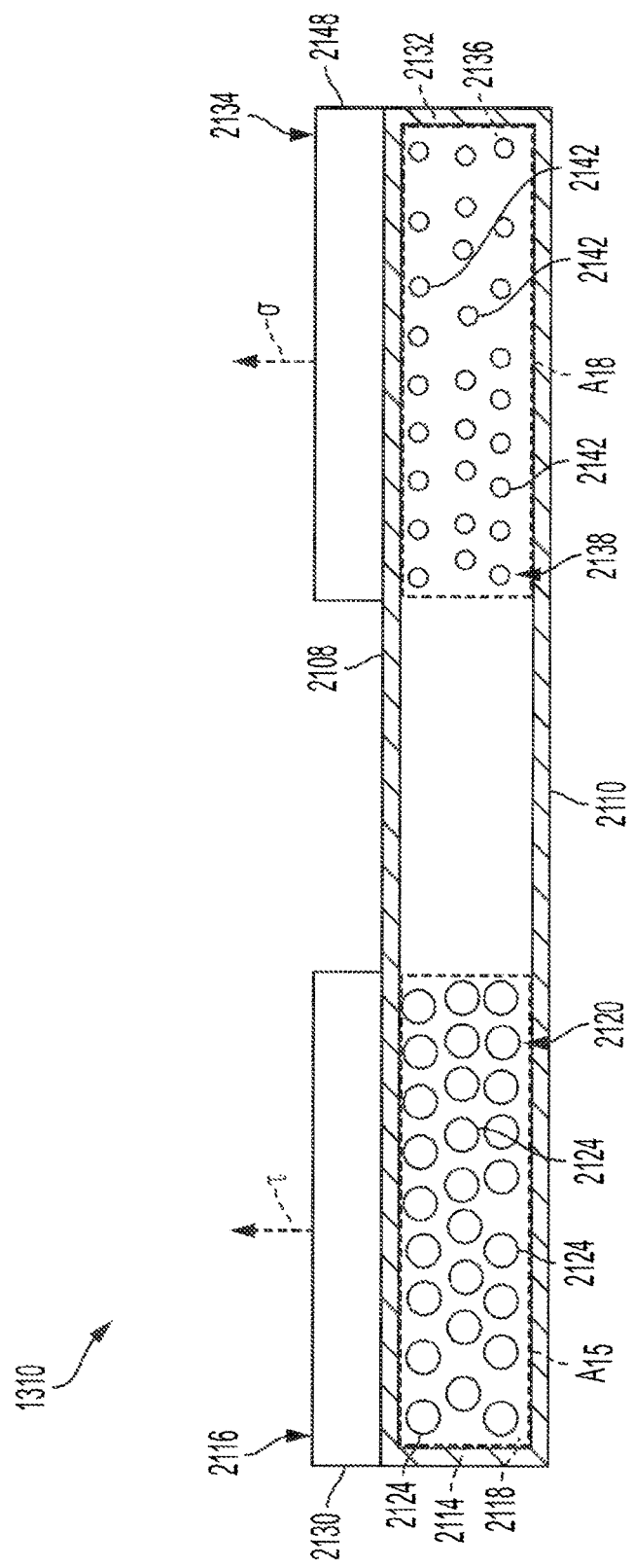
FIG. 25 is a cross-sectional view of the distributing housing shown in FIG. 21 taken along plane F-F.

FIG. 23 illustrates a view of Detail D of the distributing housing 1310. The flow divider 1356 includes a second portion 2138 (e.g., section, fragment, segment, plate, etc.). As is explained in more detail herein, the second portion 2138 is configured to control flow of the exhaust gas towards the second catalyst exhaust gas conduit 1348. The second portion 2138 includes a second panel 2140 (e.g., frame, body, etc.) that extends along the second outlet section 2134. In various embodiments, the second panel 2140 is coupled to the second outlet section 2134. In some embodiments, the body divider 2112 is aligned with a center point between the first portion 2120 and the second portion 2138.

The second portion 2138 also includes one or more second apertures 2142 (e.g., holes, perforations, etc.). The second apertures 2142 are configured to receive the second portion of the exhaust gas from the second body channel 2132 and facilitates passage of the second portion of the exhaust gas through the second portion 2138 and to second outlet section 2134. The second apertures 2142 each define a second aperture diameter $D_4$. In various embodiments, the second aperture diameter $D_4$ is approximately equal to between 0.25 in and 1 in, inclusive (e.g., 0.2375 in, 0.5 in, 1 in, 1.25 in, etc.).

The second apertures 2142 also each define a second aperture area $A_{19}$. The second apertures area $A_{19}$ of each of the second apertures 2142 may be different from, or the same as, the second aperture areas $A_{19}$ of the others of the second apertures 2142. In various embodiments, the second aperture areas $A_{19}$ are each approximately equal to between 0.025 in² and 1 in, inclusive (e.g., 0.02375 in², 0.025 in², 0.50 in², 1 in², 1.05 in², etc.). In some embodiments, the second aperture area $A_{19}$ of each of the second apertures 2142 are equal.

In various embodiments, the second portion 2138 and the second outlet section 2134 define a second window 2144 (e.g., gap, etc.). Similar to the second apertures 2142, the second window 2144 is configured to receive the second portion of the exhaust gas from the second body channel 2132 and facilitate passage of the second portion of the exhaust gas through the second portion 2138 and to the second outlet section 2134. The second window 2144 defines a second window area $A_{20}$. In various embodiments, the second window area $A_{20}$ is approximately equal to between 0.5 in² and 5 in², inclusive (e.g., 0.0475 in², 0.5 in², 1 in², 4 in², 5.0 in², 5.25 in², etc.).

A sum of the second aperture areas $A_{19}$ for all of the second apertures 2142 and the second window area $A_{20}$ defines a second total area τ of the second portion 2138. This second total area τ is the entirety of the area in and around the second portion 2138 that the exhaust gas can flow through towards the second body channel 2132. In some embodiments, the second portion 2138 and the second outlet section 2134 do not define the second window 2144. This second total area τ of the second portion 2138 only includes the sum of the second aperture areas $A_{19}$ for all of the second apertures 2142.

In various embodiments, the second total area τ is not equal to the first total area ω. A ratio, ι, of the first total area ω to the second total area τ (ι=ω/τ) is selected such that flow of the exhaust gas is balanced (e.g., equalized, etc.) between the first catalyst exhaust gas conduit 1312 and the second catalyst exhaust gas conduit 1348. As a result, the first catalyst member 1346 and the second catalyst member 1354 receive the same amount (e.g., volume per unit time, etc.) of exhaust gas. Balancing the flow of the exhaust gas between the first catalyst exhaust gas conduit 1312 and the second catalyst exhaust gas conduit 1348 mitigates backpressure on an internal combustion engine having the exhaust gas aftertreatment system 1300. By using the distributing housing 1310, the first catalyst member separation length $L_3$ can be approximately equal to the second catalyst member separation length $L_4$. In other systems without a component to balance flows, exhaust conduits must be different lengths, thereby resulting in increased overall system length and an undesirable space claim.

In various embodiments, the ratio ι is approximately equal to between 1.25 and 10, inclusive (e.g., 1.1875, 1.25, 2, 4, 10, 10.5, etc.).

The second outlet section 2134 also includes a second outlet section outlet 2146 (e.g., exhaust, exit, etc.). The second outlet section outlet 2146 is fluidly coupled to the second outlet section inlet 2136 and is configured to receive the second portion of the exhaust gas from the second outlet section inlet 2136. In some embodiments, the second outlet section outlet 2146 is integrally formed with the second outlet section inlet 2136. The second outlet section outlet 2146 may be, for example, welded, fastened, or otherwise physically attached to the second outlet section inlet 2136.

The second outlet section outlet 2146 is fluidly coupled to the second catalyst exhaust gas conduit 1348 and is configured to provide the second portion of the exhaust gas to the second catalyst exhaust gas conduit 1348. In some embodiments, the second outlet section outlet 2146 is integrally formed with the second catalyst exhaust gas conduit 1348. The second outlet section outlet 2146 may be, for example, welded, fastened, or otherwise physically attached to the second catalyst exhaust gas conduit 1348.

The second outlet section outlet 2146 is centered on a second outlet axis σ. In other words, a center point of a cross-section of the second outlet section outlet 2146 is disposed on the second outlet axis σ. In some embodiments, the second outlet axis σ is approximately parallel to the first axis Ω and/or is approximately parallel to the second axis Φ. In some embodiments, the second outlet axis σ is approximately parallel to the inlet axis Σ. In some embodiments, the second outlet axis σ is approximately parallel to the first outlet axis τ. In some embodiments, the first outlet axis τ is approximately parallel to the second outlet axis σ, the first outlet axis τ is approximately parallel to the inlet axis Σ, and at least one of: the first outlet axis τ is approximately parallel to the first axis Ω, or the second outlet axis σ is approximately parallel to the second axis Φ. In some embodiments, the first outlet axis τ is coincident with the first axis Ω and/or the second outlet axis σ is coincident with the second axis Φ.

The second outlet section 2134 also includes a second outlet section flange 2148 (e.g., ring-shaped projection, circular protuberance, annular rib, etc.). The second outlet section flange 2148 extends at least partially around the second outlet section outlet 2146 (e.g., the second outlet section flange 2148 circumscribes the second outlet section outlet 2146, etc.). In some embodiments, the second outlet section flange 2148 is contiguous with the second catalyst exhaust gas conduit 1348. In various embodiments, the second outlet section flange 2148 wraps (e.g., extends, etc.) around the second catalyst exhaust gas conduit 1348. In some embodiments, the second outlet section flange 2148 is generally annular. In other embodiments, the second outlet section flange 2148 is rectangular or prismatic.

Figure 26:
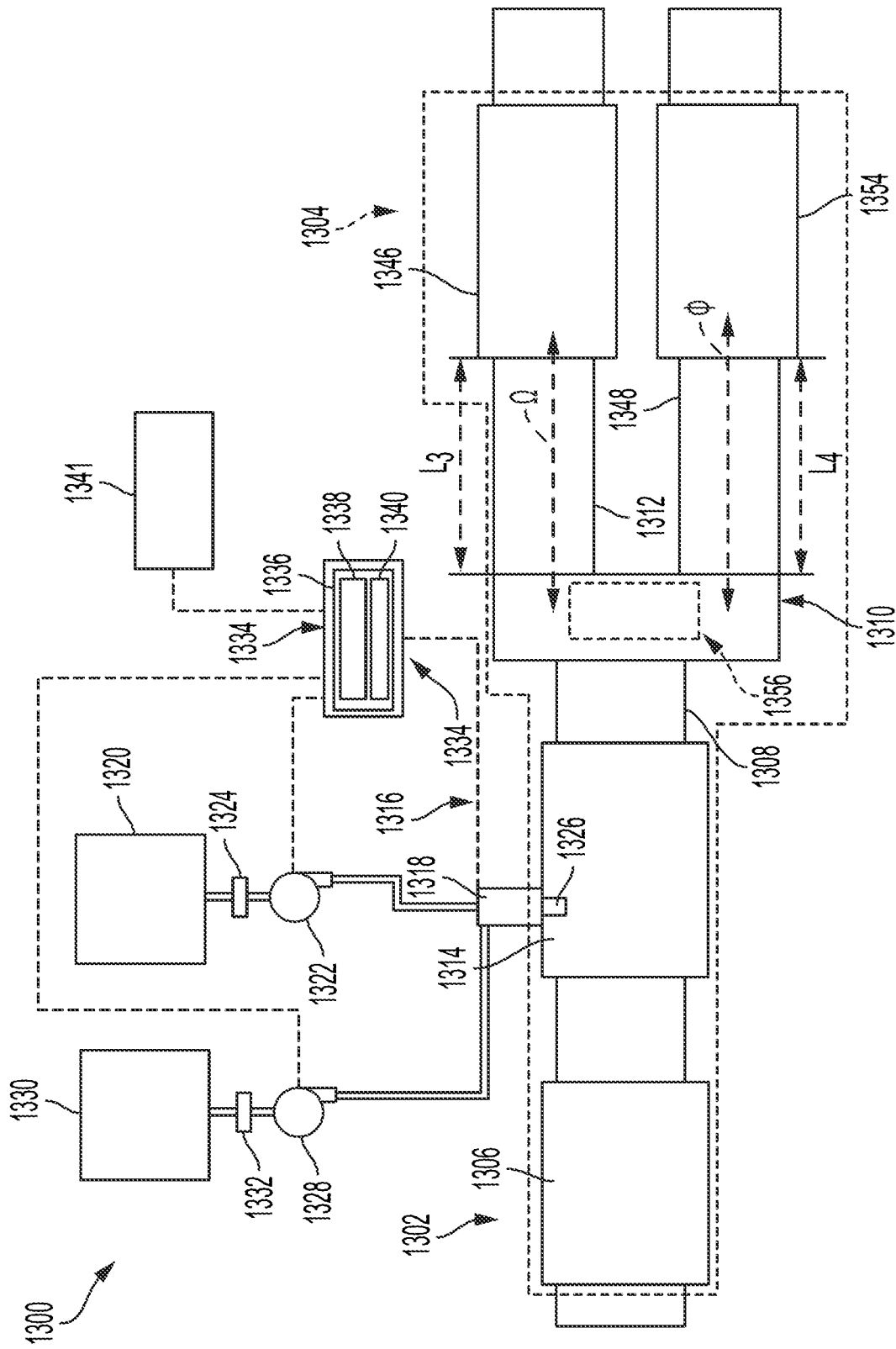
FIG. 26 is a schematic diagram of another example exhaust gas aftertreatment system including a distributing housing.

In some embodiments, as illustrated in FIG. 26, the distributing housing 1310 is disposed upstream of the first decomposition housing 1314, instead of upstream of the first decomposition housing 1314 and the second decomposition housing 1342. In these embodiments, the exhaust gas aftertreatment system does not include the second decomposition housing 1342, the first catalyst member exhaust gas conduit 1344, the second dosing module 1345, the second injector 1349, the second reductant pump 1347, the second air pump 1350, or the second catalyst member exhaust gas conduit 1352.

The upstream exhaust gas conduit 1308 is fluidly coupled to the first decomposition housing 1314 and is configured to receive the exhaust gas from the first decomposition housing 1314. The first catalyst member 1346 is fluidly coupled to the first catalyst exhaust gas conduit 1312 and is configured to receive the exhaust gas from the first catalyst exhaust gas conduit 1312. Similarly, the second catalyst member 1354 is fluidly coupled to the second catalyst exhaust gas conduit 1348 and is configured to receive the exhaust gas from the second catalyst exhaust gas conduit 1348.

VI. Configuration of Example Embodiments

As utilized herein, an area is measured along a plane (e.g., a two-dimensional plane, etc.) unless otherwise indicated. This area may change in a direction that is not disposed along the plane (e.g., along a direction that is orthogonal to the plane, etc.) unless otherwise indicated.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, reductant, an air-reductant mixture, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An exhaust gas aftertreatment system comprising:
    a housing assembly comprising:
        a catalyst member housing configured to receive exhaust gas,
        a flow divider comprising:
            a first endcap having a plurality of first apertures, which are all of the apertures of the first endcap and define a first total area, and
            a second endcap having a plurality of second apertures, which are all of the apertures of the second endcap and define a second total area different from the first total area, and
        a distributing housing configured to provide the exhaust gas to the catalyst member housing;
    a first catalyst member extending within the catalyst member housing and configured to receive, treat, and output a first portion of the exhaust gas, the first catalyst member configured to receive the first portion from the distributing housing; and
    a second catalyst member extending within the catalyst member housing and configured to receive, treat, and output a second portion of the exhaust gas, the second catalyst member configured to receive the second portion from the distributing housing;
    wherein the first endcap is positioned over a portion of the first catalyst member; and
    wherein the second endcap is positioned over a portion of the second catalyst member.

2. The exhaust gas aftertreatment system of claim 1, wherein:
    the catalyst member housing is centered on a catalyst member housing axis;
    the first catalyst member comprises a first catalyst member inlet that is disposed along a catalyst member inlet plane, the catalyst member inlet plane being orthogonal to the catalyst member housing axis;
    the second catalyst member comprises a second catalyst member inlet that is disposed along the catalyst member inlet plane;
    the first catalyst member comprises a first catalyst member outlet that is disposed along a first catalyst member outlet plane, the first catalyst member outlet plane being orthogonal to the catalyst member housing axis, the first catalyst member outlet plane separated from the catalyst member inlet plane by a first catalyst member separation length;
    the second catalyst member comprises a second catalyst member outlet that is disposed along a second catalyst member outlet plane, the second catalyst member outlet plane being orthogonal to the catalyst member housing axis, the second catalyst member outlet plane separated from the catalyst member inlet plane by a second catalyst member separation length; and
    the second catalyst member separation length is equal to between 95% of the first catalyst member separation length and 105% of the first catalyst member separation length, inclusive.

3. The exhaust gas aftertreatment system of claim 1, wherein:
    the housing assembly further comprises an upstream housing centered on an upstream housing axis;
    the first catalyst member is centered on a first catalyst member axis, the first catalyst member axis is parallel to the upstream housing axis; and
    the second catalyst member is centered on a second catalyst member axis, the second catalyst member axis is parallel to the upstream housing axis.

4. The exhaust gas aftertreatment system of claim 1, wherein a ratio of the first total area to the second total area is between 1.25 and 10, inclusive.

5. The exhaust gas aftertreatment system of claim 1, wherein:
    the first endcap is positioned between the first catalyst member and the distributing housing; and
    the second endcap is positioned between the second catalyst member and the distributing housing.

6. The exhaust gas aftertreatment system of claim 1, wherein:
    the first catalyst member is positioned between the first endcap and the distributing housing; and
    the second catalyst member is positioned between the second endcap and the distributing housing.

7. The exhaust gas aftertreatment system of claim 1, further comprising:
    a dosing module;
    wherein the housing assembly further comprises a decomposition housing;
    wherein the dosing module is coupled to the decomposition housing and configured to provide a reductant into the decomposition housing;
    wherein the distributing housing is configured to receive the reductant from the decomposition housing; and
    wherein the catalyst member housing is configured to receive the reductant from the distributing housing.

8. The exhaust gas aftertreatment system of claim 1, wherein the housing assembly further comprises an outlet housing coupled to the catalyst member housing and configured to receive the exhaust gas from the catalyst member housing after flowing through the first catalyst member or the second catalyst member, the outlet housing comprising an outlet fitting that defines a single outlet for the exhaust gas that has flowed through the first catalyst member and the exhaust gas that has flowed through the second catalyst member to be provided from the outlet housing.

9. The exhaust gas aftertreatment system of claim 1, wherein:
the housing assembly further comprises:
an upstream housing centered on an upstream housing axis, and
a decomposition housing coupled to the upstream housing and configured to receive exhaust gas from the upstream housing;
the catalyst member housing is centered on a catalyst member housing axis;
the upstream housing is configured to provide the exhaust gas to the decomposition housing in a second direction that is parallel to the upstream housing axis; and
the catalyst member housing is configured to facilitate flow of the exhaust gas through the catalyst member housing in a third direction that is parallel to the catalyst member housing axis, the third direction being opposite the second direction.

10. An exhaust gas aftertreatment system comprising:
a housing assembly comprising:
a catalyst member housing configured to receive exhaust gas, and
a flow divider comprising:
a first endcap having apertures, and
a second endcap having apertures;
a first catalyst member extending within the catalyst member housing and configured to receive, treat, and output a first portion of the exhaust gas; and
a second catalyst member extending within the catalyst member housing and configured to receive, treat, and output a second portion of the exhaust gas; wherein:
a total area of all apertures of the first endcap is greater than a total area of all apertures of the second endcap;
the first endcap is positioned over a portion of the first catalyst member; and
the second endcap is positioned over a portion of the second catalyst member.

11. The exhaust gas aftertreatment system of claim 10, wherein a ratio of the total area of all the apertures of the first endcap to the total area of all the apertures of the second endcap is between 1.25 and 10 inclusive.

12. The exhaust gas aftertreatment system of claim 10, wherein:
the housing assembly further comprises a distributing housing that is configured to provide the exhaust gas to the catalyst member housing;
the first endcap is positioned between the first catalyst member and the distributing housing; and
the second endcap is positioned between the second catalyst member and the distributing housing.

13. The exhaust gas aftertreatment system of claim 10, wherein:
the housing assembly further comprises a distributing housing that is configured to provide the exhaust gas to the catalyst member housing;
the first catalyst member is positioned between the first endcap and the distributing housing; and
the second catalyst member is positioned between the second endcap and the distributing housing.

14. The exhaust gas aftertreatment system of claim 10, wherein:
the catalyst member housing is centered on a catalyst member housing axis;
the first catalyst member comprises a first catalyst member inlet that is disposed along a catalyst member inlet plane, the catalyst member inlet plane being orthogonal to the catalyst member housing axis;
the second catalyst member comprises a second catalyst member inlet that is disposed along the catalyst member inlet plane;
the first catalyst member comprises a first catalyst member outlet that is disposed along a first catalyst member outlet plane, the first catalyst member outlet plane being orthogonal to the catalyst member housing axis, the first catalyst member outlet plane separated from the catalyst member inlet plane by a first catalyst member separation length;
the second catalyst member comprises a second catalyst member outlet that is disposed along a second catalyst member outlet plane, the second catalyst member outlet plane being orthogonal to the catalyst member housing axis, the second catalyst member outlet plane separated from the catalyst member inlet plane by a second catalyst member separation length; and
the second catalyst member separation length is equal to between 95% of the first catalyst member separation length and 105% of the first catalyst member separation length, inclusive.

15. The exhaust gas aftertreatment system of claim 10, wherein the housing assembly further comprises an outlet housing coupled to the catalyst member housing and configured to receive the exhaust gas from the catalyst member housing after flowing through the first catalyst member or the second catalyst member, the outlet housing comprising an outlet fitting that defines a single outlet for the exhaust gas that has flowed through the first catalyst member and the exhaust gas that has flowed through the second catalyst member to be provided from the outlet housing.

16. An exhaust gas aftertreatment system comprising:
a housing assembly comprising:
a catalyst member housing configured to receive exhaust gas and centered on a catalyst member housing axis, and
a flow divider comprising:
a first endcap having a plurality of first apertures, which are all of the apertures of the first endcap and define a first total area, and
a second endcap having a plurality of second apertures, which are all of the apertures of the second endcap and define a second total area different from the first total area;
a first catalyst member extending within the catalyst member housing and configured to receive, treat, and output a first portion of the exhaust gas, the first catalyst member comprising:
a first catalyst member inlet that is disposed along a catalyst member inlet plane, the catalyst member inlet plane being orthogonal to the catalyst member housing axis, and
a first catalyst member outlet that is disposed along a first catalyst member outlet plane, the first catalyst member outlet plane being orthogonal to the catalyst member housing axis, the first catalyst member outlet plane separated from the catalyst member inlet plane by a first catalyst member separation length; and a second catalyst member extending within the catalyst member housing and configured to receive, treat, and output a second portion of the exhaust gas, the second catalyst member comprising:
  a second catalyst member inlet that is disposed along the catalyst member inlet plane, and
  a second catalyst member outlet that is disposed along a second catalyst member outlet plane, the second catalyst member outlet plane being orthogonal to the catalyst member housing axis, the second catalyst member outlet plane separated from the catalyst member inlet plane by a second catalyst member separation length, the second catalyst member separation length being equal to between 95% of the first catalyst member separation length and 105% of the first catalyst member separation length, inclusive;

wherein the first endcap is positioned over a portion of the first catalyst member; and wherein the second endcap is positioned over a portion of the second catalyst member.

17. The exhaust gas aftertreatment system of claim 16, wherein the housing assembly further comprises an outlet housing coupled to the catalyst member housing and configured to receive the exhaust gas from the catalyst member housing after flowing through the first catalyst member or the second catalyst member, the outlet housing comprising an outlet fitting that defines a single outlet for the exhaust gas that has flowed through the first catalyst member and the exhaust gas that has flowed through the second catalyst member to be provided from the outlet housing.

18. The exhaust gas aftertreatment system of claim 16, wherein a ratio of the first total area to the second total area is between 1.25 and 10, inclusive.

* * * * *